Figure 1:
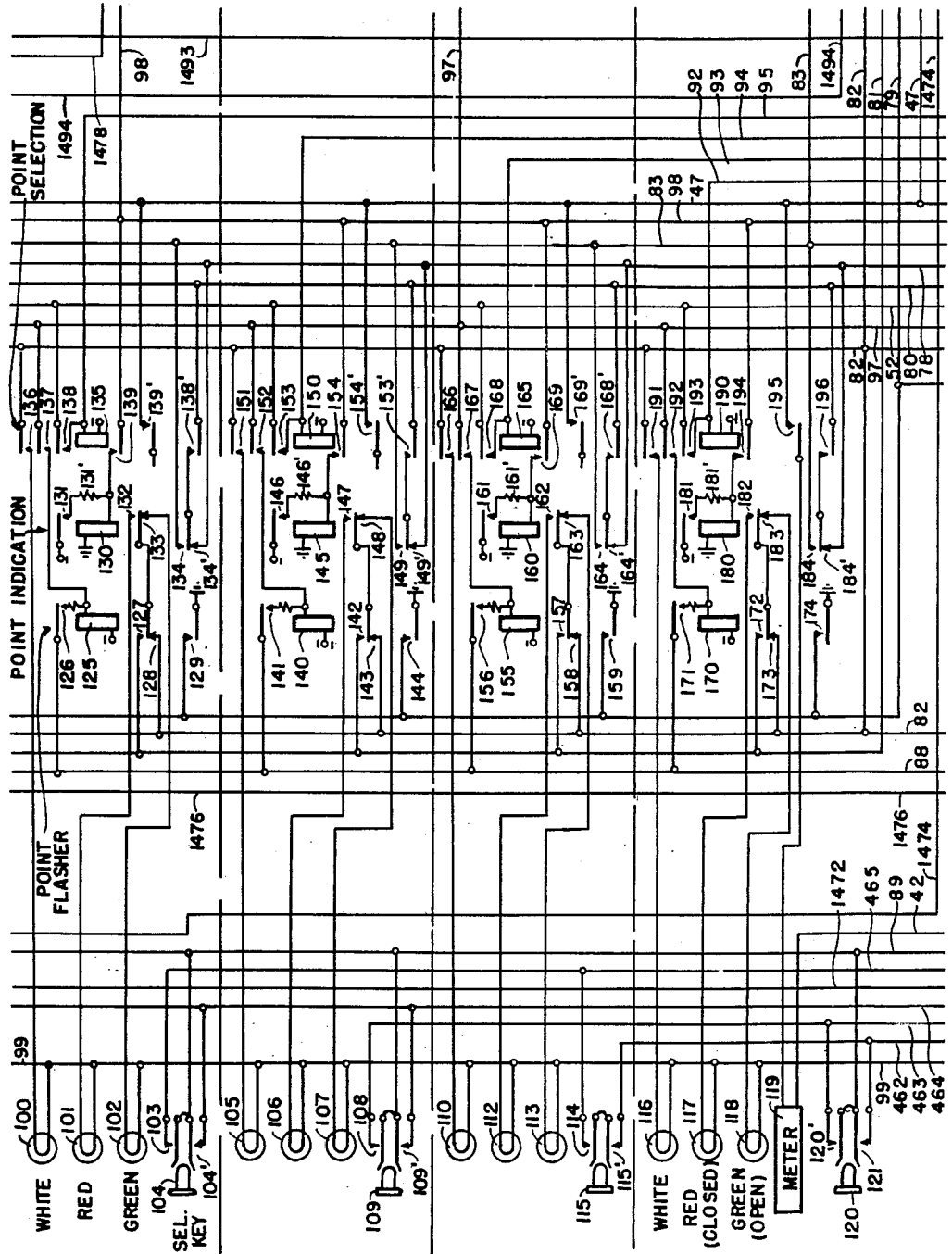
Figure 5A:
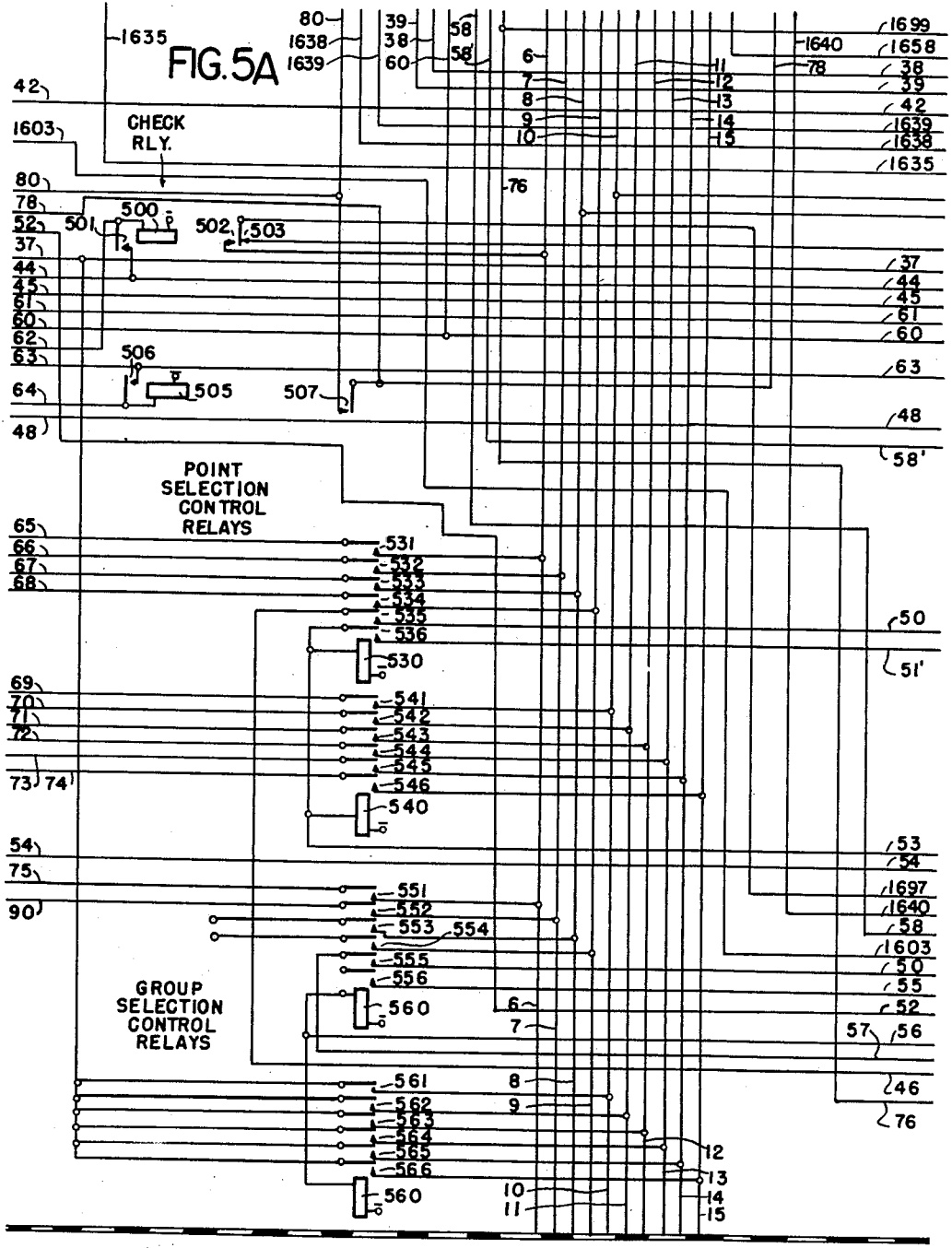
Figure 5B:
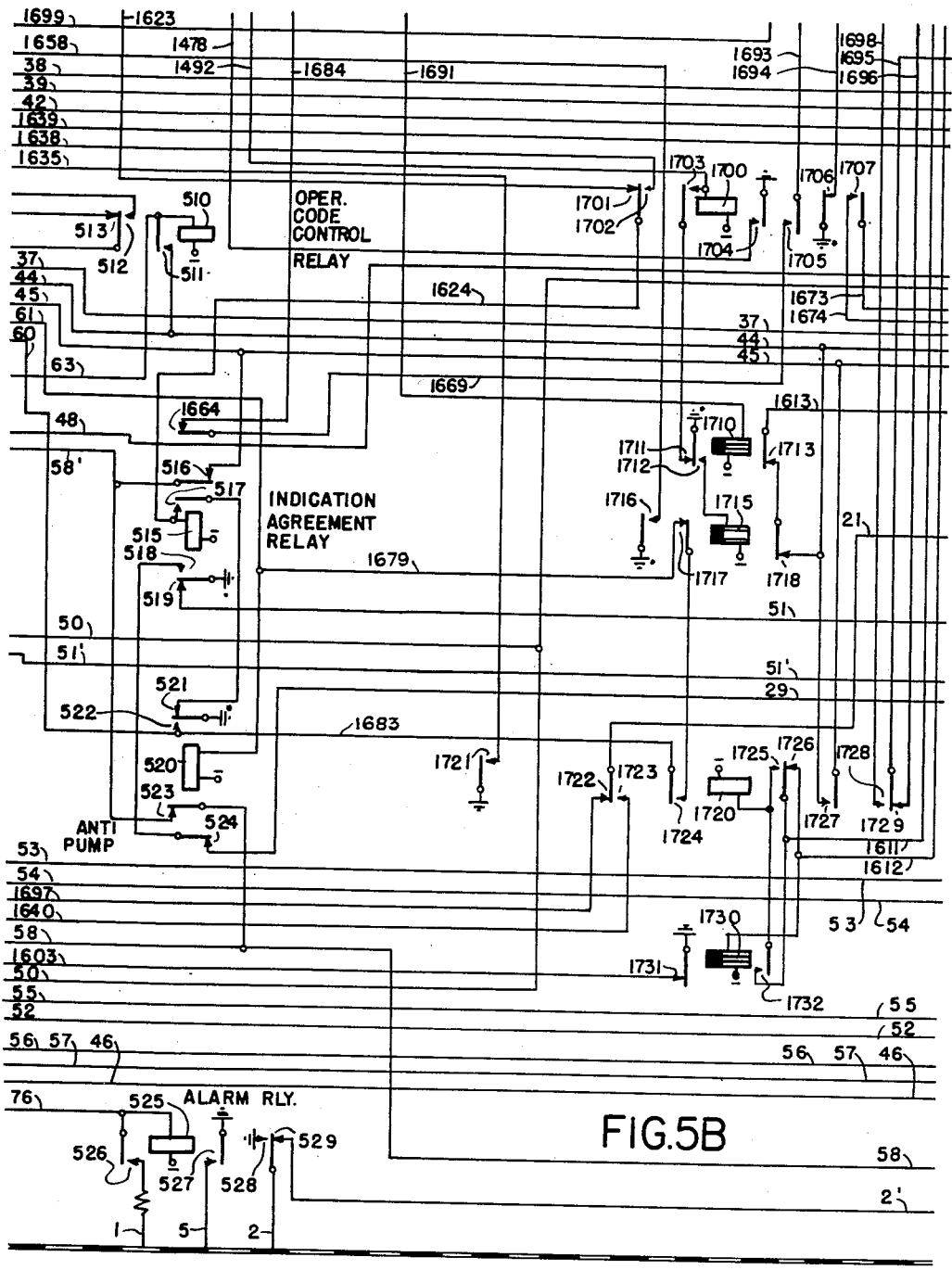

Aug. 25, 1959  L. R. BREESE  2,901,728
SUPERVISORY CONTROL SYSTEM
Filed April 10, 1951  16 Sheets-Sheet 1

INVENTOR.
LEMUEL R. BREESE
BY Brown, Jackson,
Boettcher + Drenner
ATTYS.

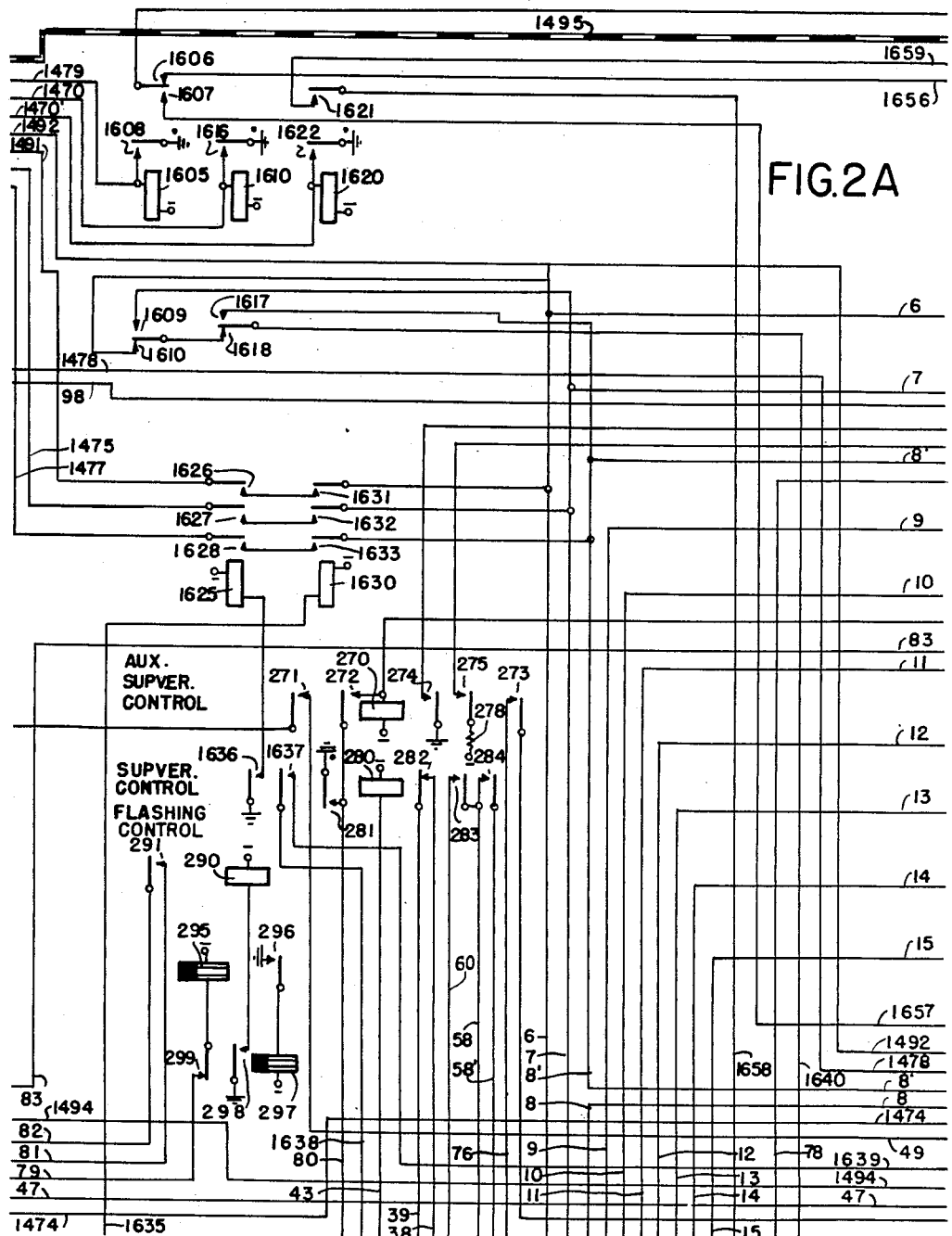

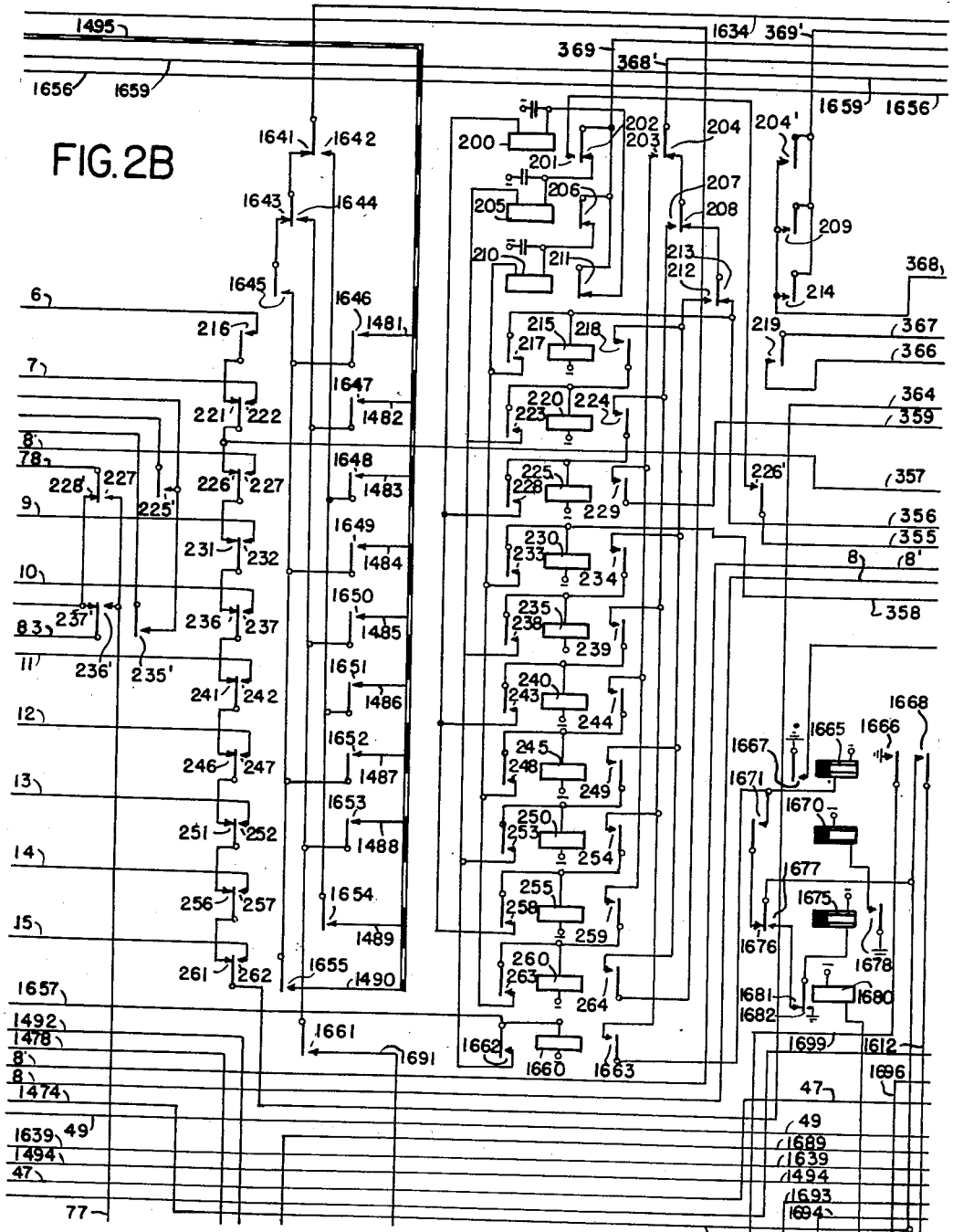

Aug. 25, 1959     L. R. BREESE     2,901,728
SUPERVISORY CONTROL SYSTEM
Filed April 10, 1951     16 Sheets-Sheet 4
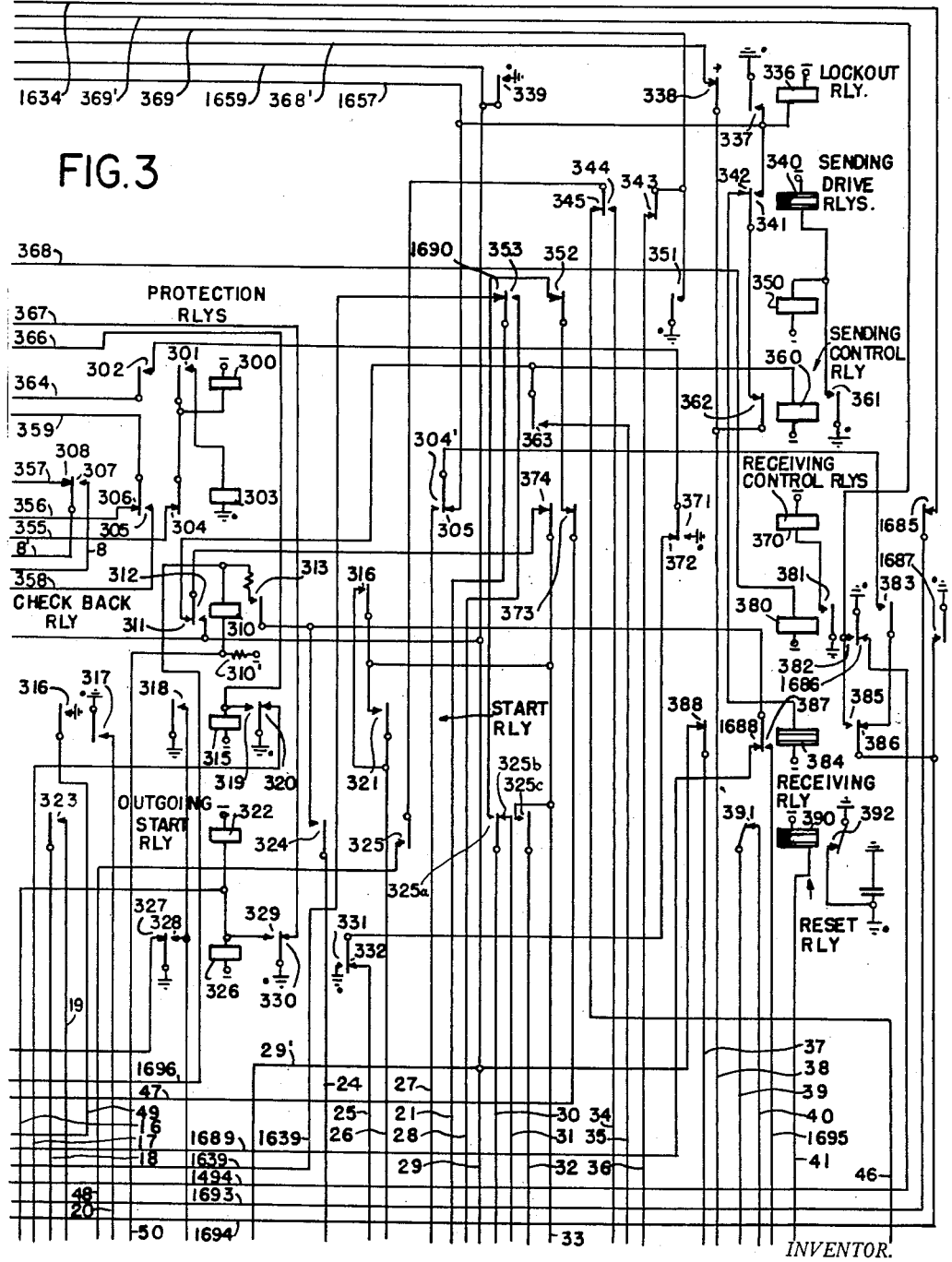
INVENTOR.
LEMUEL R. BREESE
BY Brown, Jackson,
Boettcher & Dienner
ATTYS.

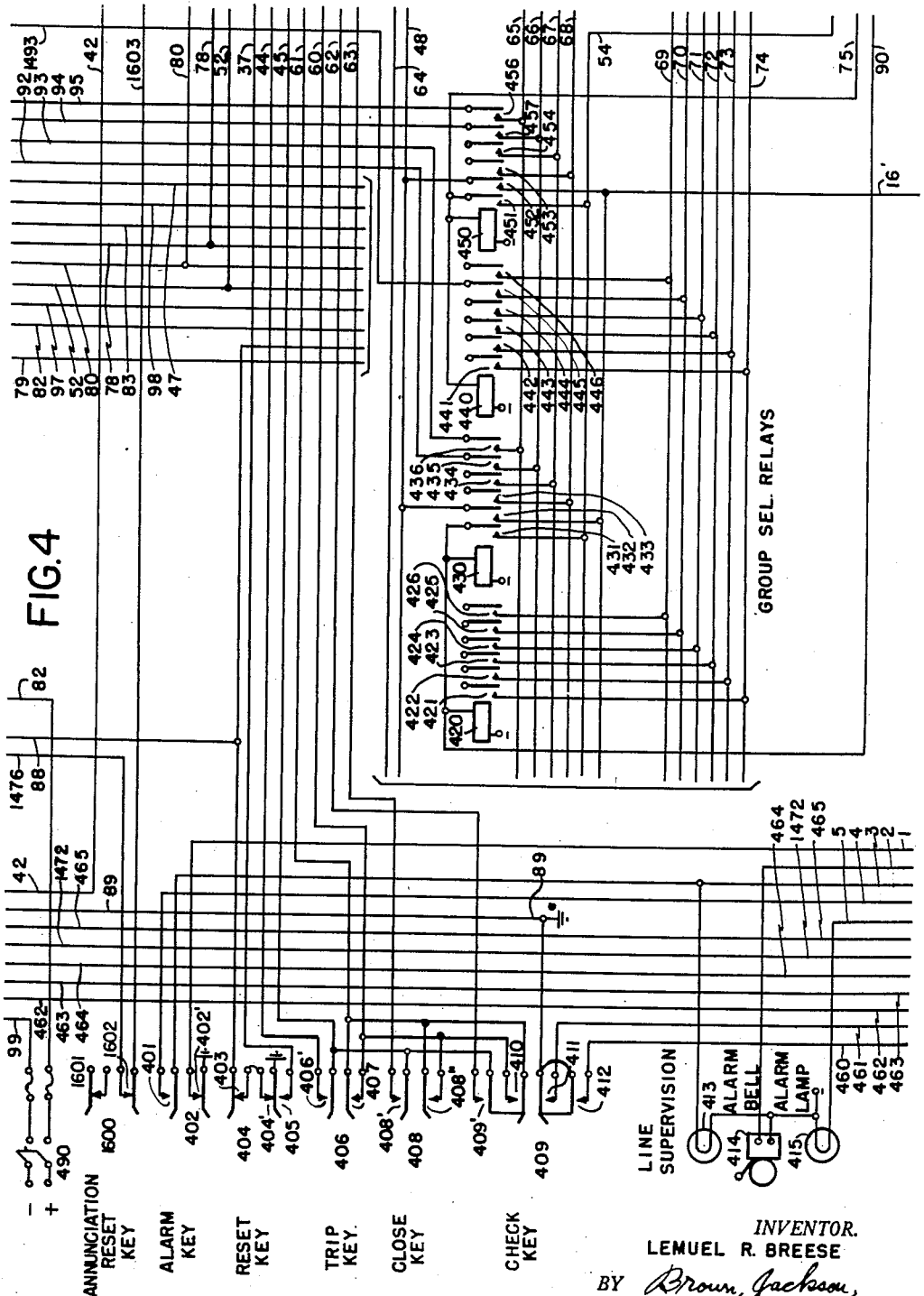

Aug. 25, 1959 — L. R. BREESE — 2,901,728
SUPERVISORY CONTROL SYSTEM
Filed April 10, 1951 — 16 Sheets-Sheet 6

INVENTOR.
LEMUEL R. BREESE
BY Brown, Jackson,
Boettcher & Dienner
ATTYS.

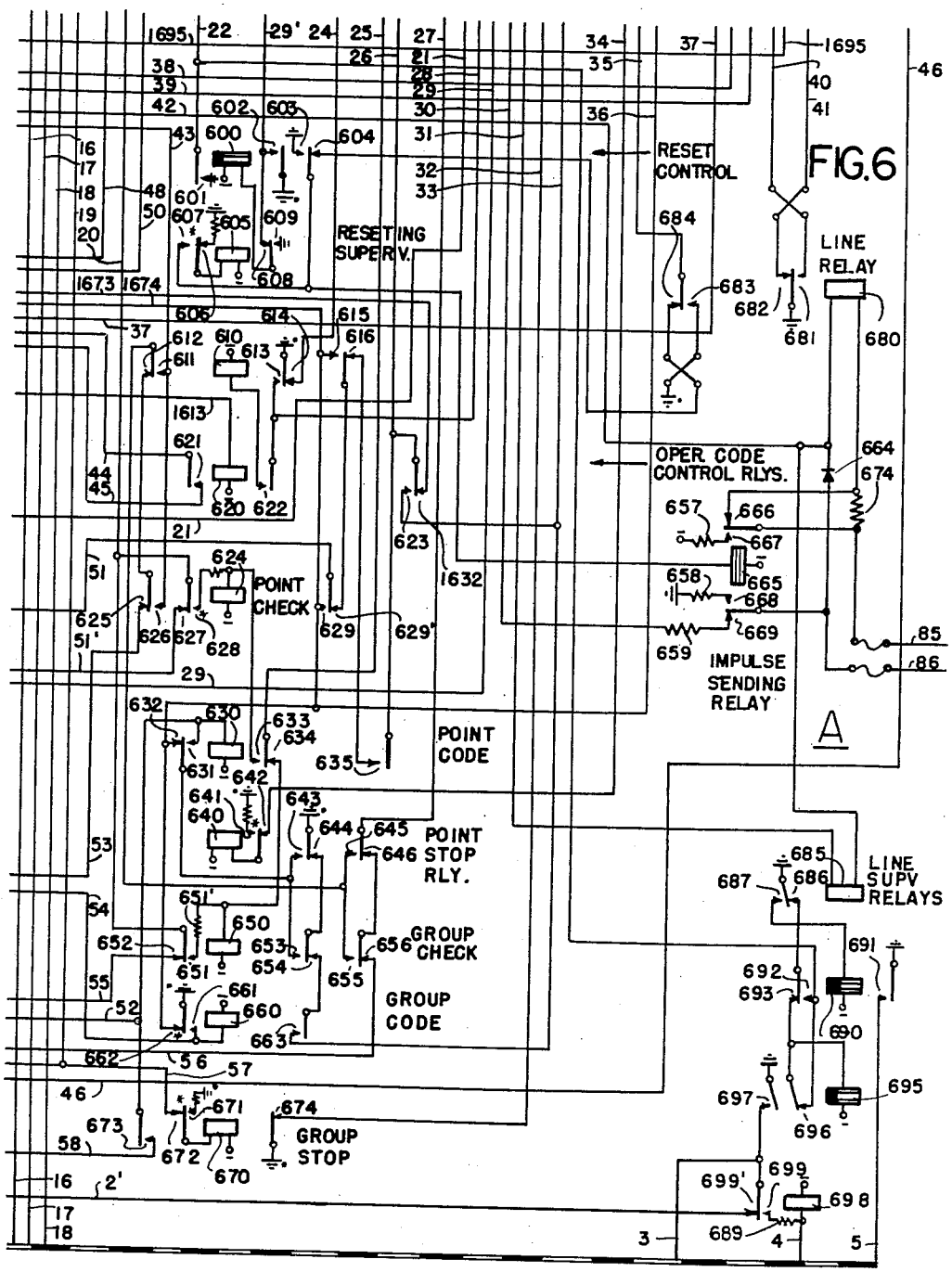

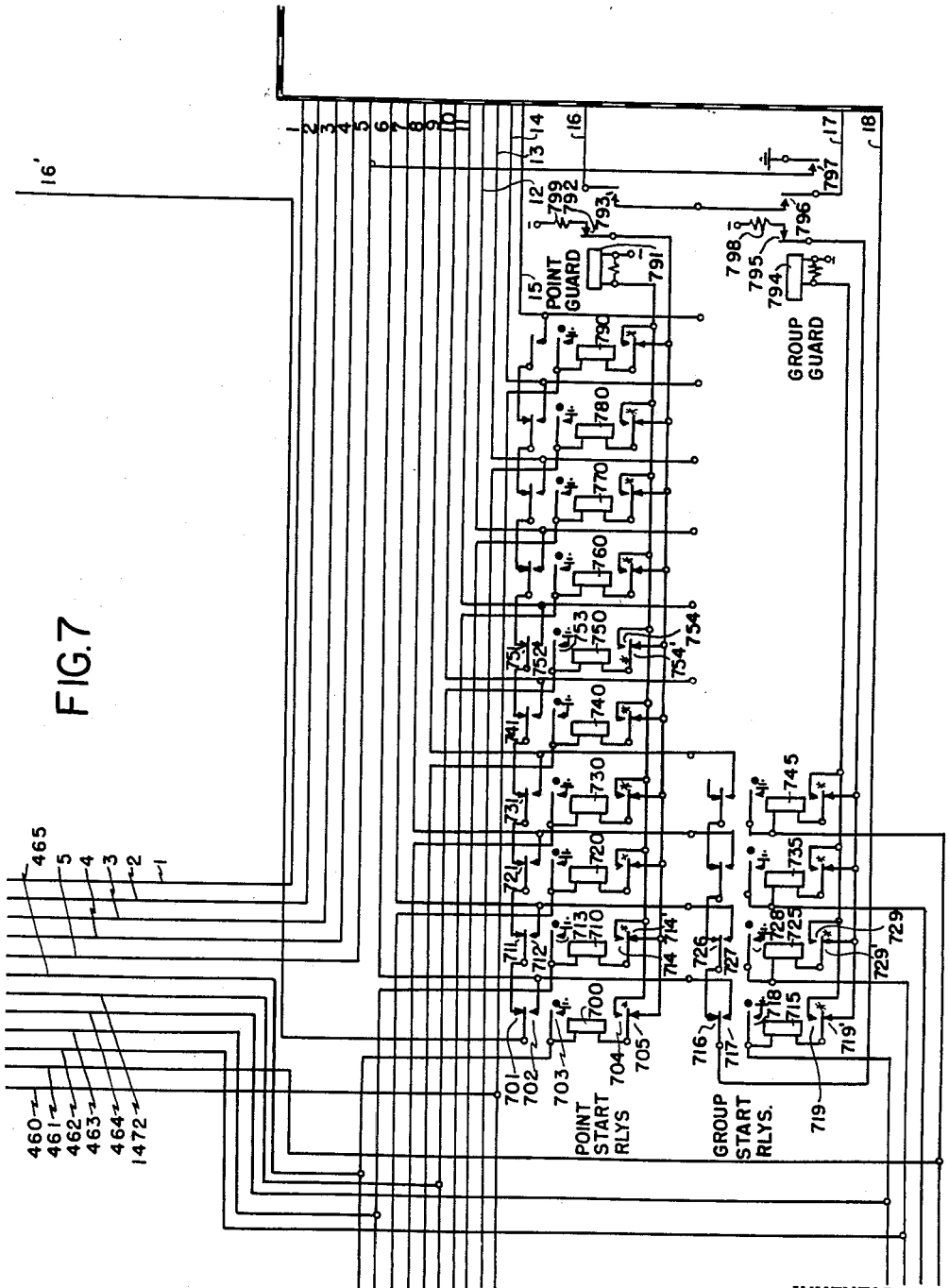

Aug. 25, 1959

L. R. BREESE 2,901,728

SUPERVISORY CONTROL SYSTEM

Filed April 10, 1951

16 Sheets-Sheet 10

INVENTOR.
LEMUEL R. BREESE
BY Brown, Jackson,
Boettcher & Dienner
ATTYS.

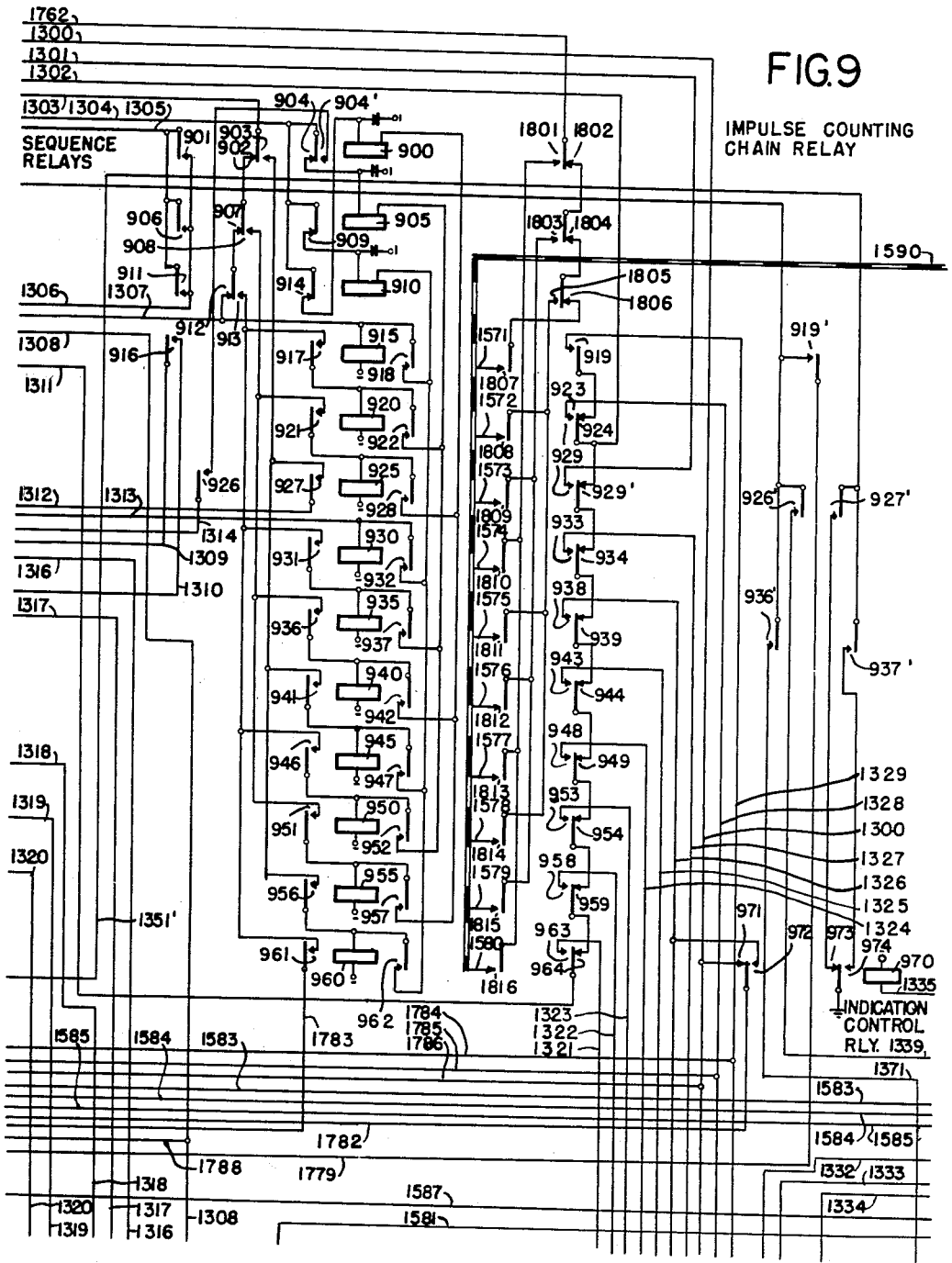

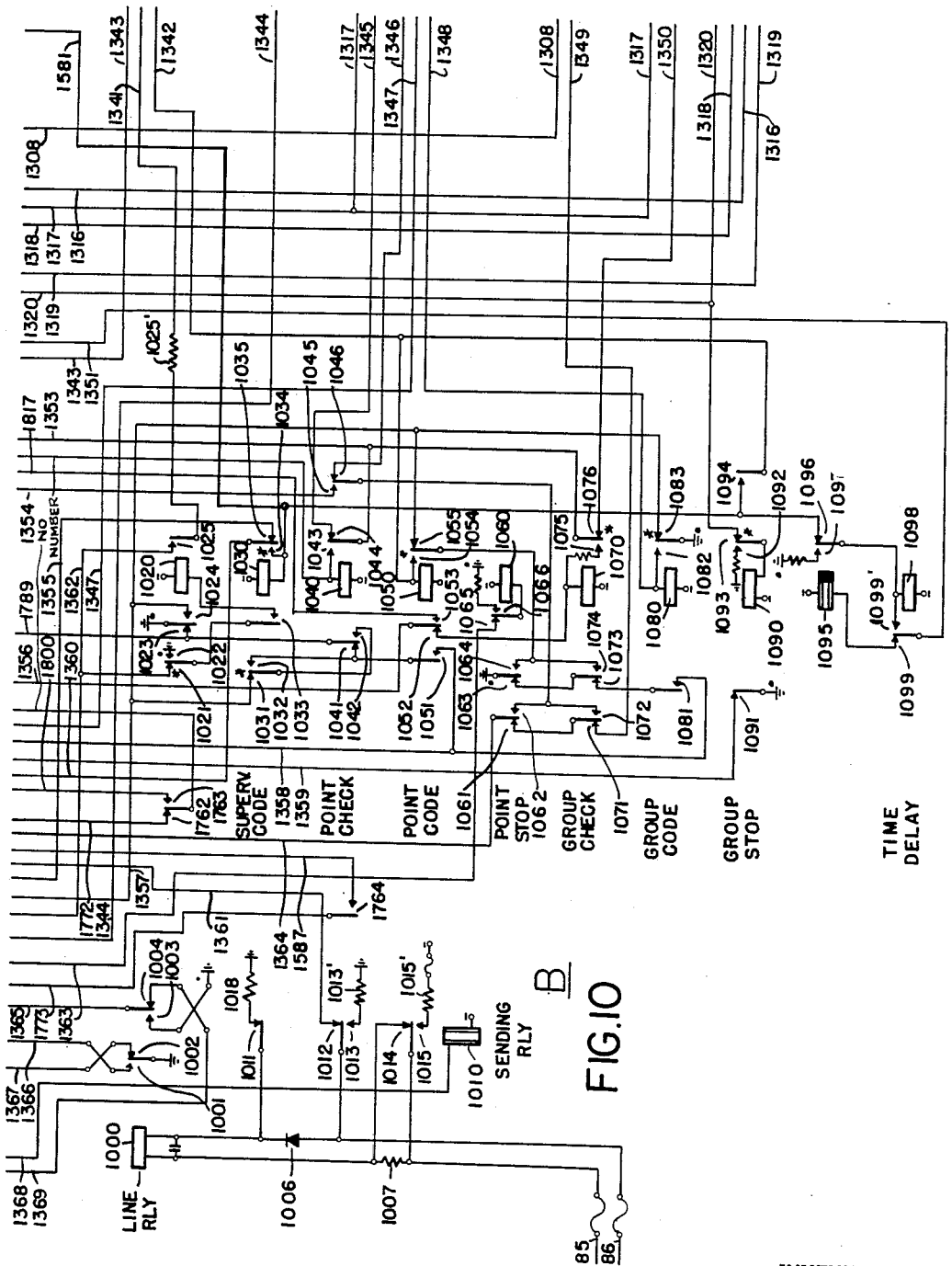

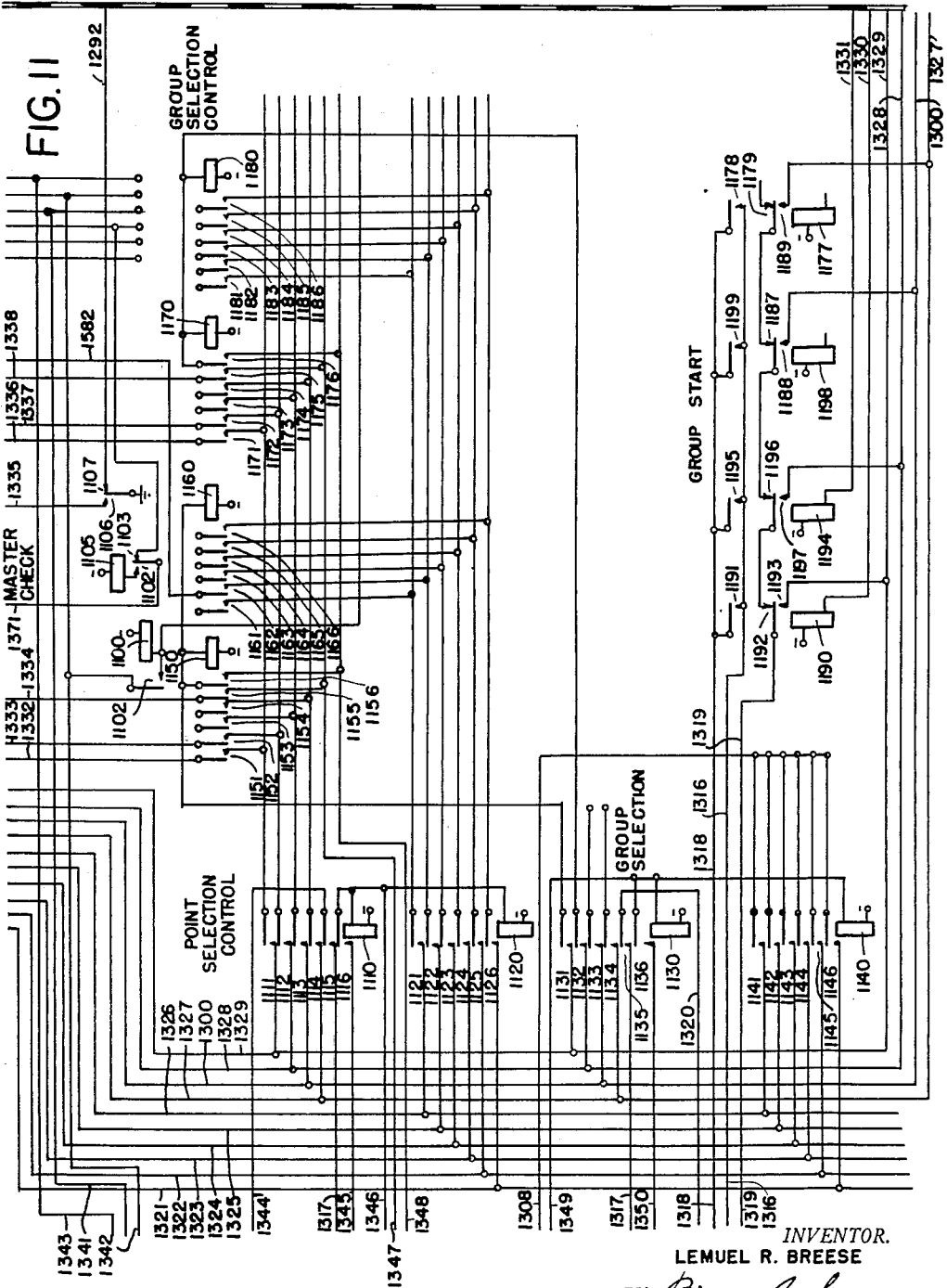

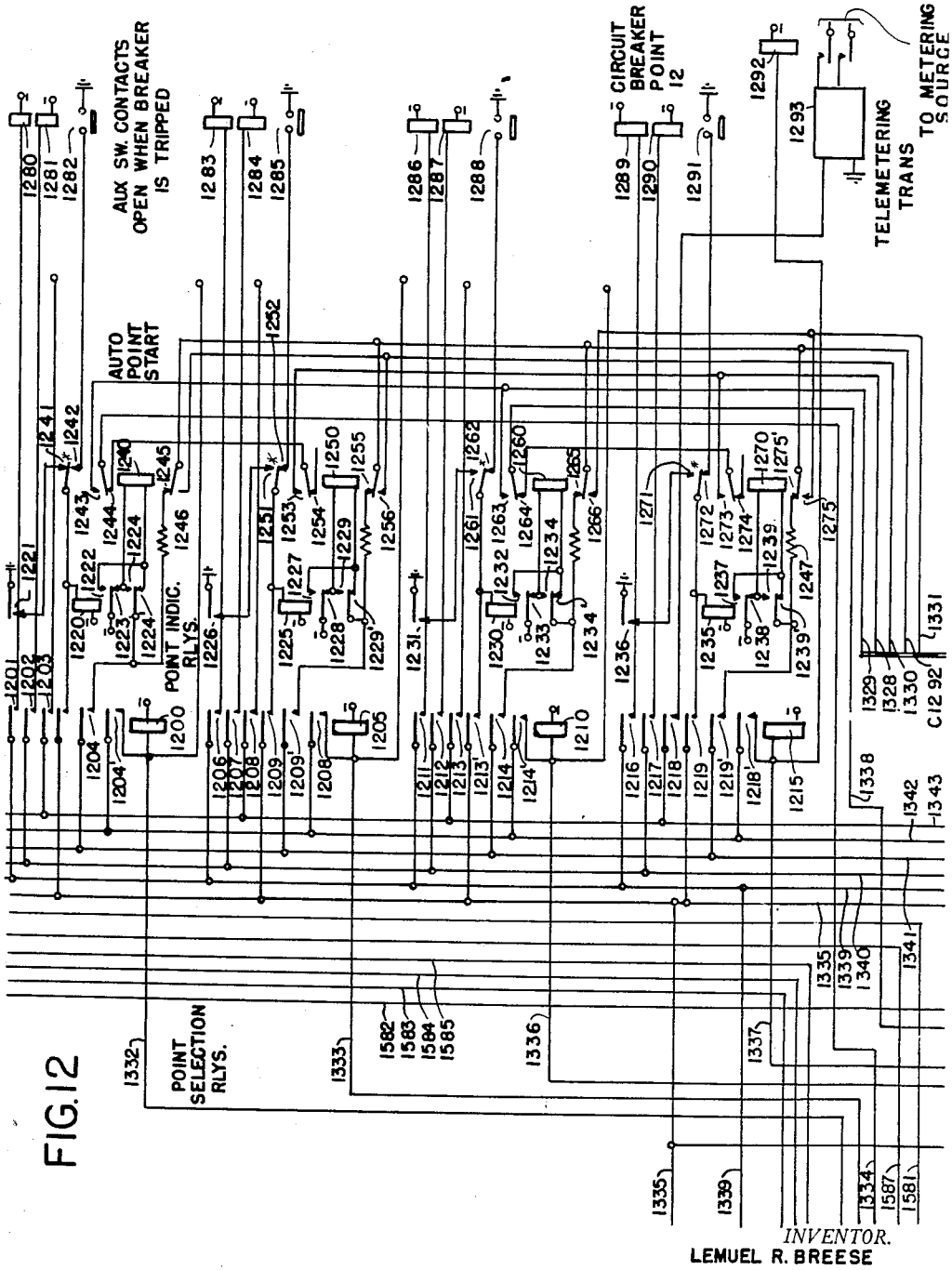

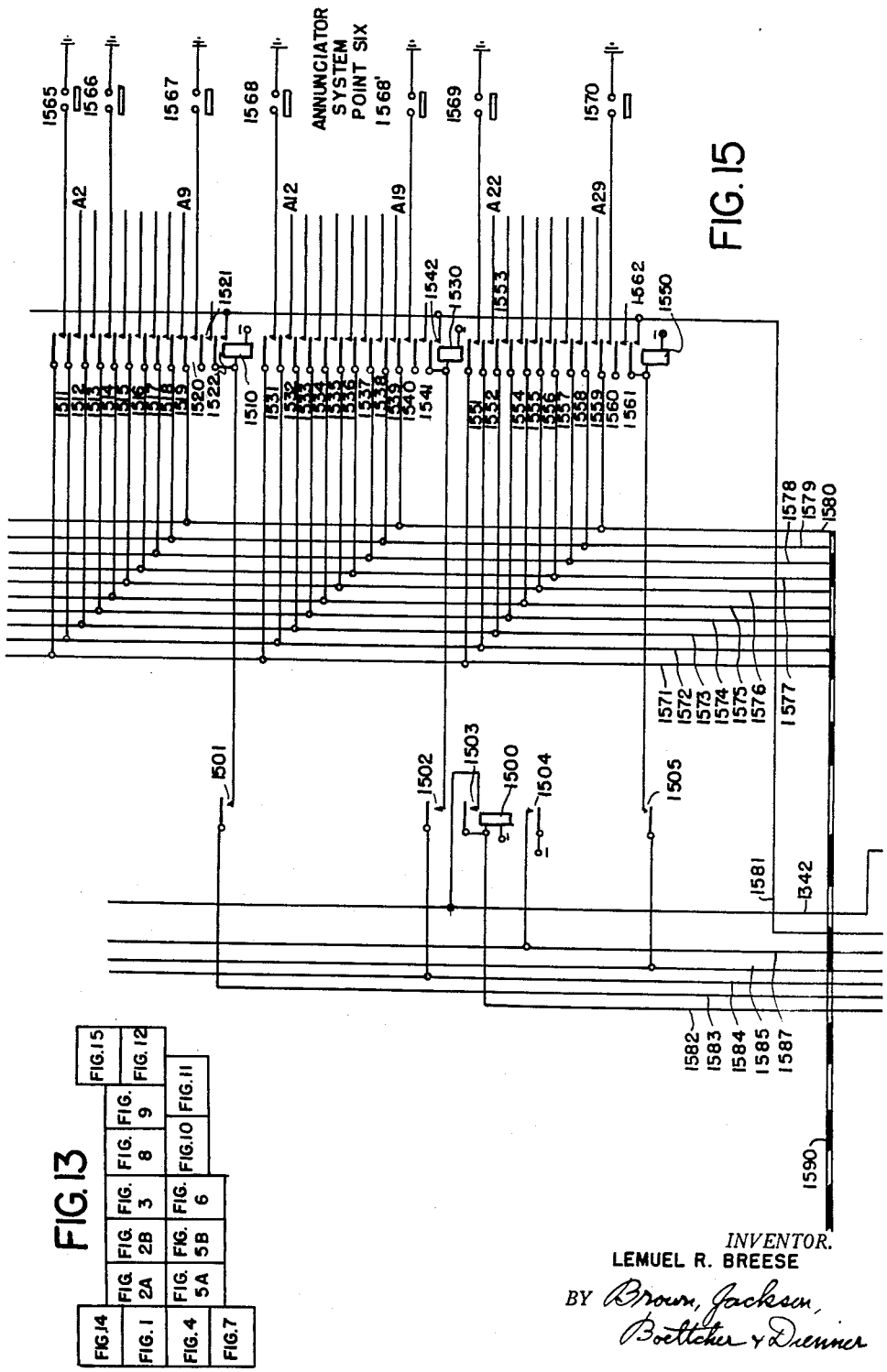

Aug. 25, 1959          L. R. BREESE          2,901,728
              SUPERVISORY CONTROL SYSTEM
Filed April 10, 1951                    16 Sheets-Sheet 16
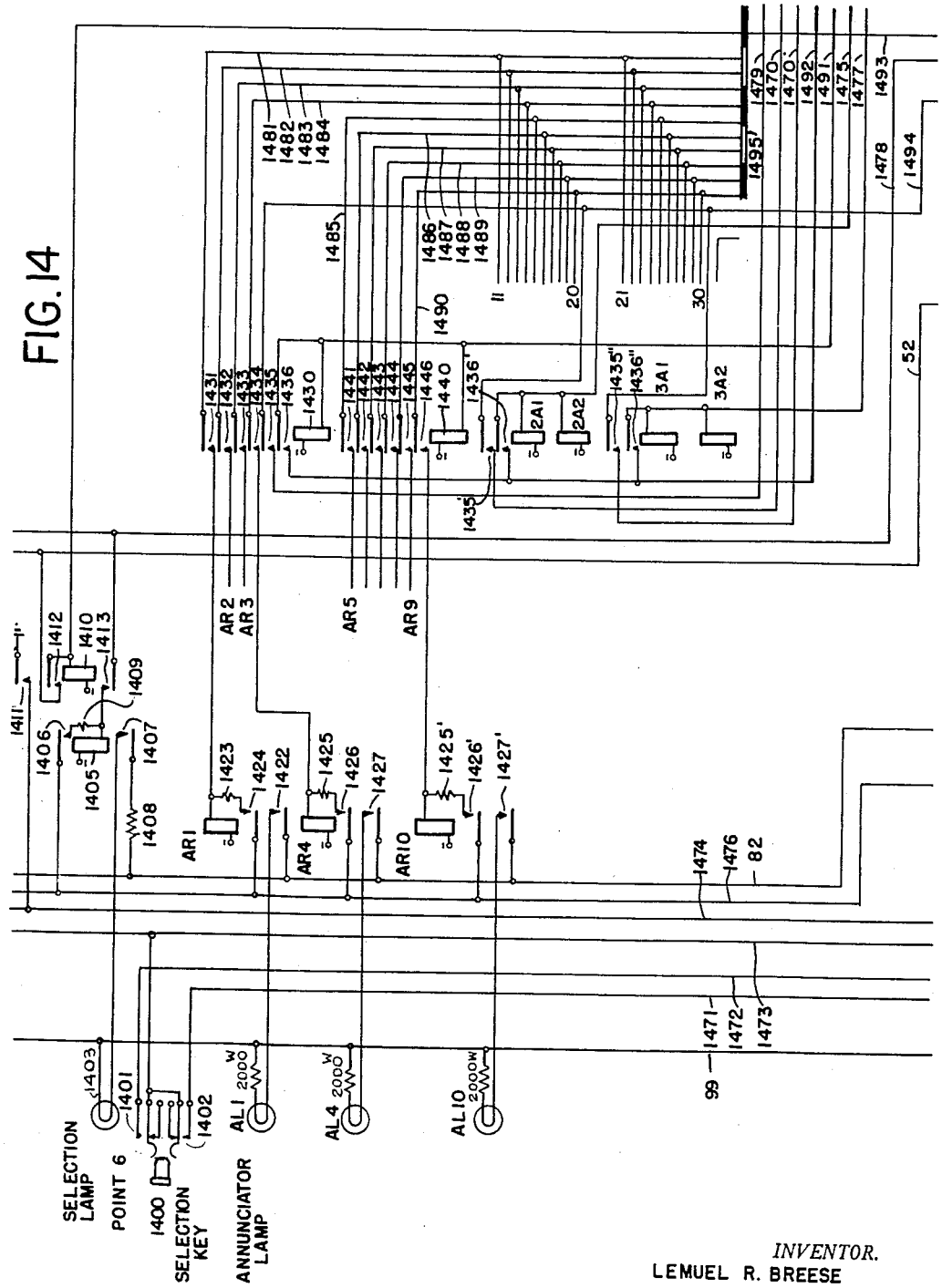
INVENTOR.
LEMUEL R. BREESE
BY Brown Jackson,
Boettcher & Dienner
ATTYS.

United States Patent Office 2,901,728
Patented Aug. 25, 1959

2,901,728
SUPERVISORY CONTROL SYSTEM

Lemuel R. Breese, Galion, Ohio, assignor to North Electric Company, a corporation of Ohio Application April 10, 1951, Serial No. 220,261

38 Claims. (Cl. 340—163)

The present invention relates in general to supervisory control equipment having a central control station which is adapted to control a number of operating units, such as generators, circuit breakers, etc., which are disposed at a series of remotely located substations, and is particularly concerned with the provision of an improved supervisory control arrangement including a new and novel indicator system for providing the central control station with a complete and detailed picture of the operating condition of each of the remotely located units.

In many fields of industry, as for example in power line distribution systems, dam and flood water installations, transformer switching distribution systems, automatic substations such as used in railroading and mining fields, automatic electrified pumping stations and substation generating installations, it has proven most practical from the standpoint of providing improved service at a more economical cost to utilize an installation in which centralized control of the many units of the system may be effected.

In many of these systems, for example, the individual operating units of the arrangement are necessarily dispersed over extended geographical areas, and prior to the advent of centralized control, the services of individual attendants at each of the remotely located points were required. With the use of a competent supervisory control system having a central point of control, each of the remote substations may be automatically controlled in their operation by a single attendant at the central office and large savings in operating expenses are effected.

In other types of installations the problem may be one of obtaining, at an instant notice and at a single point, a complete, accurate overall picture of the operating condition of the system whereby a more rapid and reliable type system supervision may be effected by a single attendant. In systems having a series of individual attendants at each of the points, the overall picture of the operating condition of the system tends toward confusion, and it is somewhat difficult to instantly accumulate at one point the desired information concerning the operated condition of each unit in the system. Centralized control, of course, provides the information at one central point at all times and the attendant is always well informed as to the overall status of the system. These are but a few of the many advantages of centralized control systems and the problems which they solve.

The primary requisities of a system of centralized control are rapidity, accuracy and reliability in operation, and along with the trend toward centralized control there has been an increasing demand for a control system having these inherent characteristics. A novel control system which is the answer to such a demand has been set forth in a copending application which was filed by L. R. Breese et al. on April 4, 1950 and which issued on November 4, 1952, as U.S. Patent No. 2,616,959, said patent having been assigned to the assignee of this invention. As set forth in that copending application, the improved supervisory equipment is adapted to selectively control the operation of each of a plurality of remotely disposed switches or circuit breakers (one hundred in number) between their operated and restored positions, the operation and supervision of the circuit breakers being accomplished over a single two-wire communication channel extending between the central point of control and the distant substation at which the controlled switches are located. The remotely disposed switches or circuit breakers are also manually operable to their several positions or automatically operated thereto responsive to the occurrence of the local conditions. In either event the switches automatically effect the reporting of the change of position to the central control office whereby the attendant is informed at all times as to the position of each substation switch. The switches may, in turn, control the operation of various flood gates in dam installations, the energizing and deenergizing of associated equipment such as generators, motors, transformer switches etc., or may be used as conventional circuit breakers in power installations. These and many other uses are obvious to those familiar with the art.

While the equipment set forth in that application is an extremely important advancement over the previous art in the field, and is operative to provide the central office attendant with a complete picture of each of the switching units at the substation, the equipment set forth thereat is not concerned with the provision of information concerning the condition of the equipment which is controlled by the substation switching units. For example, one switch at one of the hundred substation points may be assigned to control the energization and deenergization of a predetermined generator unit at the substation. In the control system of the previous application the switch may be controlled to start and stop the generator equipment and is operative to inform the control station of the energized and deenergized condition of the generator at all times. However, in many instances, the accomplishment of safe, reliable and accurate control of the remotely located equipment requires that the attendant be supplied with a more detailed picture of the operating condition of the generating equipment. In the supervision of a generator unit located at one of the points, the generator load; the variance of the voltage from a predetermined operating value; the overheating of the bearings; the loss of motor power; the loss of oil pressure at various points; the variation in speed of the generator; overheating of the generator windings; etc., are all factors which are essential to safe operation of the generator equipment. Failing the provision of such information to the attendant at the control office, the equipment may be operated at a time when certain of these conditions exist and severe and irreparable damage may result to the distantly located generator equipment. Further in the event of failure at the substation, it is important that the attendant be informed as to the cause of such failure.

It is an object of the present copending application to provide a rapid operating, more comprehensive type indicator system which is capable of providing the attendant at the control station with a more complete and comprehensive picture of the condition of the various equipment being controlled by the switches at each of the points of the remotely disposed substations.

The provision of such information, for reasons of economy, is desirably extended between the stations over the same single two wire communication channel over which the control operations of the remotely located switches are accomplished, and one of the features of the invention is the manner in which separate and distinct lines of division are maintained between the indicating and control functions of the equipment.

Another feature of the invention is the manner in which certain of the points are assigned to perform indicating functions and are each capable of indicating the condition of a practically unlimited number of different elements of the control unit which it monitors.

A further feature of the invention is the manner in which accuracy and reliability of operation is accomplished through the use of a series of automatic checks of synchronism of operation at the substation and control station during each indicating operation, the equipment effecting the reset of all stations whenever a variance in synchronism of operation is detected.

A further feature of the invention is the manner in which a single indicator panel is adapted for use with all of the indicator points at the substation, the indications on the indicator panel being wiped out whenever a succeeding indicator point is seized for operation. Other provisions are made for removal of the indications on the panel at the will of the attendant.

Another feature of the invention is the manner in which the equipment is operative during an indicating operation to detect a change of position of one of the operating units as a result of the occurrence of a local condition, and to record such change in position until such time as the indicating operation is completed and to then automatically effect the report of such change of condition thereafter.

These and many other features of the invention will become more apparent by reference to the following specification and accompanying drawings wherein selected embodiments of the structure are illustrated.

In the drawings:

Figures 1 to 15, inclusive, when arranged in the manner of the figure layout set forth in Figure 13 are illustrative of the supervisory control equipment including the novel indicator system of the invention, Figures 1 to 7, and 14 when arranged in proper order illustrating the equipment at the control office, and Figures 8 to 12, and 15 when arranged in proper order disclosing a series of circuit breaker and indicator points as disposed at a remotely located substation.

GENERAL DESCRIPTION

For purposes of illustration the novel indicator system is shown in a control system as set forth in the aforedescribed Breese et al. application. A control or central office station is adapted to selectively control a series of points located at a remotely located substation, certain of the points being arranged to control equipment such as generator units, etc., and other points being assigned to the indicator system for providing indications concerning the status of the generator units.

The central or control office A is connected to the distantly located substation B over a single signalling channel comprising a pair of line conductors 85 and 86, the control and indicating impulses being transmitted between the stations over such link. Selective access to any point at the substation is gained by operating the associated key such as 104, etc., on the control panel at the control station, the selective operation of a switching unit such as 1289, etc., at a substation switching point thus seized being effected by the subsequent operation of the appropriate trip or close keys 406 and 408 Fig. 4 on the control board.

In the event of the seizure of an indicating point no further operation by the attendant is required, the indications registered thereat being automatically transmitted to the control station and registered on the indicator panel thereat.

The control panel at the central office is divided into a series of smaller control panels, each of which is individual to a coresponding point located at the substation. Each of the individual panels may comprise an escutcheon plate which mounts an individual selection key for selecting its associated substation point and a series of condition informing lamps.

The panel for a point assigned to the switching group includes a white selection lamp, a red indication lamp, a green indication lamp, and in some cases an indicating meter for telemetering equipment which may be associated therewith (as illustrated at point twelve). The red indication lamp is illuminated whenever the switch or circuit breaker located at the substation is operated to the closed position and the green indication lamp is illuminated whenever the switch or circuit breaker at its associated substation point is operated to the open position. The white lamp is illuminated responsive to the operation of the associated selection key and indicates to the operator the time of arrival at the particular point selected. The nature of the metering equipment is determined by the type of information which is desirably provided for the attendant at the control station.

An individual panel associated with an indicator point may include a selection key for effecting seizure of the associated substation point and a white selection lamp for indicating the selection of such point. Each individual indication panel is associated with a main indication panel which is operative with each selection of an indicator point to register the indications supplied thereby. The indicator panel comprises a series of lamps arranged in groups of ten, the maximum number of lamps on the board being equivalent to that at the substation indicator point having the largest number of indicators associated therewith. Thus indicators 1 to 10 at an indicator point are represented by the first group of indicator lamps on the control board, indicators 11 to 20 are represented by the second group of indicator lamps on the control board, etc. The lamps on the indicator panel are illuminated whenever the associated indicator at the seized one of the substation points is in the alarm condition. The alarm bell and alarm lamp at the control station are interconnected with the indicator panel and operated whenever one of the lamps on the indicator panel is operated.

The lamps, as illuminated on the indicator board responsive to selection of one of the indicator points, are maintained illuminated on the board until such time as the attendant operates an associated reset key, or alternatively, until such time as a further indicator point is selected by operation of its associated selector key at the main control panel.

The main control panel also includes a group of common control members such as an alarm key, reset key, alarm lamp, trip key, close key, check key, alarm bell, alarm lamp and line supervision lamp.

The common control units are associated with each of the switching points and some of the common units such as the alarm equipment are also associated with the indication points. For example, with the automatic local change of position of a switch at a substation point the alarm bell and the alarm lamp at the dispatch office are operated to draw the attention of the attendant thereat to such change of position, the red lamp at the associated point on the control board flashing if the circuit breaker is being closed and the green lamp flashing if the circuit breaker is being opened. The common control keys at the panel enable the operator to silence the alarm bell, turn off the alarm lamp, or stop the flashing of the red and green indicating lamp by operating the alarm key.

The same alarm equipment is used for the indication points. The common reset key enables the operator to reset the equipment at the substation and control office in the event of the occurrence of a stalled condition for which the equipment has not effected an automatic reset.

The circuit breaker or switching units at the substation are of the conventional type and, in view of their similarity, only a few have been illustrated in the drawings. The circuit breaker at point twelve (Fig. 12) for example, is arranged to control the energization and deenergization of a generator unit and comprises a set of power controlling contacts for connecting potential to the generator (not shown), a close coil 1290, a trip coil 1289, and a set of auxiliary contacts 1291. Momentary energization of the close coil effects closing of the switch, and mechanical means hold the switch in such position until such time as the momentary energization of the trip coil, an occurrence of a line fault or the manual opening thereof at the substation is effected. Auxiliary switch contacts, such as 1291 are used to supply information to the control office relative to the breaker position.

The indicator points, such as the illustrated indicator point six Fig. 15, may each comprise a plurality of groups of indicators, such as indicators 1 to 10, 11 to 20, 21 to 30, which are operative between a normal and an alarm condition in accordance with the condition of the equipment which it monitors. Each indicator includes a pair of indicating contacts, such as 1565, 1566, etc., which are closed when its associated indicator is operated to the alarm condition and which are open when the indicator is in the normal position. Each indicator point also includes a series of group selection relays, such as 1510 etc. at point six, which effect individual selection of each group of indicators as the point is seized. A common point selection relay, such as illustrated relay 1500 for point six, controls selection of its associated point as the proper signal is received.

While various methods, arrangements and combinations of control may be effected with the novel indicator system, in the embodiment shown herein, the indicator point six and the switching point twelve are independently arranged to control a common generator unit, that is, the switch at point twelve of the system is adapted to control the starting and stopping of a given generator unit, and the indicators at point six are arranged to provide an indication of the various conditions of operation of the many members of the generator which is operatively controlled by the switch at point twelve. If the attendant desires to start or stop the generator, point twelve is seized and the corresponding code operation key is operated. If the attendant desires to obtain information concerning the operating elements of the generator, point six is selected and the information supplied by the indicators thereat is immediately transmitted by the substation and recorded on the indicator panel at the control station for observation by the attendant thereat.

As previously pointed out, the nature of the information supplied by the indicator at a point may be extremely varied in nature. In an installation such as illustrated herewith, the information may relate to the condition of the generator load, winding, temperature, speed, voltages, oil pressure, bearing temperatures etc.

The control equipment illustrated in the present embodiment is commonly referred to as a two digit selection type which is operative to select any one of 100 substation points (circuit breakers and indicator points in the present example), it being understood that the features of the invention may also be embodied in the conventional one and three digit systems without departing from the scope of the invention.

In the two digit system, the points (circuit breakers and indicator points) are divided into groups of ten whereby each point has a preassigned group and unit number, and selection of the points is accomplished by sequentially transmitting the group and unit identification numbers of the desired point. For example, group one of the points may comprise points 1 to 10, group two may comprise points 11 to 20, group 3 may comprise points 21 to 30, etc. Thus point twelve is the second point in the second group of points and in selecting this point the group selection digit two and the point selection digit two are transmitted in sequential order responsive to operation of the point selection key 120 on the control panel. With seizure of a switching point, such as point twelve, and the subsequent operation of the trip key 406, three pulses are transmitted as the "trip" code and the switch at the seized point is deenergized. With the subsequent operation of the close key 408, five pulses are transmitted as the "close" code and the switch at the seized point is energized.

The indicator points are also seized by operating the selection key individual thereto on the control panel. With operation of the selection key 1400 (Fig. 14) to seize indicator point six, the group code one and the unit code six is automatically transmitted. However, following seizure of the point no further operation by the attendant is necessary, the equipment being automatically effective to cause the indications registered on each of the indicators associated with the seized point to be transmitted to the indicator panel at the control station.

DESCRIPTION OF APPARATUS

The arrangement as shown for purpose of illustration comprises a control office A and a substation B which are interconnected by a single signal channel comprising a pair of line conductors 85 and 86. Control office A includes a control panel which has been previously described herein, from which the attendant may control the operation of the automatic transmitting and receiving equipment at the control office and at the substation. The illustration of the individual points at the controlling office and substation has been restricted to the showing of several points such as points 11, 12, 21 and 22 in the interests of a clear and concise disclosure.

The transmitting and receiving equipment which is disposed at the substation and the control office are somewhat alike, and by reason of the large number of individual elements in each station the general disclosure of this equipment, together with their function, may be best set forth by means of the chart shown below:

*Relay functions*

CONTROL SYSTEM

| Control Station Figs. 1-6, 14 Relay | Substation Figs. 7-12, 15 Relay | Function |
| --- | --- | --- |
| 680 | 1,000 | Line Relay: Connected to the line wires 85 and 86 in parallel, being normally released. Operates when the line is energized for pulsing at either end. |
| 384 | 835 | Receiving relay: Operates at the start of an incoming code. Since it is a slow-release relay, it does not release between impulses but releases only after a code of impulses has been completed. |
| 370, 380 | 825, 830 | Receiving Control Relays: Energize after the first impulse is completed in an incoming code. After selection has been made and locked up they release to terminate the receiving condition. |
| 665 | 1010 | Impulse Sending Relay: Operates to send impulses by energizing the line. |
| 360 | 820 | Sending Control Relay: Controls the operation of the Impulse Sending Relay. |
| 340, 350 | 810, 815 | Sending Drive Relays: Energize at the start of an outgoing code. After the code is completed they release to terminate the sending condition and release the counting chain. |
| 336 | | Lockout and Reset Relay: Operates to cause reset of equipment if dispatcher's office and substation start sending simultaneously, and equipment attempts to send or receive more impulses than can be registered on the counting chain, or if a non-registering or transient code is received. |

*Relay functions*—Continued

CONTROL SYSTEM—Continued

| Control Station Figs. 1-6, 14 Relay | Substation Figs. 7-12, 15 Relay | Function |
|---|---|---|
| 336 | 805 | Lockout Relay: Operates to cause temporary lockout of the substation if two or more stations start sending simultaneously or if a nonregistering group code is received. If two or more stations start sending simultaneously the station sending the highest group selection code causes all other stations to lockout until reset by the dispatcher's office. Also causes lockout of station if equipment attempts to send or receive more impulses than can be registered on the counting chain. |
| 525 | | Alarm Relay: Operates the alarm and the alarm lamp. |
| | 800, 860 | Time Delay Relay: Operates in cascade during a reset operation to delay the sending relays at the Remote Location and allow the Control Location to cut in and perform an operation. These relays are of the extra-slow release type. |
| 670 | 1090 | Group Stop Relay: Stops the impulsing when the correct number of impulses has been sent in the group selection code. |
| 660 | 1080 | Group Code Relay: Locks ups the selected group. |
| 650 | 1070 | Group Check Relay: Stops the impulsing when the correct number of impulses has been sent in the group check code. |
| 640 | 1060 | Point Stop Relay: Stops the impulsing when the correct number of impulses has been sent in the point selection code. |
| 630 | 1050 | Point Code Relay: Locks up the selected point. |
| 624 | 1040 | Point Check Relay: Stops the impulsing when the correct number of impulses has been sent in the point check code. |
| 605 | | Battery Supervision Relay: Normally held energized and releases only when the control power is shut off, operates the reset relay when power is turned on again. |
| 322, 326 | 875, 880 | Start Relays: Operate at the originating and to mark that end as the original starting end. |
| 315 | 870 | Start Relay: Operates at the end conditioned in the receiving state for the present transmission. |
| 310 | 865 | Check Back Relay: Operates to reset the equipment when, in response to a previously transmitted selection code, a different check code is received. |
| 550, 560 | 1130-1140 | Group Selection Control Relays: Operate on termination of an incoming group selection code to connect the counting chain contacts to the coils of the group selection relays. |
| 530, 540 | 1110-1120 | Point Selection Control Relay: Operates on termination of an incoming point selection code to connect the counting chain contacts to the coils of the point selection relays. |
| 280 | | Supervision Control Relay: Operates on termination of an incoming supervision code to connect the counting chain contacts to the coils of the indication control relays. |
| Chain Relays 215-260. | 915-960 | Impulse Counting Chain Relays: Chain relays operate on successive operations of the line relays to count the impulses. Sequence relays operate in succession as the line relays are de-energized after each impulse to cause the counting relays to operate in sequence. |
| 500 | | Check Relay: Operate when check key is operated to cause equipment to send check code of one impulse. |
| 505 | 1100-1105 | Master Check Relay: Relay 1105 operates in response to master check code to cause release of all H relays. Relay 1100 at the substation and relay 505 at the dispatcher's office serve as point selection relays on master check. |
| 510, 610, 620 | | Operation Code Control Relays: Operate to cause equipment to send operation control codes. Relay 620 alone sends trip code—3 imp. Relays 510 and 620 together send close code—5 imp. Relay 610 stops the impulsing when the correct number of impulses have been sent. |
| | 1020-1030 | Supervision Code Control Relays: Relay 1030 starts transmission of supervision code. Relay 1020 stops the impulsing when the correct number of impulses have been sent. |
| 515 | | Indication Agreement Relay: Operates to initiate reset of equipment after the supervision code has been recorded. |
| | 970 | Indication Control Relay: Controls the number of impulses to be sent in the supervision code. Released send three impulses, operated five impulses. |
| 520 | | Anti-Recycling Key: Operates when master control key is held operated until after supervision is received to hold the point selection for further operations and prevents recycling of equipment until control key is released. |
| 600 | 845 | Reset Control: Initiates and terminates the long reset impulse. Relays 600 and 845 operate in conjunction with 850 and 855 to reset substation upon receipt of transient impulses. |
| 390 | 840 | Reset Relay: Operates under control of line relay to energize the auxiliary positive bus and releases to drop all relays being held by this bus. |
| 270 | | Aux. Supervision Control: Operates upon receipt of a supervision code in disagreement with the position of the point indication relay. Causes point indication relay to change position and operates alarm relay 525. |
| | 1095, 1098 | Time Delay Relays: Operate after a control operation to prevent the immediate release of the control MS relays in order to insure complete operation of controlled device. |
| 300, 303 | 850, 855 | Preliminary Protective Pulse Termination Relays: Operate at the end of the preliminary protective pulses and transfer counting chain to normal counting sequence position. |
| 685, 690, 696, 698 | | Line Supervision Relays: Relay 685 (high resistance) is held operated in series with the line relays which are non-operated, from current supplied at the substation, supervising the line. Releases upon an open-line condition or upon a minimum leakage. Relays 690 and 695 control alarms. Relay 698 operates from the alarm key an cuts off the audible alarm. |
| 791, 794 | | Guard Relays: Operate after the point selection key is operated to guard against the possibility of more than one point, code being set up. Relay 791 is point guard and relay 794 is group guard. |
| 290, 295, 297 | | Flashing Alarm Relays: Operate when an automatic change of indication is recorded to cause indication lamp to flash on associated escutcheon. |
| 700, 790 | | Point Start Relay: Operate when selection keys are operated to cause the proper point selection code to be sent. |
| 715, 745 | 1190-1177 | Group Start Relays: Operate when selection keys are operated or when H relays drop to cause the proper group selection code to be sent. |

Relay functions—Continued

CONTROL SYSTEM—Continued

| Control Station Figs. 1-6, 14 Relay | Substation Figs. 7-12, 15 Relay | Function |
|---|---|---|
| 420, 450 | 1150, 1180 | Group Selection Relays: Operate in response to group selection code to prepare the operating circuits for the ten associated point selection relays. |
| 135, 190 | 1200, 1215 | Point Selection Relays: Operate in response to the point selection code to close the individual control and indication circuits. |
| 130, 180 | 1220, 1235 | Point Indication Relays: Operate and release under control of the breaker auxiliary switch to indicate position of the device. |
| 125, 170 | | Point Flashing Alarm Relay: Operates on an automatic change of indication to cause indication lamp to flash. |
| | 1240, 1270 | Automatic Point Start Relay: Normally energized and releases each time the associated device changes position to cause the change of indication to be transmitted to the dispatcher's office. |
| | 1292 | Metering Relay: Operates upon arrival at a metering point to connect metering source to telemetering transmitter. |

INDICATOR SYSTEM

| Relay No. | Function |
|---|---|
| 1700 | Auxiliary Group Selection Relay: Operates when group relays 1430, 1440 AA1, AA2, etc. operate to prepare the office for recording the indications which are subsequently transmitted by the substation. |
| 1605, 1610, 1620 | Indicator Group Selection marking relays: Relay 1605 operates to cause group 1 to be selected. Relay 1610 operates for group 2 and 1620 for group 3. |
| 1680, 1675, 1670, 1665 | Timing Relays: These relays operate to time the pauses in the transmission of indicator impulses to cause reset of the equipment if it stalls. |
| 1730, 1720, 1630 | Indicator Start Relays: These relays operate when an indicator point is selected to release the previous indications and prepare the circuits for recording the new indications. |
| 1625 | Auxiliary Indication Control Relay: Is operated by relay 280 to close the circuit to the annunciator group relays. |
| 1710, 1715 | Indicator Group Release Relays: Operate at the end of each group of annunicator impulses to prepare for selecting the next group or to reset the equipment after the last group is completed. |
| 1A1, 1A2, 2A1, 2A2, 3A1, 3A2 | Group Selection Relays: Operate after the indicator group check code is received to prepare the circuits to the annunciator indication relays. |
| AR1 to AR30 | Indication Relays: Operate to light the individual indicating lamps. |
| 1660 | Matching or Eleventh Counting Chain Relay: Checks for synchronism of operation of substation and control station equipment. |
| At Substation | |
| 1765 | Timing Relay: Relay 1765 in conjunction with relay 810 times the period before the start of each group of indicator impulses, and to time the period between pulses, when an indicator contact is closed to cause relay 835 to release at the office and operate the associated indication relay. |
| 1760 | Indicator Start Relay: Operates to start the sending of each group of indicator impulses. |
| 1755 | Indicator Pause Relay: Operates when an annunciator contact is closed to cause the substation to pause and operate the associated indication relay at the office. |
| 1790, 1500 | Indicator Preparatory Relay: Operate at the start of an indicator operation to prepare the substation equipment for transmitting the subsequent indicator impulses. |
| 1750 | Indicator Stop Relay: Operates at the end of each group of indicator impulses to stop the transmission of impulses. |
| 1510, 1530, 1550 | Indicator Group Selection Relays: Operate in response to the group selection codes transmitted by the office to close the circuit to the proper indicator contacts. |

EXPLANATION OF CODES

All operations are performed by alternate transmission of codes between the control station equipment and the substation, the sequence of the codes when an operation is performed by the operator at the control station being as follows:

| | Control Location Transmits | Remote Location Transmits |
|---|---|---|
| 1 | Group Selection Code | |
| 2 | | Group Check Code. |
| 3 | Point Selection Code | |
| 4 | | Point Check Code. |
| 5 | Operation Code | |
| 6 | | Supervision Code. |
| 7 | Reset Code | |

When the remote location reports an operation to the control location, the codes are transmitted as follows:

| | Control Locations Transmits | Remote Location Transmits |
|---|---|---|
| 1 | | Group Selection Code. |
| 2 | Group Check Code | |
| 3 | | Point Selection Code. |
| 4 | Point Check Code | |
| 5 | | Supervision Code. |
| 6 | Reset Code | |

The reset code always consists of one long impulse. The close control code is always transmitted by the control equipment and comprises a series of five impulses. The trip control code is always transmitted by the control equipment and comprises a series of three impulses. The indication code transmitted by the substation comprises a series of five impulses when the circuit breaker is closed and three impulses when open.

REMOTE CONTROL SELECTION AND OPERATION

A more thorough understanding of the apparatus of the invention will now be had with reference to the drawings and the following detailed description of the functions of the equipment shown thereat, responsive to the operation of a selection key on the control board at the control station. A "ground" symbol is used in the diagrams to indicate positive battery. Also it is noted that the first digit of the identification numbers of the various elements in most instances are indicative of the figure in which the element appears. Variation from this general plan are effected wherever the elements of the new indicator system appear, these elements having been assigned identification numbers in the 1600 and 1700 series. For purposes of brevity of description, the letter "C" will be used hereinafter in lieu of the descriptive term conductor.

With the control office and substation equipment in their normal restored conditions, positive and negative battery are applied by the substation to the signalling channel over a circuit extending from positive battery over resistance 1018, contacts 1011, the winding of line relay 1000, contacts 1014, C85, contacts 666, the winding of line relay 680, the winding of line supervisory relay 685, C31, contacts 325b, C30, resistor 659, contacts 669, C86, contacts 1012, C1361, contacts 888, contacts 873, resistance 872' to negative battery. The circuit characteristics are calculated so as to normally supply energizing current of approximately 2 milliamperes over the signalling channel. Line relays 680 and 1000 are low resistance relays which operate on approximately 6 milliamperes, whereas the line supervision relay 685 is a high resistance relay which operates at approximately 1½ milliamperes. It will be apparent, therefore, that the line supervision path and signalling paths are normally connected in parallel, and that the line relays 680 and 1000 will be normally restored and the line supervision relay 685 will be normally operated. Line supervision relay 685 at its contacts 686 completes an obvious operating circuit for associated relay 695 and this relay is, therefore, also normally operated.

Battery supervision relay 605 is normally energized over a circuit extending from battery over the winding of relay 605 and contacts to ground, and reset relay 390, which is of the slow-to-release type, is normally operated over a circuit extending from battery over the winding of reset relay 390 and contacts 682 to ground. The remaining relays in the control station are normally in the restored condition.

At the substation the line supervision path and signalling path (see Figs. 8 and 10) are connected in parallel and battery potential is connected to the line supervision path. Reset relay 840 is normally operated over a circuit extending from battery over the winding of the relay 840, and contacts 1002 to ground. Also, each of the automatic point start relays 1240 and 1270 inclusive are in the operated position, the circuit for relay 1270, for instance, extending from battery over contacts 1238, the winding of relay 1270, contacts 1239', resistor 1247, contacts 1275', C1292, contacts 1107, to ground. The remaining relays in the substation equipment are normally in the non-operated position.

It will be apparent from the designation on the drawing that the power supply source for certain of the relays at each of the stations is controlled by the reset relay thereat. That is, reset relay 390 at its contacts 392 controls the supply operating potential for each of the relays which is shown connected to a positive potential connection which is identified by an adjacent dot. Similarly, at the substation the relays marked in this fashion are controlled by power source normally completed by contacts 842 on reset relay 840. Thus, with restoration of either of these reset relays 390 or 840, the power supply to the local relays controlled thereby will be released.

LINE SUPERVISION

Line supervisory relay 685 is normally maintained energized by the current supplied by the substation equipment. However, with the event of a short circuit of approximately ten thousand ohms, the current will be insufficient to hold the relay energized and the line supervisory relay 685 will restore and at its contacts 686 will interrupt the energizing circuit for its associate relay 695, and at its contacts 687 will complete an operating circuit for auxiliary supervisory relay 690. Auxiliary relay 690 operates and at its contacts 691 completes an operating circuit over C5 for alarm lamp 415 to notify the attendant that the equipment is no longer in the normal condition. Auxiliary relay 695 at its contacts 697 also completes an operating circuit over C3 to the line supervision lamp 413 to notify the attendant that the line has failed. Positive potential is connected by relay 695 over contacts 697, and 699', C2', contacts 529, conductor 2, the winding of the alarm bell and negative potential to ring the alarm bell 414 whereby audio signalling is also accomplished.

The attendant operates the alarm key which in turn operates relay 698 over the following circuit: battery over the winding of relay 698, C4, contacts 401, C3, contacts 697 to ground. Relay 698 locks over resistor 689, contacts 699 and 697 to ground. The alarm bell is silenced with the opening of contacts 699' by the operated relay 698. The attendant then takes the necesary steps to correct the mishap and to restore the line supervision equipment by removal of the cause.

It should be noted that when relay 690 releases for any reason, relay 695 is released or operates according to whether ground through contacts 318 or 328 is present on lead 22 or appears on lead 22 before the slow-to-release period of relay 695 expires.

OPERATION OF THE EQUIPMENT TO SELECT A SWITCHING POINT

The operation of the equipment to select a switching point has been set forth in detail in the heretofore described Breese et al., application, and accordingly only a brief functional description of the seizure of a switching point, such as point 12, for control of the associated generator equipment is set forth hereat.

As previously pointed out each of the control board selection keys is individual to a given point located at the substation, and the operation of the key effects the transmission by the central office equipment of a given coded signal which is assigned to the associated switching point at the remote substation. With reference to Fig. 1 for example, the selection key 120 is arranged to control the seizure of the switching unit associated with point 12 at the substation. Inasmuch as point 12 is associated with group 2 and is the second point of that group, selection key 120 in its operation is arranged to control transmission of an identifying signal comprising two impulses for the selection of the proper group and to subsequently transmit two impulses for selection of the proper point.

Assuming that the equipment at both of the stations is in the restored condition, with the operation of the selection key 120 by the attendant to seize the switch at point 12 of the equipment, the control office is conditioned for the transmission of an initial set of "key" impulses (three in the given embodiment) for unlocking the substation and control office equipment, this set being immediately followed by the set of group identification pulses (two for the switching point 12 which is in group 2).

With receipt of the first impulse, the equipment at the substation is operative to condition the equipment thereat for acceptance of the incoming coded impulses. As the key or protective impulses are transmitted from the office to the substation, the counting chains at each of the installations are sequentially advanced to unlock the associated equipment whereby with receipt of the following group of identification pulses, the equipment at both stations will be operated to register the group identification numeral. It is to be noted that the protective pulses are prefixed on the group pulses only, and that the equipment is completely conditioned for the entire series of codes to follow with the operation effected by the first protective impulses transmitted. Following registration of the group code, the transmitting equipment at the control office is automatically released and the control station is placed in a receiving condition. The substation equipment upon completion of the registration of the group selection digit releases its receiving members, and initiates operation of the transmitting apparatus thereat to transmit a combination of impulses (two) to the control office which is indicative of the particular group actually selected, this checking operation being known as the group check operation.

The equipment at the control office is operative in response to receipt of the check-back code to compare the original signal as transmitted (two impulses) against the check-back signal received from the substation (two impulses) and upon agreement of the signals is operative to deenergize its receiving equipment and to energize its transmitting equipment to effect transmission of the group of two impulses which are representative of the unit identification number for the circuit breaker 12. In the event of disagreement of the original signal and the check-back signal reset of the equipment is automatically effected and an alarm is sounded to indicate to the attendant that re-selection should be attempted.

The substation equipment operates responsive to the receipt of the two impulses comprising the point selection digit and is effective to register such digit on its recording equipment. A check code of two impulses, known as a point check digit, is thereupon transmitted back to the control office by the substation to indicate that the second point of the seized group has been selected. As transmission of point check digit is completed, the twelfth point is selected.

The equipment at the control office accepts the incoming point check code and effects comparison thereof with the point selection signal transmitted thereby. With determination of the agreement of the signals, the white selection lamp 116 associated with the selected point twelve is illuminated to indicate to the attendant that point twelve at the substation has been seized, and that the circuit for controlling the operation of the switch equipment thereat is prepared for use.

The attendant may now operate the close key (on key) or the trip key (off key) to transmit a corresponding control code to the seized switch at point twelve of the equipment to effect the energization or deenergization of the generator controlled by the switch at that point. With operation of the close key, five impulses are transmitted to operate the switch at point twelve and thereby energize the associated generator equipment. With the operation of the trip key, the transmission of three impulses is effected to release the switch at point twelve and thereby deenergize the associated generator equipment.

Following operation of the switch at the substation to the closed or open position, a close or open indication code is transmitted by the equipment thereat to the control office to illuminate the corresponding red (close) lamp 117 or green (open) lamp 118 to indicate the position of the switch and the condition of the generator unit to the attendant at the central office.

The equipment at the substation is thereafter operative to restore its signalling equipment to normal, and effects a similar restoration of the signalling equipment at the central office. Line supervision equipment is likewise restored to its normal condition.

It is seen therefore that a single signalling channel comprising two trunk conductors (or any medium capable of transmitting impulses) is operative to effect in a first key selecting operation, the transmission of a set of key or equipment unlocking pulses, a set of group selecting code impulses, a set of unit selecting code impulses (these latter impulses being interposed by check impulses for the group and unit selection); and in effecting a further key selection operation, the transmission of a close or trip control code, indication code and supervisory reset code.

In a similar manner the same signalling conductors are utilized by the substation apparatus to transmit signals to the control office to identify the automatic change of position of any circuit breakers or switches which may occur thereat.

Prior to operation of the generator to its "off" or "on" position, it is advisable to provide the attendant with a clear and complete informative picture of the condition of generator unit. Such picture may be obtained by selection key associated with point six which is assigned to provide monitored indications of the condition of the various elements of the generator equipment which is controlled to energize and deenergize by the seizure of point twelve.

OPERATION OF DISPATCH OFFICE ON SELECTION OF A POINT

A. *Initiating equipment operation*

The operation of the equipment at the dispatch office responsive to operation of the selection key 1400 at the control board in the dispatch station to select an annunciator point such as illustrated point six (Fig. 15) at the remotely disposed substation will now be described.

As previously pointed out, each of the control board selection keys is individual to a given point or circuit breaker located at the substation, and the operation of the associated key effects the transmission by the control or dispatch office equipment of a given coded signal which is assigned to the associated circuit breaker at the remote point. With reference to Figure 1, for example, the selection key 1400 is arranged to control the operation of the annunciator equipment associated with point 6 at the substation. According to the previously described code, point 6 is associated with group one and is the sixth point of that group. Therefore, the selection key 1400 which is assigned to control that point is arranged to effect on operation the transmission of the code signal comprising a group selection signal of one impulse and thereafter a point selection signal of six impulses.

Assuming now the operation of selection key 1400 by the attendant with the equipment at both stations in the restored condition, contacts will be closed by the key to complete an operating circuit for the group start relay 715, which extends from battery through resistor 798 over contacts 795, contacts 719', the winding of the group start relay 715, C464, C1471, contacts 1402, C1473 and C89 to positive battery.

Group start relay 715, in its operated condition represents the first group of the ten groups and is arranged to energize whenever a selection key associated with the first group is operated. Since point six is in the first group, the above circuit to start relay 715 effects energization thereof, which operates at its contacts 718 and 719 completes a self-holding circuit and a series operating circuit for the group guard relay 794, which is operative to prevent the simultaneous setting up of more than one group code at one time. The operating circuit for the guard relay 794 extends from battery over the winding of relay 794, contacts 719, the winding of group start relay 715 and contacts 718 to ground. Group guard relay 794 operates and at its contacts 795 opens a point in the operating circuits for each of the group start relays 715 etc., inclusive, to prevent the operation of further group start relays during the selection period presently being accomplished.

Point start relays 700–790, inclusive, each represent one of the ten points of each group and is arranged to operate whenever a selector key associated with its assigned point designation is operated. Thus, in operating the selector key 1400 (which is associated with point 6, the sixth point of the first group), an operating circuit for the sixth point start relay 750 is completed, the circuit therefore extending from battery through resistor 799 over contacts 792, contacts 754', the winding of the point start relay 750, C1472, contacts 1401, C1473 and C89 to ground. The sixth point start relay 750 operates and at its contacts 753 completes a series operating circuit for the point guard relay 791 and itself, which extends from battery over the winding of the point guard relay 791, contacts 754, the winding of the point start relay 750 and contacts 753 to ground. Point guard relay 791 operates and at its contacts 792 opens a point in the operating circuit for each of the point start relays 700–790, inclusive, to prevent the operation of any other of the point start relays until such time as the present selecting operation is completed. It is apparent from the foregoing that the desired group and point digits are now recorded in the point and group start equipment at the control station.

B. Conditioning equipment for signal transmission

In the accomplishment of a supervisory operation, one of the stations initiates the control while the other station receives, checks and operates. Initially it is the control station equipment which is operated to send controlling impulses to the substation, such operation being effected with the energization of a pair of outgoing start relays 322 and 326. An energizing circuit is completed to the outgoing start relays 322 and 326 following recordation of the point and group identification numerals by the point guard relay 791, the operating circuit for the start relays extending from battery over the windings of the start relays 322 and 326, respectively, C16, contacts 793 and 796, C17 and contacts 320 to ground.

Start relay 326 operates and at its contacts 329 completes an obvious self-holding circuit for both of the outgoing start relays to maintain same operated until reset of the equipment is accomplished following completion of the point selection and operation of the associated equipment thereat. Start relay 322 operates and at its contacts 325b opens a point in the previously described operating circuit for the line supervisory relay 685 to effect the release thereof and at its contacts 325a prepares a point in the parallel metering path. At this time therefor only the signaling path has potential applied thereto. Line supervisory relay 685 releases and at its contacts 687 operates its associated auxiliary relay 690 to illuminate the alarm lamp 415 in the manner previously described which indicates that the control station equipment is in the off-normal condition. Relay 695 is held operated at contacts 328. Outgoing start relay 322 in operating also closes its contacts 325c to complete an operating circuit for the sending control relay 360, which circuit extends from battery over the winding of the sending control relay 360, contacts 311, contacts 374, contacts 325c, C32, contacts 674 to ground.

C. Impulse transmission

The line relays at each station are combined in operating relation with an associated impulse sending relay to effect a so-called "pumping" arrangement. That is with initial energization of the pumping circuit a series of impulses are automatically transmitted over the line conductors between the stations until such time as positive action is taken to interrupt such energizing circuit.

The sending control relay 360 now operates and at its contacts 363 connects the initial operating ground to the control station impulse sending relay 665 to energize the impulse pumping arrangement thereat, the circuit therefor extending from battery over the winding of the impulse sending relay 665, contacts 604, contacts 684, conductor 35, contacts 363, contacts 311, contacts 374, contacts 325c, conductor 32, contacts 674 to ground. Additionally, the sending control relay 360 at its contacts 361 completes obvious operating circuits for auxiliary sending drive relays 340 and 350 which are maintained operated until the transmission of the group code impulses is completed and are then deenergized to terminate the sending condition of the equipment. Drive relay 350 at its contacts 352 opens a point in the local metering path for the duration of the signal transmission.

Impulse sending relay 665 operates over the aforedescribed path and at its contacts 667 and 668 completes an operating loop for the local line relay 680 and the line relay 1000 at the substation, the local circuit extending from positive battery through resistor 658, over the contacts 668, rectifier 664, dispatch office line relay 680, resistance 674, contacts 667 and resistor 657 to negative battery. The operating circuit for substation line relay 1000 extends from positive battery through resistor 658 over contacts 668, line conductor 86, rectifier 1006, substation line relay 1000, contacts 1014, line conductor 85, contacts 667 and resistor 657 to negative battery.

The operation of the impulse pumping arrangement will be described only hereat for purposes of clarity and brevity, further repeated description thereof hereinafter being deemed unnecessary. Line relay 680 operates and at its contacts 684 interrupts the operating circuit for the impulse sending relay 665 which being of the slow to release type will responsively restore after a short interval and at its contacts 667 and 668 interrupts the energizing circuit for the line relays 680 and 1000. Thus the length of pulses is mainly determined by the restoring time of the slow-to-release type relay 665. Line relays 680 and 1000 restore and line relay 680 at its contacts 684 re-establishes the operating circuit for the impulse sending relay 665 which reoperates to reenergize line relay 680. The cycle is thereupon reinitiated to effect further pulse transmission and the operation of the arrangement continues until the energizing circuit for the impulse sending relay 665 is subsequently interrupted at another point.

It should be observed that the pulsing of line relay 680 effects intermittent opening and closure at contacts 682 of the circuit of reset relay 390, which being of the extra-slow-to-release type does not release during regular pulsing. Restoration thereof is accomplished as hereinafter described by the transmission of a pulse having an extra long break period.

Referring now the first operation of the line relays 680 and 1000, it is noted that line relay 680 closes its contacts 683 to complete a second energizing circuit for the sending control relay 360 which extends from battery over the winding of sending control relay 360, contacts 363, C35 and contacts 683 to ground.

Each of the stations includes a series of relays arranged in the manner of the conventional telephone counting chain arrangements which are operative in sequence to register the code signal being transmitted or received. Line relay 680 in its first operation at its contacts 681 completes an operating circuit for the first relay 215 of the impulse counting chain at the control office which extends from battery over the winding of relay 215, contacts 213, 208, 204, C368', contacts 338, C38, contacts 282, C39, contacts 391, C40 and contacts 681 to ground.

The first counting chain relay 215 operates and at its contacts 217 prepares a series operating circuit for the first sequence relay 210 of the counting chain, the circuit extending from battery over the first counting chain relay 215, contacts 217, sequence relay 210, contacts 206, C369, and contacts 351 to ground. The sequence relay, however, is inoperative by reason of the shunt imposed by the original operating circuit for the counting chain relay 215. The annunciator control circuit which extend over the contacts such as 1646 on each of the counting chain relays, are presently interrupted by the open contacts on relay 1700 and accordingly the annunciator control circuits are not energized during the preliminary point seizure runs of the chain.

The initial step in the generation of the circuit protective pulses and the local registration thereof has now been effected at the control station.

D. *Substation operation*

The aforedescribed circuit operations are effected at the control station without influence on the sub-station equipment. However, with the first energization of the line relays 680 and 1000, the sub-station equipment is immediately conditioned for receipt of an incoming set of signal pulses.

Specifically, line relay 1000 in operating is effective at its contacts 1001 to complete an operating circuit for a receiving relay 835 which extends from battery over the winding of relay 835, contacts 813, 823, 843, C1366 and contacts 1001 to ground. Receiving relay 835 at its contacts 1772 prepares a circuit for the annunciator control equipment which is not rendered effective unless an annunciating point is selected by the equipment. The receiving relay is of the slow-to-release type and remains operated for the period that the incoming set of protective and group selection impulses are received. It should be observed that the pulsing of line relay 1000 intermittently opens and closes the circuit of reset relay 840 at contacts 1002 but said relay, being of the extra-slow-to-release type does not release during regular pulsing, requiring receipt of a longer open period (the reset pulse as explained hereinafter) before release is effected.

The sub-station equipment also includes a counting chain arrangement which is operative to record the incoming signals received over the channel from the dispatch office. Line relay 1000 is operative in its first energization to complete an energizing circuit for the first counting chain relay 915 which extends from battery over the winding of the first chain relay 915, contacts 912, 907, 902, C1303, contacts 808, contacts 843, conductor 1366, and contacts 1001 to ground.

The first counting chain relay 915 operates to complete a series operating circuit for the first sequence relay 910 of the counting chain, which circuit extends from battery over the winding of counting chain relay 915, contacts 918, the winding of the sequence relay 910, contacts 909, C1304, contacts 809, contacts 814, C1357, and contacts 1083 to ground. Sequence relay 910 is inoperative by reason of the shunt imposed thereon by the original operating circuit for the counting chain relay 915. The annunciator control circuits extending through the contacts, such as 1807 in the counting chain relays, are held ineffective at another point until the point selection is completed.

An incoming start relay located at each station is arranged to operate on receipt of an incoming set of impulses to condition the equipment for the duration of the receipt of such impulse set. Counting chain relay 915 in operating is effective at its contacts 916 to complete an operating circuit to the substation incoming start relay 870 at this time, the circuit extending from battery over the winding of the start relay 870, C1310, contacts 916, C1309 and contacts 883 to ground. Start relay 870 operates and at its contacts 871 completes an obvious self-holding circuit to ground, and at its contacts 873 interrupts the line supervision path locally, the circuit having been previously interrupted at the control station by contacts 325b. The substation equipment is now prepared to receive the impulse series from the control office.

Summarily, it is noted that the operation of selection key 120 has therefore effected registration of the group and point selection digits at the control station, has effected the operation of the line relays 680 and 1000, has placed the substation in the receiving condition and the control station in the sending condition, has initiated the operation of the impulse pumping arrangement; and has signalled the attendant that such operations are proceeding.

As will be hereinafter explained, the equipment at each station in its normal condition is electrically locked in a manner whereby the counting chain relays are operative responsive to receipt of transient pulses, but are ineffective to operate any of the controlled equipment, such as the substation circuit breakers. The counting chains are rendered selectively operative only by the transmission of a given set of key or compensating protective impulses.

It should be noted that in the present embodiment the first three impulses transmitted are compensating protective pulses which, when prefixed to the group selection digit, unlock the equipment to permit response of the counting chain to the active group selection digit.

Referring once more to the equipment at the control office, it will be recalled that with the operation of line relay 680 thereat, contacts 684 were operated to interrupt the operating circuit for the impulse sending relay 665 to thus continue the first pumping cycle. Relay 665 accordingly restores after a brief time period and at its contacts 667 and 668 interrupts the energizing circuit for the line relays 680 and 1000 at the respective stations. Line relay 680 restores and at its contacts 681 interrupts the initial energizing circuit for counting chain relay 215 to remove the heretofore described shunt circuit for the sequence relay 210. Sequence relay 210 now operates in series with the first counting chain relay 215 over the prepared series circuit heretofore described.

Line relay 1000 at the substation is released with line relay 680 and with the opening of the contacts 1001 responsive to release of the line relay 1000, the initial energizing circuit for counting chain relay 915 and the shunt circuit for sequence relay 910 is opened. Sequence relay 910 now operates in series with the first counting chain relay 915 over the prepared circuit heretofore described.

Sequence relay 910 in operating is effective at its contacts 911 to complete an operating circuit for the receiving control relay 830 for the substation, which circuit extends from battery over the winding of the receiving contact relay 830, conductor 1306, contacts 911, conductor 1305, contacts 838 of the receiving relay to ground. Receiving control relay 830 operates and at its contacts 832 completes an obvious operating circuit for an auxiliary control relay 825.

It is to be noted at this time that the receiving relay 835 is slow-to-release and accordingly remains operated for the duration of the presently received impulses. Auxiliary receiving control relays 825 and 830 are adapted to be maintained energized by the counting chain sequence relays until the impulses have terminated and group selection has been made. Subsequent to such selection, the receiving relays 825, 830 and 835 are restored to terminate the receiving condition of the equipment.

Briefly then, after the break portion of the first impulse is received by the line relays 680 and 1000, a first counting chain relay and a first sequence relay at each of the stations are maintained energized by series operating circuits.

It is apparent that with the restoration of the line relay 680, contacts 684 are reclosed to recomplete the operating circuit for the impulse sending relay 665. Impulse sending relay 665 once more reoperates, and at its contacts 667 and 668 effects reclosure of the energizing circuit for the line relays 680 and 1000 at the respective stations. Thus, one pumping cycle has been completed and a new cycle started.

As control station line relay 680 reoperates a second time, it is effective at its contacts 681 to complete an operating circuit for the second counting chain relay 220 over a circuit extending from battery over the winding of relay 220, contacts 218, contacts 212, contacts 208, contacts 204, C368', contacts 338, C38, contacts 282, C39, contacts 391, C40 and contacts 681 to ground. Counting chain relay 220 operates and at its contacts 223 prepares a series operating circuit for the second sequence relay 205, such series circuit extending from battery over the winding of the second counting chain relay 220, contacts 223, winding of relay 205, contacts 202, C369, and contacts 351 to ground. Sequence relay 205 is prevented from operating, however, by the shunt arrangement effected by the initial operating circuit for the second counting chain relay 220.

A similar circuit operation occurs at the substation with the operation of the line relay 1000, the closing of its contacts 1001 being effective to complete an operating circuit for the second of the counting chain relays thereat, the circuit extending from battery over counting chain relay 920, contacts 917, contacts 913, 907, 902, C1303, contacts 808, 843, C1366 and contacts 1000 to ground. The counting chain relay 920 in operating prepares a circuit for the second sequence relay 905, which circuit extends from battery over counting chain relay 920, contacts 922, sequence relay 905, contacts 904, C1304, contacts 809, 814 C1357, contacts 1083 to ground. The sequence relay, however, is prevented from operating by the shunt imposed thereupon by the initial operating circuit for the second chain relay 920. Summarily then, responsive to the second energization of the series line relays 680 and 1000, the first and second counting chain relays and the first sequence relay at each station have been operated and the second sequence relay at each station is prepared.

As the pumping operation of the arrangement at the dispatch office continues, the line relays 680 and 1000 are released for the second time and line relay 680 at its contacts 681 interrupts the original energizing circuit for the counting chain relay 220 to remove the shunt for sequence relay 205, which immediately energizes in series with the second counting chain relay 220 over the described circuit. Sequence relay 205 at its contacts 206 interrupts the energizing circuit for the first sequence relay 210 and the first counting chain relay 215 to effect the restoration thereof.

The simultaneous release of the line relay 1000 at the substation effects the opening of contacts 1001 and the interruption of the shunt circuit for the second sequence relay 905 to effect the immediate operation thereof in series with the second counting chain relay 920. Sequence relay 905 in operating is effective at its contacts 909 to interrupt the operating circuit for the first sequence relay 910 and the first counting chain relay 915 to effect restoration thereof.

The pumping operation continues and line relay 680 and line relay 1000 are energized a third time. Line relay 680 at the dispatch office is operative at its contacts 681 to complete an operating circuit for the third counting chain relay 225, which extends from battery over the winding of relay 225, contacts 224, contacts 207, contacts 204, C368', contacts 338, C38, contacts 282, C39, contacts 391, C40, and contacts 681 to ground. The third counting chain relay 225 operates and at its contacts 228 prepares an operating circuit for the third sequence relay 200, which extends from battery over the counting chain relay 225, contacts 228, the winding of sequence relay 200, contacts 211, C369, and contacts 351 to ground. The sequence relay is held inoperative, however, by the shunt which is imposed thereon by the initial operating circuit for the counting chain relay 225.

In a similar manner, with the third energization of the line relay 1000 at the substation, the third counting chain relay 925 is operated over a circuit which extends from battery over the winding of counting chain relay 925, contacts 921, contacts 908, contacts 902, C1303, contacts 808, 843, C1366, contacts 1001 to ground. Counting chain relay 925 operates, and at its contacts 928 prepares an operating circuit for the third sequence relay 900 which extends from battery over counting chain relay 925, contacts 928, sequence relay 900, contacts 914, C1304, contacts 809, 814, C1357, and contacts 1083 to ground. Sequence relay 900 is held inoperative by the shunt imposed thereon by the original energizing circuit for the counting chain relay 925.

With the third release of the line relays 680 and 1000 as the pumping action of the arrangement at the control office continues, line relay 680 at its contacts 681 opens the original energizing circuit for the counting chain relay 225 and operation of the third sequence relay 200 is effected. Sequence relay 200 operates and at its contacts 202 interrupts the energizing circuit for the second counting chain relay 220 and the second sequence relay 205, which accordingly restore.

With the operation of the third counting chain relay 225 and the third sequence relay 200, the three compensating protective pulses have been registered at the control station and the counting chain may now be arranged to respond to the group digit which is about to be transmitted. The transfer of the counting chain to receive the group digit is effected by the set of so-called "preliminary protective pulse terminating" relays 300 and 303. Energization of these transfer relays is now effected by the third sequence relay over a circuit which extends from battery over the winding of relay 300, contacts 304, C355, contacts 226', contacts 201, C369, contacts 351, to ground. Preliminary protective relay 300 operates and at its contacts 301 prepares a circuit for auxiliary transfer relay 303, which is now shunted by the operating circuit for the first protective relay 300.

Similarly, with the third release of the line relay 1000 in the substation contacts 1001 are opened to interrupt the shunt circuit for the third sequence relay 900 to thereby effect the operation thereof in series with the third counting chain relay 925. Sequence relay 900 at its contacts 904 is operative to interrupt the holding circuit for the second sequence relay 905 and the second counting chain relay 920 to effect restoration thereof.

Sequence relay 900 and counting chain relay 925 in operating are also effective at their contacts to close an operating circuit for a preliminary protective pulse terminating relay 850 thereat which in operating unlocks the equipment by conditioning the counting chain system for registration of the group selection digit about to be received. The operating circuit extends over battery winding of relay 850, contacts 858, C1314, contacts 926, contacts 904', C1304, contacts 809, 814, C1357 and contacts 1083 to ground. Relay 850 in operating is effective at its contacts 851 to prepare a series operating circuit for an auxiliary protective relay 855 which is inoperative at the present time by reason of the shunt imposed by the original operating circuit for the protective relay 850. Summarily, with the third release of the line relay, the third counting chain and third sequence relays at each station are operated and the preliminary protective pulse terminating relays thereat are operated to condition the equipment for receipt of the functional impulses.

As the pumping operation continues, the relay 680 and line relay 1000 at the respective stations are operated a fourth time and line relay 680 at its contacts 681 effects the re-operation of the first counting chain relay 215 over a circuit extending from battery, first counting chain relay 215, C356, contacts 306, C359, contacts 229, contacts 203, C368', contacts 338, C38, contacts 282, C39, contacts 391, C40 and contacts 681 to ground. Counting chain relay 215 operates and prepares a series operating circuit with the first sequence relay 210 in the manner heretofore described. Sequence relay 210, however, is maintained inoperative at the present time by reason of the shunt imposed thereon by the operating circuit of the counting chain relay 215.

In a similar manner, the operation of the line relay 1000 at the substation is effective to close contacts 1001 to complete a circuit for again operating the first counting chain relay 915, the circuit extending from battery over the winding of counting chain relay 915, C1307, contacts 859', C1312, contacts 927, contacts 903, C1303, contacts 808, 843, C1366, and contacts 1001 to ground. The first counting chain relay 215 in operating prepares a series operating circuit with the first sequence relay 910 as heretofore described, which is ineffective at the present time by reason of the shunt imposed thereupon by the completed operating circuit for the counting chain relay 915. The first counting chain relay 215 operates and at its contacts 216 completes an operating circuit for the group stop relay 670, which circuit was previously prepared by the registration of the group selection digit 1 responsive to the operation of selection key 1400.

Group stop relay 670, as its name indicates, is arranged to terminate the operation of the pumping arrangement when the number of impulses corresponding to the registered group digit have been transmitted. Inasmuch as the equipment has been unlocked by the three compensation pulses and the registered group digit 1 has been transmitted, the group stop relay 670 now operates over a circuit which extends from battery over the winding of relay 670, contacts 672, C19, contacts 323, C18, contacts 717, C6, contacts 216, 221, C357, contacts 308, C8, contacts 227, 231, 236, 241, 246, 251, 256, 261, C364, contacts 302, contacts 372 and contacts 331 to ground. Group stop relay 670 locks up over an obvious self-holding circuit which extends over contacts 671 to ground. Group stop relay 670 at its contacts 674 also opens one of the energizing circuits for the sending control relay 360.

As the line relay 680 now restores for the fourth time, it is effective at its contacts 681 to open the shunt circuit for the first sequence relay 210 to effect operation thereof. Sequence relay 210 operates and at its contacts 211 opens the energizing circuit for the third counting chain relay 225 and the third sequence relay 200, which responsively restore. Sequence relay 200 and counting chain relay 225 in releasing interrupt the shunt circuit for the second protective relay 303 which thereupon operates over the series circuit prepared by its associated protective relay 300.

Line relay 680 also at its contacts 683 opens the second holding circuit for the sending control relay 360, thus effecting release thereof to terminate the impulse transmission. Specifically, sending control relay 360 at its contacts 363 opens the operating circuit for impulse sending relay 665 and the relay is restored to end the transmission of the present set of impulses. Sending control relay 360 at its contacts 361 opens the operating circuits for the sending control relays 350 and 340 to effect the release thereof. Sending control relay 350 restores, and at its contacts 351 interrupts the holding circuit for the first counting chain relay 215 and the first sequence relay 210 to restore same. Relay 340, being of the slow-to-release type, holds the circuit to ground through contacts 343 open for a time period which is sufficient to permit relays 215 and 210 to release.

Referring now to the equipment at the substation, with the fourth and final release of the line relay 1000, the first sequence relay 910 operates in series with the counting chain relay 915 over the prepared series circuit. Sequence relay 910 operates and at its contacts 914 opens the holding circuit the third counting chain relay 925 and the third sequence relay 900 to restore same. Sequence relay 900 and counting chain relay 925 at their contacts 926 and 904' interrupt the shunt circuit for the protective relay 855 to effect the operation of the two protective relays 850 and 855 in series over an obvious circuit. Further, in response to the termination of the impulse transmitting operations at the control station, the line relay 1000 will be maintained inoperative for a comparatively long period of time, and the energizing circuit for the receiving relay 835 will be interrupted by open contacts 1001 for an interval of time which is sufficient to effect the restoration thereof.

The group selection is now made which corresponds to the value of the group digit received (one). Receiving relay 835 in restoring is therefore effective at its contacts 837 and at its contacts 839' to complete an operating circuit for group selection control relays 1130 and 1140, which circuit extends from battery over the respective windings of the relays 1130 and 1140, C1349, contacts 1071, 1061, C1364, contacts 857, 839', 833, C1355, contacts 1035, C1360, contacts 837 to ground. The group selection control relays 1130 and 1140 operate and lock themselves to ground over the contacts 1136, C1350, contacts 1076, C1353, contacts 874 to ground. Operation of the group selection control relay 1130 in turn effects the operation of group selection relays 1150 and 1160, which in their operation represent the receipt of the group selection digit one. The energizing circuit extends from battery over the windings of the respective group selection relays 1150 and 1160, contacts 1131, C1329, contacts 919, 924, 929', 934, 939, 944, 949, 954, 959, 964, C1311, contacts 852 and 827 to ground, it being apparent therefrom that the operated one of the counting chain relays is effective to determine the group selection relay to the operated.

Group selection relays 1150 and 1160 operate, and relay 1150 at its contacts 1156 completes an operating circuit for the group code relay 1080, which circuit extends from battery over the winding of relay 1080, C1348, contacts 1156, contacts 1131, C1329, the counting chain relay contacts 919, 924, 929', 934, 939, 944, 949, 954, 959, 964, C1311, contacts 852 and contacts 827 to ground.

It is important, of course, that the selected group be maintained energized for the final selecting operation, but it is also necessary to have a free counting chain system for translating the further identifying supervisory signals which are necessary to accomplishment of point selection and, accordingly, a group code relay 1080 is provided for locking up the selected group relays 1150 and 1160. Group code relay 1080 now operates and at its contacts 1082 completes an obvious self-holding circuit and the desired holding circuit for the group selection relays 1170 and 1180. Group code relay 1080, at its contacts 1083, also opens the series holding circuit of the first counting chain relay 915 and the first sequence relay 910, which are responsively restored, whereby the counting chain is freed for further use. Sequence relay 910 in restoring is operative at its contacts 911 to effect the restoration of the receiving control relay 830. Receiving control relay 830 restores and at its contacts 832 effects the restoration of its auxiliary relay 825.

E. *Group check-back transmission*

As previously pointed out, the serious nature of the consequences which may result from improper operation of the equipment necessitates the provision of many extra safeguards. One of these safeguards comprises the transmission of a "check-back" signal to the control station, which is indicative of the group actually selected at the substation. Conditioning of the substation for such signal transmission is initiated by the restoration of receiving control relay 825 at this time which, at its contacts 826, completes an operating circuit for the sending control relay 820. The operating circuit therefor extends from battery over relay 820, contacts 826, C1358, contacts 1081, 1073, 1063 to ground.

Sending control relay 820 operates and at its contacts 822 extends its operating ground to energize the sending relay 1010 over C1365, contacts 1004, C1369, contacts 846, C1368 and the winding of the relay 1010 to battery, Sending control relay 820 at its contacts 821 also effects the operation of the sending drive relays 815 and 810. The substation has now been converted from the receiving to the transmitting condition and the check-back signal transmission is initiated.

Sending relay 1010 operates and at its contacts 1013 and 1015 completes an operating circuit for the line relays 680 and 1000, the operating circuit for relay 1000 extending from positive battery through resistor 1013', over contacts 1013, rectifier 1006, line relay 1000, resistance 1007, contacts 1015, and through resistor 1015' to negative battery; the operating circuit for line relay 680 at the control office extending from positive battery through resistor 1013' over contacts 1013, line C86, rectifier 664, line relay 680, contacts 666, line C85, contacts 1015 and through resistor 1015' to negative battery.

Substation line relay 1000 operates and at its contacts 1004 interrupts the operating circuit for the impulse sending relay 1010 and at its contacts 1003 completes a holding circuit for sending control relay 820, which extends from battery over the winding of relay 820, contacts 822, C1365, contacts 1003 to ground.

Line relay 1000 at its contacts 1001 also completes an operating circuit for the first relay of the counting chain which extends from battery over counting chain relay 915, contacts 912, 907, 902, C1303, contacts 808, contacts 843, C1366, and contacts 1001 to ground. The counting chain relay 915 operates and prepares a series operating circuit for the first sequence relay 910 in a manner heretofore described, which relay is inoperative by reason of the shunt imposed thereupon by the completed operating circuit for the first counting chain relay 915. In that the point selection being made in this operation is in group one, and in that the group identification digit received was digit one, only one impulse is therefore returned as the check signal.

Therefore counting chain relay 915 at its contacts 919 completes an operating circuit for the group check relay 1070, which circuit extends from battery over the winding of group check relay 1070, contacts 1052, C1356, contacts 881, 828, 852, C1311, contacts 964, 959, 954, 949, 944, 939, 934, 929', 924, 919, C1329, contacts 1131, 1156, C1348 and contacts 1082 to ground. The group check relay is operative to terminate the check-back signal transmission at the proper time, the time of operation of the group check relay being determined by the particular group identification signal which has been registered on the group selection relays. In the present example, group 1 has been registered as the group desired, and therefore the operated group selection relay 1150 controls energization of group check relay 1070 to terminate impulse transmission as a single check impulse has been transmitted to the control station. Group check relay 1070 operates and at its contacts 1075 completes a self-holding circuit which extends over C1353 and contacts 874 to ground. Group check relay 1070 at its contacts 1076 interrupts the holding circuit for the group selection control relays 1130 and 1140, which responsively release.

Referring to the equipment at the control office, it is noted that responsive to receipt of the first energizing impulse from the substation, line relay 680 thereat operates over the loop circuit described, and at its contacts 681, effects the operation of the receiving relay 384 over a circuit extending from the battery over the winding of receiving relay 384, contacts 342, contacts 362, C38, contacts 282, C39, contacts 391, C40, contacts 681 to ground. Line relay 680, in operating, is also effective at its contacts 681 to complete an operating circuit for the first counting chain relay 215, which circuit extends from battery over the winding of relay 215, contacts 213, 208, 204, C368', contacts 338, C38, contacts 282, C39, contacts 391, C40, contacts 681 to ground. Counting chain relay 215 operates and prepares a series operating circuit for the first sequence relay 210, which is presently shunted by reason of the completion of the original operating circuit to the counting chain relay 215. The annunciator circuit controlled by the contacts such as 1646 are still held ineffective by the annunciator control relays.

The receiving relay 384 operates, and at its contacts 387 completes an operating circuit to check-back relay 310, which circuit extends from battery through resistor 310' over the winding of relay 310, C1696, contacts 1729, C1695, contacts 387, contacts 324, C24, contacts 614 to ground. It is noted that control of the check-back relay 310 is offered to the annunciator start relay 1720 at contacts 1729 as subsequently operated. Check-back relay 310 is arranged to reset the equipment when the returned check-back code is different than the digit transmitted. Check-back relay 310 operates and locks over an obvious self-holding circuit extending over contacts 313, contacts 324, C24, and contacts 614 to ground.

The dispatch office equipment has now responded to receipt of the single impulse group check signal which was automatically transmitted by the substation equipment. With reference to the equipment at the substation, it will be noted that the pumping arrangement similar to that at the control station arrangement, was energized by the impulse sending relay 1010 and the line relay 1000. With each release of relay 1010, the contacts 1013 and 1015 thereof are opened to interrupt the operating circuit for line relay 1000. Line relay 1000 releases and, at its contacts 1004, completes an energizing circuit for sending relay 1010. Sending relay 1010 then operates and, at its contacts 1013 and 1015, re-establishes an operating circuit for line relay 1000; line relay 1000 operates and, at its contacts 1004, interrupts the sending relay 1010 to cause it to restore. As previously pointed out, the operation of this arrangement is initiated by the operation of the sending control relays thereat and the automatic transmission of impulses will be effected thereby until interrupted by the equipment at the substation. In that the point selection being made by the control station is in the first group however the group identification digit is one and only one impulse is therefore returned in the check.

As the sending relay 1010 releases following transmission of the one and only impulse, the energizing circuit for the line relays 680 and 1000 are opened and line relays 680 and 1000 restore. Restoration of the line relay 1000 effects the opening of its contacts 1001 and the removal of the shunt from the first sequence relay 910 to effect operation thereof in series with the first counting chain relay 915. The group check relay 1070, having operated during the previous energization of the line relay 1000 has opened one of the energizing circuits for the sending control relay 820 to prepare the release thereof with the following restoration of the line relay 1000, such interruption being accomplished by the opening of its contacts 1073. As the line relay 1000 now restores, contacts 1003 are opened and the second holding circuit for the sending control relay 820 is interrupted.

Sending control relay 820 releases and at its contacts 821 interrupts the operating circuits for the sending drive relays 810 and 815, respectively. Relay 815 releases and at its contacts 816 interrupts the holding circuit for the first sequence relay 910 and the first counting chain relay 915 to effect the restoration thereof. Relay 810 is of the slow-to-release type and holds its contacts 814 open for a time period sufficient to permit relays 910 and 915 to release. The transmission of pulses by the relay pumping arrangement at the substation is thus terminated after the transmission of a coded signal of one impulse which is indicative of the particular selection signal received by the substation equipment.

At the dispatch office, the release of the line relay 680 effects the opening of contacts 681 and the removal of the shunt circuit from the sequence relay 210. Sequence relay 210 responsively operates in series with first counting chain relay 215 over the circuit prepared thereby. Sequence relay 210 at its contacts 214 completes an operating circuit to the receiving control relay 380, which extends from battery over relay 380, C368, contacts 214, C369′, contacts 385, C1694, contacts 1706 to ground. The receiving control relay 380 operates and at its contacts 382 establishes a self-holding circuit which extends from battery over the winding of the relay 380, C368, sequence relay contacts 214, C369′, and contacts 382 to ground. Receiver control relay 380, at its contacts 381 completes an obvious energizing circuit for an auxiliary relay 370.

The prolonged release of line relay 680 as the result of the termination of the impulse transmission by the substation effects the restoration of the slow-to-release receiving relay 384 and the comparison of the transmitted group signal and the check-back group signals is effected. Assuming first that the proper check-back signal is received, as relay 384 is released following termination of the impulses, contacts 386 are closed to complete operating circuits for the group selection control relays 550 and 560, the energizing circuit therefor extending from battery over the windings of the relays 550 and 560 over C56, contacts 656, 646, C27, contacts 304′, 383, 386 and 1687 to ground.

Group selector control relay 550, in operating, is effective at its contacts 551 to complete an operating circuit for the group selection relays 440 and 450 over a circuit which extends from battery over the windings of relays 440 and 450, C75, contacts 551, C6, contacts 216, 221, 226, 231, 236, 241, 246, 251, 256, 261, C364, contacts 302 and 371 to ground.

Group selector control relay 550 at its contacts 555 completes a shunt circuit for check-back relay 310 to effect the release thereof, the shunt circuit extending from battery over the 500 ohm resistance 310′, C50, contacts 555, C57, C19, contacts 323, C18, contacts 717, C6, contacts 216, 221, 226, 231, 236, 241, 246, 251, 256, 261, C364, contacts 302 and contacts 371 to ground. Check-back relay 310 accordingly releases.

Group selection relay 450 operates and at its contacts 451 completes an operating circuit for group code relay 660 by extending its operating ground which appears on C75 over contacts 451, C54, to the winding of group code relay 660 and battery. Group code relay 660 operates and at its contacts 661 completes a self-holding circuit and a holding circuit for group selection relays 440 and 450. Group code relay 660 at its contacts 662 interrupts the holding circuit for the operated counting chain relay 215 and the operated sequence relay 210 which release. Relay 210 at its contacts 214 interrupts the holding circuit for the receiving control relay 380 to effect the restoration thereof.

Receiving control relay 380 releases and at its contacts 381 effects the release of auxiliary control relay 370. Receiving control relay 380 is also effective at its contacts 383 to interrupt the holding circuit for the group selection control relays 550 and 560 to effect the restoration thereof. Auxiliary control relays 370 restores and at its contacts 374 effects the operation of sending control relay 360.

In the event that a check-back digit other than the digit "one" is received by the control station, the counting chain will advance to a relay other than relay 215 and the aforedescribed operations will not be effected. For example, supposing digit "two" instead of digit "one" is returned, the counting chain will advance to the second relay and following termination of the impulse, counting chain relay 220 will be in the operated condition. As receiving relay 384 restores, the group selection relays 550 and 560 are responsively operated as described. Group selection relay 550 prepares the circuit for shunting the check-back relay 310, but such circuit is not completed in that the first counting chain relay is inoperative and its contacts 216 are held open. The circuit completed by contacts 222 moreover is interrupted by the open contacts 727 of the restored group start relay 725 and consequently the check-back relay 310 remains operated.

Thus, as the equipment operates as described above to eventually restore auxiliary control relay 370 and close contacts 374, the circuit to the sending relay for initiating the transmission of the point selection digit will be interrupted by the open contacts 311 of the check-back relay 310. In addition, to preventing operation of the sending control relay 360 to send the point selection digit, check-back relay 310 at its contacts 312 completes an operating circuit to reset relay 600, which circuit extends from battery over the reset relay winding, contacts 608, C29′, contacts 312, 374, C33, contacts 663, 654 and 644 to ground. Reset relay 600 operates in the manner described hereinafter to restore both stations to the normal condition and to so inform the operator.

It is seen from the foregoing that unless the corresponding sequential relay of the group start relays and the corresponding sequential counting chain relays are operated following receipt of the check-back signal, the equipment will be restored and further selection temporarily terminated.

Summarily then, at this point it will be noted that if the group check signal transmitted by the substation is correct, the equipment at the dispatch station will accept the group check code and having determined the accuracy of the signal will prepare to transmit the point selection code "6" which was previously established as a result of the operation of the selector key 120.

F. *Transmission of point selection code*

In the event the agreement of the check-back group signal with the group signal recorded, the selection of the sixth point in the first group is now accomplished by the transmission of the identifying point selection digit "6." Sending control relay 360 is operated over the circuit extending from battery over the winding of the control relay 360, contacts 311, contacts 374, C33, contacts 663, 654, 644 to ground. Sending control relay 360 operates and extends its operating ground to the impulse sending relay 665, the energizing circuit extending over contacts 363, C35, contacts 684, contacts 604 and the winding of relay 665 to battery. The control office is now prepared to transmit the point selection code to the substation much in the manner that the group selection code was transmitted, with the exception that the code at this time is not preceded by the protective impulse series.

Sending control relay 360 at its contacts 361 completes obvious circuits for the sending drive relays 350 and 340. The control station impulse pumping arrangement is once more energized by the sending control relay 360 at its contacts 363 whereby line relays 630 and 1000 are energized to provide the first impulse of the point selection code. Line relay 680 is operative at its contacts 681 to complete the aforedescribed circuit to the first counting chain relay 215. Counting chain relay 215 operates and in turn prepares a series circuit for the first sequence relay 210, which is presently shunted by the completed operating circuit for the counting chain relay 215.

At the substation, the first operation of the line relay 1000 in response to the point selection code is effective to close contacts 1001 and thereby effect the operation of the receiving relay 835 and the first counting chain relay 915 over the circuits previously described. The receiving relay 835 operates and once more conditions the equipment for receipt of a series of impulses from the dispatch office. Counting chain relay 915 operates and at its contacts 918 prepares an operating circuit for the first sequence relay 910, which is presently shunted by the completed operating circuit for the counting chain relay 915.

As the control station impulse sending relay 665 effects the first release of the line relays 680 and 1000 for this code, line relay 680 is effective at its contacts 681 to open the shunt circuit for the first sequence relay 210 to thereby effect the operation of relay 210 in series with the first counting chain relay 215. Similarly, at the substation the release of the line relay 1000 is effective to open the contacts 1001 and remove the shunt for the sequence relay 910 to effect the operation of relay 910.

With the second energization of the line relays 680 and 1000, the control station line relay 680 is effective at its contacts 681 to complete an operating circuit for the second counting chain relay 220. Counting chain relay 220 operates and at its contacts 223 prepares a series operating circuit for the second sequence relay 205 which is presently held inoperative by reason of the shunt imposed thereupon by the initial operating circuit for the counting chain relay 220.

The dispatch office impulse pumping arrangement continues in its operation of the line relay 680 and 1000 at this manner and affects advancement of the counting chains at the dispatch station and substation to the sixth counting chains 240 and 940 respectively.

Inasmuch as the point to be selected is the sixth point of the first group, as the six impulses have been transmitted, the equipment prepares to terminate the impulse transmission by operating the point stop relay 640. Counting chain relay 240 at its contacts 243 prepares a circuit to its associated sequence relay 200 which is held inoperative by the shunt effected by the operating circuit for counting chain relay 240; at its contacts 242 completes an operating circuit for the point stop relay 640, the circuit therefore extending from battery over the winding of relay 640, contacts 642, C34, contacts 344, contacts 325, C48, contacts 452, C16', contacts 701, 711, 721, 731, 741, 752, C11, contacts 242, 246, 251, 256, 261, C364, contacts 302, contacts 372 and contacts 331 to ground. Point stop relay 640 operates and at its contacts 641 completes an obvious self-holding circuit to ground, and at its contacts 644 opens the energizing circuit for the sending control relay 360.

At the substation the sixth energization of line relay 1000 effects the closure of contacts 1001 and the completion of an operating circuit to the sixth counting chain relay 940 which operates and prepares a series circuit for its associated sequence relay 900, which is maintained inoperative by the shunt imposed thereupon by the completed operating circuit of the counting chain relay 940.

As the line relays 680 and 1000 release for the sixth time, line relay 680 is effective at its contacts 681 to interrupt the shunt circuit for the third sequence relay 200 to effect the operation thereof. Relay 200 operates and at its contacts 202 interrupts the holding circuit for the fifth counting chain relay 235 and the second sequence relay 205 to effect the restoration thereof. Line relay 680 at its contacts 683 also interrupts the second energizing circuit for the sending control relay 360. Inasmuch as the point stop relay 640 has interrupted the first energizing circuit therefor, the relay 360 is restored. Relay 360 at its contacts 361 interrupts the operating circuits for the sending drive relays 350 and 340 which responsively release. Drive relay 350 at its contacts 351 interrupts the holding circuit for the sixth counting chain relay 240 and the third sequence relay 200 to effect the restoration thereof.

As the line relay 1000 is restoring for the sixth time in the series, the shunt circuit for the third sequence relay 900 is interrupted to effect operation of the sequence relay 900 over a circuit extending from battery over the winding of the sixth counting chain relay 940, contacts 942, sequence relay 900, contacts 914, C1304, contacts 809, contacts 814, C1357 and contacts 1055, 1074 and 1063 to ground. Sequence relay 900 operates and at its contacts 904 interrupts the holding circuit for the fifth counting chain relay 935 and the second sequence relay 905 which are responsively restored.

The registration of the received point selection code digit six is now made at the substation equipment. Inasmuch as the impulse transmission from the control office has been terminated, line relay 1000 will be restored for a period of time which is sufficient to effect restoration of the slow-to-release receiving relay 835.

Relay 835 restores and at its contacts 837 and 839' completes operating circuits to the point selection relays 1110 and 1120, the circuits therefor extending from battery over the windings of the respective relays 1110 and 1120, C1346, contacts 1046, contacts 1072, 1061, C1364, contacts 857, contacts 839', contacts 833, C1355, contacts 1035, C1360, contacts 837 to ground.

The point selection relays 1110 and 1120 operate and point selection relay 1110 at its contacts 1116 completes a holding circuit for the relay pair which extends from battery over the respective windings of the relays 1110 and 1120, conacts 1116, C1345, contacts 1044, C1353 and contacts 874 to ground. Point selection relay 1120 at its contacts 1122 completes an operating circuit for the point selection relay 1500 which is associated with the sixth point of the first group, the circuit therefor extending from battery over the winding of relay 1500, C1582, contacts 1162, contacts 1122, C1325, contacts 943, 949, 954, 959, 964, C1311, contacts 852 and 827 to ground.

G. *Point check transmission*

The point selection code digit thus registered, is now transmitted to the control station to properly identify the point selection digit received for checking purposes. Point selection relay 1500 operates and at its contacts 1503 extends its operating ground to point code relay 1050, the operating circuit therefor extending from battery over the winding of the point code relay 1050, C1342 and contacts 1503 to the operating ground provided to relay 1500 by the group selection relay 1160 and point selection relay 1120 as above described. Point selection relay 1500 at its contacts 1501, 1502, 1505 prepares the operating circuits for the annunciator relays. Point code relay 1050 operates and at its contacts 1054 completes a holding circuit for itself and the point selection relay 1500, which holding circuit extends over contacts 1054, 1074 and 1063 to ground. Point code relay 1050 at its contacts 1055 also interrupts the holding circuit for the sixth counting chain relay 940 and the third sequence relay 900 to effect the restoration thereof.

Sequence relay 900 restores and at its contacts 901 interrupts the holding circuit for the receiving control relay 830 to effect the restoration thereof. Relay 830 restores and at its contacts 832 effects the restoration of associated receiving control relay 825.

The equipment at the substation now prepares to transmit the point check code to the control office to indicate to the operator thereat the particular substation poin which has been chosen as a result of the transmission of code digit six. As the receiving control relay 825 restores, it is effective at its contacts 826 to complete an operating circuit for the sending control relay 820, the circuit therefor extending from battery over the winding of sending control relay 820, contacts 826, C1358, contacts 1051, contacts 1041, contacts 1023 to ground. The sending control relay 820 operates and at its contacts 821 completes operating circuits for the sending drive relays 810 and 815, and at its contacts 822 extends its operating ground over C1365, contacts 1004, contacts 846, C1368 to the sending relay 1010 to once more initiate operation of the impulse pumping arrangement. Relay 810 operates and at its contacts 811 opens a point in the local metering circuit. Impulse sending relay 1010 operates and at its contacts 1013 and 1015 completes the operating circuits for the line relays 680 and 1000.

Substation line relay 1000 operates and at its contacts 1001 completes the operating circuit to the first relay 915 of the counting chain and at its contacts 1004 interrupts the operating circuit for the sending relay 1010 to effect the restoration thereof. The counting chain relay 915 operates and at its contacts 918 prepares a series circuit for its associated sequence relay 910 which is held inoperative pending removal of the shunt circuit effected by the initial operating circuit for the counting chain relay 915.

At the control station the line relay 680 operates and at its contacts 681 completes operating circuits for the receiving relay 384 and the first counting chain relay 215. The receiving control relay 384 operates and conditions the control station equipment for receipt of the point check code which is being transmitted by the substation. Relay 384 also at its contacts 387 also completes an operating circuit for check-back relay 310 which extends from battery through resistor 310' over the checkback relay 310, C1696, contacts 1729, C1695, contacts 387, 324, C24, contacts 614 to ground. The check-back relay 310 operates and locks itself over contacts 313, contacts 324, C24 and contacts 614 to ground. Counting chain relay 215 operates and prepares a series circuit for its associated sequence relay 210.

As the substation continues its impulse transmission, line relays 680 and 1000 release, and line relay 1000 at its contacts 1001 interrupts the energizing circuit for the first counting chain relay 915 to remove the shunt from the sequence relay 910 to permit the operation thereof. At the control office the release of the line relay 680 effects the opening of the initial energizing circuit for the first counting chain relay 215 to remove the shunt from the sequence relay 210 and to thereby permit the operation thereof. Sequence relay 210, in operating, is effective at its contacts 214 to complete an energizing circuit for the receiving control relay 380. Receiving control relay 380 operates and at its contacts 381 closes an operating circuit for an auxiliary relay 370, and at its contacts 382 establishes a holding circuit over the contacts of the operated one of the sequence relays.

As the pumping operation continues, line relays 1000 and 680 are operated a total of six times to advance the counting chains at each station to the sixth relay. That is, on the sixth impulse line relay 1000 at its contacts 1001 completes an operating circuit for the sixth counting chain relay 940. Counting chain relay 942 operates and at its contacts 940 prepares a series circuit with its associated sequence relay 900 which is presently held inoperative by reason of the shunt temporarily imposed thereon.

The check-back signal of six impulses having been transmitted, the point check relay 1040 is now operated to terminate impulse transmission. Counting chain relay 940 at its contact 943 completes an operating circuit for the point check relay 1040, which extends from battery over the winding of the point check relay 1040, contacts 1796 of the annunciator preparatory relay 1790, contacts 1053, C1356, contacts 881, contacts 828, 852, C1311, contacts 964, 959, 954, 949, 943, C1325, contacts 1122, contacts 1162, C1582, contacts 1503, C1342, contacts 1054, contacts 1074 and 1063 to ground. It is noted that operation of the point check relay 1060 is effected only when the received and registered point selection digit six was completely transmitted to the dispatch station.

Point check relay 1040 operates and at its contacts 1044 interrupts the holding circuit for the point selection control relays 1110 and 1120. The point selection control relays are responsively restored. Point check relay 1040 at its contacts 1041 also interrupts the first of the energizing circuits for the sending control relay 820, which is held operated, however, over a second energizing circuit extending over the contacts of the line relay 1000.

At the control office with the sixth operation of the line relay 680, contacts 681 are closed to complete an operating circuit for the sixth counting chain relay 240. Counting chain relay 240 operates and at its contacts 243 prepares an operating circuit for its associated sequence relay 200, which is temporarily held inoperative by the shunt imposed thereon by the completed operating circuit for the counting chain relay 240.

As line relay 1000 releases for the sixth time, contacts 1001 are opened to interrupt the shunt of the third sequence relay 900. Sequence relay 900 operates, and at its contacts 904 interrupts the operating circuit for the fifth counting chain relay 935 and the second sequence relay 905 to effect the restoration thereof. Line relay 1000, at its contacts 1003, is also effective to interrupt the second energizing circuit for the sending control relay 820 to effect the restoration thereof, it being apparent that with restoration of the sending control relay 820 the transmission of the point check code is terminated. That is, the sending control relay 820, in restoring, is effective at its contacts 821 to interrupt the energizing circuit for the sending drive relays 810 and 815, respectively, to effect the restoration thereof, and at its contacts 822 to also interrupt the energizing circuit for the pumping arrangement. Sending drive relay 815, in releasing, is effective at its contacts 816 to interrupt the holding circuit for the counting chain relay 940 and the sequence relay 900 to effect the restoration thereof. Relay 810, being of the slow-to-release type, holds contacts 814 open long enough to permit relays 940 and 900 to release.

As the control office line relay 680 is released for the sixth time in the point check impulse series, the shunt is removed from the third sequence relay 200 which thereupon operates in series with its associated counting chain relay 240. Relay 200 in operating is effective at its contacts 202 to interrupt the holding circuit for the second sequence relay 205 and the fifth counting chain relay 235 to effect the restoration thereof.

It is assumed at this point that the check-back signal agrees with the point selection signal transmitted, and as the line relay 680 now remains in the restored position for a prolonged period as a result of the termination of the impulses by the substation, sufficient time elapses to permit the restoration of the slow-to-release receiving relay 384 and to initiate the registration of the point check code received for comparison purposes. Receiving relay 384 restores and at its contacts 386 effects the operation of point selection control relays 530 and 540, the circuit therefor extending from battery over the windings of the point selection control relays 530 and 540, C53, contacts 625, contacts 612, contacts 645, C27, contacts 304', contacts 383, contacts 386 and 1687 to ground. Point selection control relays 530 and 540 operate, and relay 530 at its contacts 535 completes a circuit for shunting checkback relay 310 over circuit resistor 310', C50, contacts 535, C46, contacts 345, contacts 325, C48, contacts 452, C16, contacts 701, 711, 721, 731, 741, 752, C11, contacts 242, 246, 251, 256, 261, C364, contacts 302 and contacts 371 to ground. The check-back relay 310 responsively releases to indicate that the check-back signal corresponds to the signal transmitted.

It is apparent from the description of the equipment heretofore that, in the event that a check-back signal other than "six" is received, the equipment is reset to normal. Specifically, a counting chain relay other than relay 240 will be operated and, as a result, the shunting circuit for check-back relay 310, which extends over the point start relay 750, will be interrupted by open contacts 242. The check-back relay will accordingly remain energized, and as the receiving control relay 370 is eventually released, the reset relay 600 will be operated to reset the equipment at both stations. The energizing circuit for the reset relay will extend from battery over the winding of the reset relay 600, contacts 608, C29', contacts 312, 374, 316, C26, contacts 635, 616, 629', C51, contacts 519 to ground. It is seen, therefore, that in the event of improper impulse transmission, the equipment is automatically reset.

Continuing with the description of the circuit operation in the event that the transmitted point selection signal and the check-back signal agree, as point selection control relay 540 operates it is effective at its contacts 542 to complete an operating circuit for point selection relay 1410 associated with point six (Fig. 14), the operating circuit therefor extending from battery over the winding of relay 1410, C1493, contacts 445, C70, contacts 542, C11, contacts 242, 246, 251, 256, 261, C364, contacts 302 and 371 to ground. Point selection relay 1410 operates and at its contacts 1412 extends its operating ground to the point code relay 630. Point code relay 630 operating over the energizing circuit for relay 1410 which is extended over contacts 1412, C52 and the winding of the point code relay 630 to battery.

Point code relay 630 at its contacts 631 locks itself and point selection relay 1410 over the contacts 643 of the point stop relay. Point code relay 630 at its contacts 632 effects the release of the sixth counting chain relay 240 and its associated sequence relay 200. Counting chain relay 240 and sequence relay 200 restore, and sequence relay 200 at its contacts 204 interrupts the holding circuit for the receiver control relay 380 to effect the restoration thereof. Relay 380 restores and at its contacts 381 opens the operating circuit for its associated control relay 370; and at its contacts 383 interrupts the operating circuit for the point selection relays 530 and 540, respectively.

ANNUNCIATOR SUPERVISION AFTER POINT SELECTION (POINT 6)

Whenever an indicator point (such as the illustrated point six) is seized the equipment automatically conditions itself for the interexchange of signals relative to the condition of the indicators at the seized point. Thus with the operation of the point selection relay 1410, an operating circuit is completed for the first annunciator start relay 1730, (Fig. 5b), the circuit extending from negative battery over the winding of the relay 1730, contacts 1726, conductor 1611, conductor 1474 and contacts 1411 to positive battery. Annunciator start relay 1730 operates and at its contacts 1731 removes ground from the annunciator indicator relays 1405 etc. to reset any of the indicator lamps such as AL1 etc. which may have been illuminated in a previous supervisory operation; at its contacts 1732 completes an operating circuit for the second annunciator start relay 1720, which extends from negative battery over the winding of relay 1720, contacts 1732, conductor 1611, 1474, and contacts 1411 to positive battery.

The second annunciator start relay 1720 operates and at its contacts 1721 completes an operating circuit for the third annunciator start relay 1630 (Fig. 2), the circuit extending from negative battery over the winding of relay 1630, conductors 1635 and contacts 1721 to positive battery; at its contacts 1723 prepares an operating circuit for the pulse determining circuit which determines the number of impulses to be transmitted in the first group selection code signal; at its contacts 1725 completes a self-holding circuit to the original operating source on conductor 1611; at its contacts 1726 interrupts the energizing circuit for the first annunciator start relay 1730; and at its contacts 1727 completes an operating circuit for the operating code control relay 620, at its contacts 1728 prepares an operating circuit for timing relay 1680, annunciator start relay 1730 is slow-to-release and holds in the operated condition for a predetermined period following interruption of the energizing circuit thereto.

The third annunciator start relay 1630 (Fig. 2) operates and at its contacts 1631, 1632, 1633 prepares the control circuits to the annunciator group selection relays 1430 etc.

Operating code control relay 620 is energized over a circuit as completed by relay 1720, the circuit extending from negative battery over winding 620, conductors 1613, contacts 1713, 1718, 1727, conductor 45, contacts 516, 523, conductor 58, contacts 673 and 631, 643 to positive battery. Operating code control relay 620 operates and at its contacts locks to the ground on conductor 45 independent of the circuit extending over contacts 1727.

As the receiving controls 370 and 380 restore following receipt of the point check digit from the substation, receiving control relay 370 is effective at its contacts 374 to complete an operating circuit for the sending control relay 360, the operating circuit extending from the negative battery over the winding of sending control relay 360, contacts 311, 374, conductor 33, contacts 623, 635, 616, 629', conductor 51 and contacts 519 to ground. Sending control relay 360 in its operation at this time conditions the control station for the automatic transmission of the code seizing signal to select the first annunciator group at the seized point six, whereby information concerning the condition of the generator equipment which is monitored thereby will be returned by the substation. Sending control relay 360 operates and at its contacts 363 extends its operating ground over conductor 35 and contacts 684 and 604 to the impulse sending relay 665 to initiate operation of the impulse pumping arrangement. Sending control relay 360 at its contacts 361 also completes the operating circuit for sending drive relays 350 and 340.

As the impulse sending relay 665 is operated it is effective at its contacts 667 and 668 to complete the operating circuit for the line relays 680 and 1000 to effect the transmission of the first and only impulse constituting the group selection signal for the first group at the seized point six. As will become apparent the first group is selected responsive to transmission of one impulse, the second group is selected with transmission of two impulses etc.

Line relay 680 at the control office operates and at its contacts 681 effects the completion of an operating circuit for the first counting chain relay 215, and at its contacts 684 interrupts the operating circuit for the impulse sending relay 665 to effect the restoration thereof. Counting chain relay 215 operates and at its contacts 217 prepares an operating circuit for its associated sequence relay 210 which is held inoperative pending removal of the shunt therefor established by the completed operating circuit for the counting chain relay 215.

An operating circuit for the operation code control relay 610 over the first group pulse determining circuit is completed with the operation of the first counting chain relay 215, the circuit extending from negative battery over the winding of relay 610, contacts 622, conductor 28, contacts 353, conductor 21, contacts 1723, conductor 1640, contacts 1618, 1610, contacts 216, 221, 226, 231, 236, 241, 246, 251, 256, 261, C364, contacts 302, 372 and 331 to ground, whereupon the transmission impulses for the first group signal is terminated at contact 616.

At the substation the line relay 1000 thereat responds to the receipt of the annunciator group selection impulse, and at its contacts 1001 completes an operating circuit to the receiving relay 835 which operates to condition the equipment at the substation for the receipt of the annunciator selection impulse code. Line relay 1000 at its contacts 1001 also completes an operating circuit to the first counting chain relay 915 which operates and at its contacts 918 prepares an operating circuit for its associated sequence relay 910. Sequence relay 910 remains inoperative at the time pending removal of the shunt established by the initial operating circuit for counting chain relay 915.

Receiving relay 835 operates and at its contacts 1772 completes an operating circuit for the annunciator preparatory relay 1790, the circuit extending from negative battery over the winding of relay 1790, contacts 1772, conductor 1773, contacts 1764, conductor 1587 and contacts 1504 to ground.

The annunciator preparatory relay 1790 operates and at its contacts 1794 locks to ground on conductor 1773 independent of the contacts on the receiving relay 835, and at its contacts 1791, 1793 and 1797 prepares operating circuits for various elements of the indicator control equipment. As the first impulse is terminated at the control station, line relays 680 and 1000 are respectively released and line relay 680 at its contacts 681 interrupts the shunt circuit for the first sequence relay 210 to effect the operation thereof. Line relay 680 at its contacts 683 also interrupts the holding circuit for the sending control relay 360, the original energizing circuit for the sending control relay 360, having been interrupted with operation of code control relay 610.

Sending control relay 360 restores and at its contacts 361 effects release of the sending control relay 350 and 340. Sending control relay 350 at its contacts 351 interrupts the holding circuit for the first counting chain relay 315 and the first sequence relay 210 to effect the restoration thereof.

The release of the line relay 1000 at the substation with termination of the transmission of the first impulse effects removal of the shunt for the first sequence relay 910 to effect the operation thereof. Sequence relay 910 operates and at its contacts 911 completes an operating circuit for the receiving control relay 830, the circuit extending from negative battery over the winding of relay 830, conductor 1306, contacts 911, conductor 1305, contacts 838 to positive battery. The receiver control relay 830 operates and at its contacts 832 completes an obvious operating circuit for associated receiving relay 825, the relays 825 and 830 in combination further preparing the equipment at the substation as before for the receipt of the incoming group selection code.

In that the one impulse of the first group selection signal has been transmitted and the control station impulse transmission terminated, the line relay 1000 is maintained inoperative for a prolonged period of time, and its contacts 1001 effects the release of the slow-to-release relay 835. Receiving relay 835 restores and at its contacts 839' completes an operating circuit for the operation control relay 885, the circuit extending from battery over the winding of relay 885, conductor 1354, contacts 1045, 1072, 1061, conductor 1364, contacts 857, 839', 833, conductor 1355, contacts 1035, conductor 1360 and contacts 837 to ground. Operation control relay 885 operates and at its contacts 886 completes an operating circuit to the annunciator selection relay 1510 which is associated with the first group of ten indicators at the selected sixth point in the system, the operating circuit extending from negative battery over the winding of relay 1510, contacts 1501, conductor 1583, contacts 1782, conductors 1784, contacts 919, 924, 929', 934, 939, 944, 949, 954, 959, 964, conductor 1311, contacts 852 and 827 to ground.

The group annunciator relay 1510 operates and at its contacts 1511 to 1520 prepares connection of the indicators 1 to 10 to a series of information bearing conductors 1571 through 1580, and at its contacts 1522 extends its operating circuit to the supervisory code relay 1030 over contacts 1522, conductor 1581 and the winding of the point supervisory code relay 1030 to initiate transmission of the check code of one impulse to indicate to the control station equipment that the first indicator group at point six has been seized.

Supervisory code relay 1030 operated and at its contacts 1034 completes a holding circuit for the group selection relay 1510 and itself which extends over conductor 1360 and contacts 837 to ground. Supervisory code relay 1030 at its contacts 1031 interrupts the holding circuit for the first sequence relay 910 and the first counting chain relay 915 to effect the release thereof and the interruption of the holding circuit for the receiver control relay 830.

Receiver control relay 830 restores and at its contacts 832 effects the restoration of receiver control relay 825.

Receiver control relay 825 restores and is effective at its contacts 826 to complete an operating circuit to the sending control relay 820, the circuit extending from negative battery over the winding of relay 820, contacts 826, conductor 1358, contacts 1051, 1032, 1042, and 1023 to ground. The sending control relay 820 operates in a manner heretofore described to control the energization of the sending drive relays 810 and 815 and the consequent completion of the energizing circuit for the substation impulse pumping arrangement.

The impulse sending relay 1010 operates and at its contacts 1013 and 1015 completes an operating circuit for the line relays 680 and 1000 at the respective stations.

ANNUNCIATOR GROUP CHECK CODE

The substation equipment is now operated to transmit a single impulse to indicate to the control station that a single pulse has been received to prepare the substation for selection of the first group of indicator units at the seized point.

As the line relay 1000 operates with the first impulse generation at the substation, it is effective at its contacts 1004 to interrupt the energizing circuit for the sending relay 1010 to effect the restoration thereof after the elapse of the predetermined time period. Line relay 1000 at its contacts 1001 also completes an operating circuit for the first counting chain relay 915 which operates to prepare a circuit for its associated sequence relay 910 in the manner heretofore described, the sequence relay 910 remaining inoperative pending removal of the shunt imposed by the completed operating circuit of the counting chain relay 915.

Counting chain relay 915 operates and at its contacts 919 completes an operating circuit for the supervisory code relay 1020, the operating circuit extending from battery over the winding of relay 1020, contacts 1033, 1021, conductor 1362, contacts 817, contacts 1797, contacts 1795, conductor 1817, contacts 1053, conductor 1356, contacts 881, contacts 828, 852, conductor 1311, contacts 964, 959, 954, 949, 944, 939, 934, 929', 924, 919, C1329, C1784, contacts 1782, C1583, contacts 1501, 1522, C1581, contacts 1030, C1360 and contacts 837 to ground.

Supervisory control relay 1020 operates and at its contacts 1022 completes a holding circuit which extends from battery over the winding of relay 1020, contacts 1023 and 1022 to ground. Relay 1020 at its contacts 1023 interrupts a point in the initial operating circuit for the sending control relay 820 and at its contacts 1763 to complete an operating circuit for the timer relay 1765, the circuit extending from negative battery over the winding relay 1765, contacts 1770, 1753, conductor 1800, contacts 1763, 1791, conductors 1353, contacts 874 to ground.

At the control office with the receipt of the incoming impulse the line relay 680 is operated and conditions the control office equipment for receipt of the incoming code impulse from the substation which constitutes the check back signal. Receiving relay 384 and the first counting chain 215 are responsively operated as in the previously described receiving operations.

As the line relay 1000 now restores following transmission of the single impulse, it is effective at its contacts 1003 to interrupt the holding circuit for the sending control relay 820, the initial operating circuit therefore having been interrupted by the operation of the supervisory code relay 1020 in its operation of associated contacts 1023.

Sender control relay 820 restores and at its contacts 822 interrupts the energizing circuit for the sending drive relay 810 which remains in the operated condition for a brief period of time thereafter as determined by its slow-to-release characteristics. Sender control relay 815 also restores and is effective at its contacts 816 to interrupt the holding circuit for the operated counting chain relay 915 and the associated sequence relay 910 which responsively restore. After a predetermined time period has elapsed, sender drive relay 810 releases and at its contacts 1770 interrupts the holding circuit for the timer relay 1765 which responsively restores.

Line relay 680 at the control station restores following receipt of one and only impulse of the check back signal and at its contacts 681 effects the operation of the sequence relay 210, the circuit extending from battery over the winding of the first counting chain relay 215, contacts 217, the winding of sequence relay 210, contacts 206, conductor 369, contacts 343, conductor 36, contacts 615, contacts 629, conductor 51 and contacts 519 to ground. Sequence relay 210 completes an operating circuit for the receiving control relay 380 which in turn completes an operating circuit for the receiving control relay 370.

After the elapse of the predetermined period of time during which the line relay 680 is in a restored condition as a result of the termination of the receipt of the incoming impulses, the receiving line relay 384 restores and at its contacts 386 completes an operating circuit for the supervisory control realy 280, the operating circuit extending from negative battery over the winding of relay 280, conductors 43 and 1639, contacts 611, 645, conductor 27, contacts 304', 383, 386 and 1687 to ground. Supervisory control relay 280 operates and at its contacts 1636 completes an obvious operating circuit for the auxiliary indication control relay 1625 (Fig. 2a) which in its operation prepares the circuits to the first group of annunciator group relays at the control station. Supervisory code relay 280 at its contacts 283 completes an operating circuit for the anti pump relay 520, the circuit extending from negative battery over the winding of relay 520, contacts 1717, 1724, conductor 60, conductor 61, contacts 283, conductor 58, contacts 673, 632 and 643 to ground.

Auxiliary indication control relay 1625 operates and at its contacts 1627 completes a circuit to the first set of annunciator group relays 1A1 (1430) and 1A2 (1440), the circuit extending from negative battery over the winding of the relays 1430 and 1440, conductor 1491, contacts 1626, 1631, conductor 6, contacts 216, 221, 226, 231, 236, 241, 246, 251, 256, 261, conductor 364, contacts 302 and 371 to ground. The annunciator group selection relays 1A1 and 1A2 operate and at their contacts 1436 extend the operating ground therefor over conductor 1492 to the winding of the auxiliary group selection relay 1700.

The auxiliary group selection relay 1700 operates to check the accuracy of the incoming check signal and to prepare the control office for registration of the annunciator indication signals which are to be subsequently transmitted by the substation.

Auxiliary group relay 1700 at its contacts 1702 completes an operating circuit for the indication agreement relay 515 which extends from negative battery over the winding of relay 515 to conductor 1624, contacts 1702, conductor 1638, contacts 1637, conductor 1639, contacts 1690, conductor 21, contacts 1723, conductor 1640, contacts 1618, 1610, conductor 6, contacts 216, 221, 226, 231, 236, 241, 246, 251, 256, 261, conductor 364 and contacts 302 and 371 to ground. In the event that the check back signal is at variance with the selection signal as transmitted the operating circuit for the agreement relay 515 will not be completed and the equipment will restore, such example being more fully described hereinafter relative to selection of the second group of indication auxiliary group selection relay. Relay 1700 at its contacts 1704 completes an operating circuit for the point indication relay 1405 associated with point six which extends from negative battery over the winding of relay 1405, contacts 1413, conductor 1478 and contacts 1704 to ground. With the operation of point indication relay 1405 an operating circuit is completed for the supervision annunciator selection lamp 1403, the circuit extending from negative battery over one side of the master control switch 490, conductor 66, lamp 1403, contacts 1407, resistor 1408, conductor 82 and the second side of the master control switch 490 and positive battery. The annunciator selection lamp 1403 is illuminated thereby to inform the operator that the selection of the annunciator point six has been effected.

The indication agreement relay 515 operates and is effective at its contacts 516 to interrupt a point in the holding circuit for the operation code control relay 620 to effect the release thereof; and at its contacts 519 interrupts the holding circuit for the counting chain relay 215 and the associated sequence relay 210. Relays 215 and 210 restore to effect the release of the receiver control relays 380 and 370. Relay 620 restores and at its contacts 622 interrupts the holding circuit for its associate operation code control relay 610 which likewise restores.

Receiving control relay 380 restores and is effective at its contacts 383 to interrupt the energizing circuit for the supervisory control relay 280 which responsively restores; at its contacts 1686 completes an operating circuit for the first annunciator group selection marking relay 1605 extending from negative battery over the winding of relay 1605, C1479, contacts 1435, C1494, contacts 1686 to ground. Relay 1605 in its operation prepares group two of the annunicator indicators at the control station for selection.

Supervisory control relay 280 restores and at its contacts 1637 interrupts the holding circuit for the indication relay 515 to effect the restoration thereof; and at its contacts 1636 interrupts the energizing circuit for the auxiliary indication control relay 1625 to effect the restoration thereof.

Summarily, responsive to the transmission of the correct check-back signal by the substation following receipt thereby of the first group annunciator selection signal, the control station equipment is operative to select the relays associated with group one of the annunciator marking equipment in the control station and effects the illumination of the annunciator selection lamp 1403 to indicate to the attendant at the control station that the indicator group selection has been made.

TRANSMISSION OF ANNUNCIATOR IMPULSES FOR FIRST GROUP

The function of the timer relay 1765 at the substation is apparent from the foregoing description. Specifically following transmission of the check-back signal indicating the group selection made and prior to the transmission of the pulses representing the condition of the indicators of the selected group, the control station must be provided with sufficient time period to examine the check-back signal and effect reset of the equipment in the event of the determination of a variation between the check-back and transmitted selection signals. Such time period is effected by the timer relay 1765. Assuming the check-back and selection signals agree, as the timer relay 1765 releases following the expiration of the time period determined by its slow-to-release characteristics, it is effective at its contacts 1767 to complete an operating circuit for the annunciator start relay 1755; the circuit extending from negative battery over the winding of relay 1755, contacts 1767, 1771, 1753, C1800, contacts 1763, 1791, C1353 and contacts 874 to ground.

The annunciator start relay 1755 which controls the sending of each group of annunciator impulses operates, and at its contacts 1756 completes an operating circuit for the sender control relay 820, the circuit extending from negative battery over the winding of relay 820, contacts 826, conductor 1358, contacts 1051, contacts 1032, 1042, conductor 1789, contacts 1756, 1761', 1754, to ground. Sender control relay 820 operates and at its contacts 822 extends its operating ground over conductor 1369, contacts 1004, and contacts 846 to the sending relay 1010 to initiate the transmission of a code pulse which represents the condition of the first indicator unit of the first group of indicators at point six. Each of the indicators is operative to two alternative positions in accordance with the condition of the equipment which it has been assigned to for monitoring purposes. In the event that a fault develops the indicator monitoring that portion of the equipment is operated to close its associated contacts such as 1567, 1568, etc. if the portion of the equipment monitored by the indicators is in the normal condition, the indicator will be restored and its associated contacts such as 1567, 1568 etc. will be in the open condition. For the purpose of explanation it will be assumed that a fault condition exists at the point monitored by the fourth indicator of the first group at point six.

As the sending relay 1010 operates with the energization of the pumping arrangement, it is effective at its contacts 1015 and 1013 to complete operating circuits for the line relays 680 and 1000 at the respective stations. Sender control relay 820 at its contacts 821 also completes an obvious energizing circuit for the sender control relay 815 and sender drive relay 810 which cooperate to condition the equipment for the transmission of a series of impulses to the dispatcher's office to indicate the condition of each of the indicators of group one at point six.

Impulse sending relay 1010 operates and at its contacts 1013 and 1015 effects the alternate energization and deenergization of the line relays 680 and 1000 and the sequential operation of the counting chain relays 915 to 960 and 200 to 260, inclusive in the manner heretofore described. In their present capacity however the counting chain relays are operative in examining and registering sets respectively, the substation counting chain being operative with each energization of one of its relays to effect the examination of the corresponding indicators of the seized group and the transmission of a signal which is representative of the indication which is found to exist thereat. The corresponding control station counting chain relay effects synchronous selection of the corresponding indicator relay at the control station and prepares it for response to the indicators as transmitted by the substation.

Figure 8:
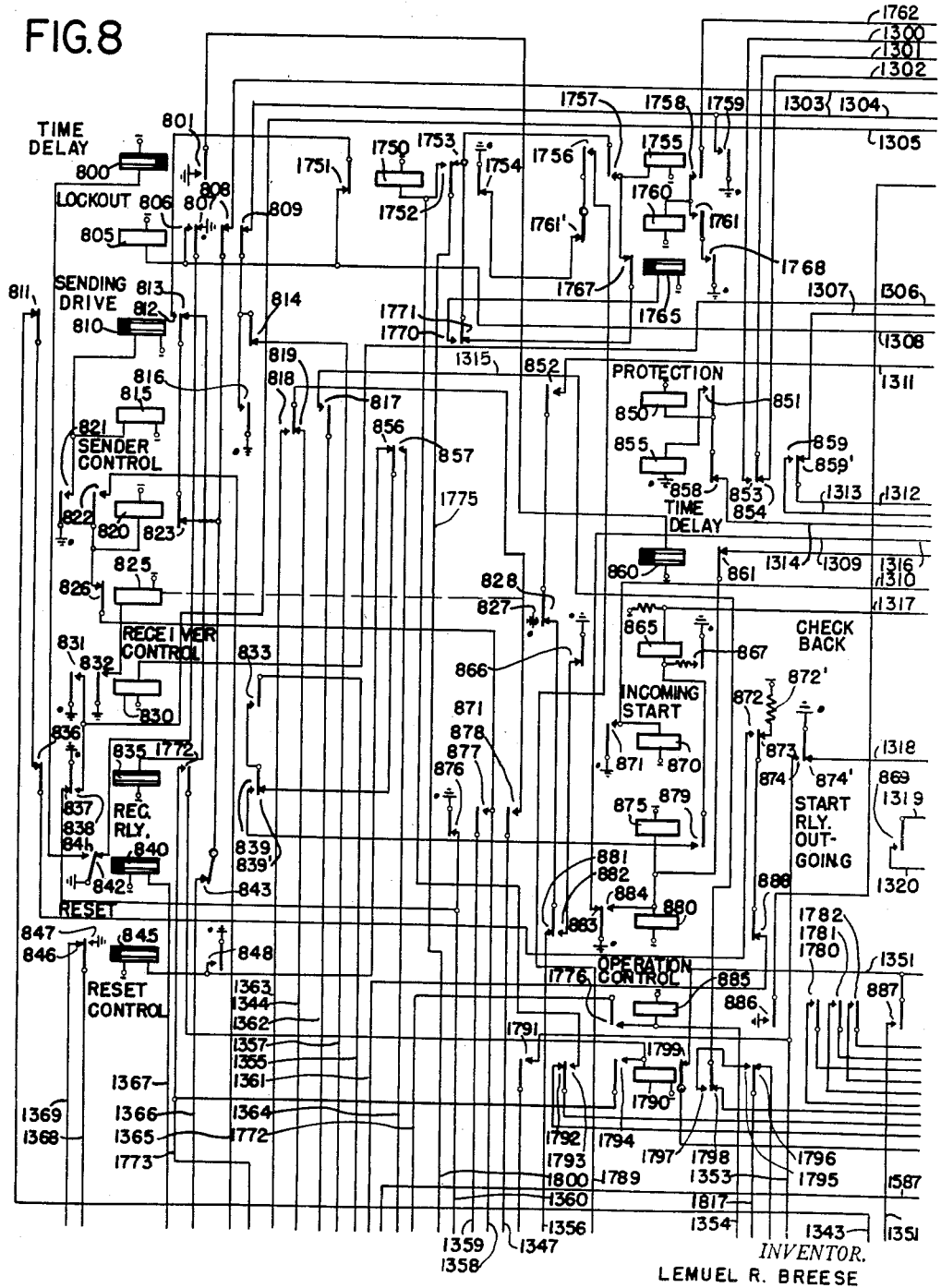

For example, with the first operation of line relay 1000, contacts 1001 are closed to complete the operating circuit to the first counting chain relay 915 at the substation, and contacts 1004 interrupt the energizing circuit for the sending relay 1010 which remains operated for a brief period of time thereafter as determined by the slow-to-release characteristics of such relay. As the first counting chain relay 915 operates it is effective at its contacts 918 to prepare a series operating circuit for its associate sequence relay 910 which is held temporarily inoperative in the usual manner. Counting chain relay 915 at its feeler contacts 1807 is operative to examine the condition of the first indicator of group one at point six to determine the condition thereof, the feeler circuit extending over contacts 1511, C1571 and contacts 1807 which are connected with the annunciator pause relay 1760 (Fig. 8). Whenever the feeler fingers encounter an open set of indicator contacts such as 1567 (normal condition) no functional operation is effected and the chain precedes in its normal advancement. That is, as relay 1010 subsequently restores, it is effective at its contacts 1013 and 1015 to interrupt the energizing circuits for the line relays 680 and 1000, which responsively restore and line relay 1000 at its contacts 1001 interrupts the shunt circuit for the first sequence relay 910 to permit the operation thereof in series with the first counting chain relay 915, the circuit extending from negative battery over the winding of relay 915, contacts 918, the winding of sequence relay 910, contacts 909, conductor 1304 and contacts 809 and 816 to ground.

The pumping circuit effects reoperation of its line relay 1000 which is effective at its contacts 1004 to complete an operating circuit for the sending relay 1010 to effect the transmission of the second pulse of the series and thus inform the equipment at the control station of the condition of the second indicator of the first group at the seized point six.

At the control station line relay 680 operates responsive to receipt of the first indicator representative impulse, and contacts 681 are closed to complete the operating circuit to the receiving relay 384 and an operating circuit to the first counting chain relay 215 to effect operation thereof in the manner heretofore described.

The first counting chain relay operates and at its contacts 217 prepares a series circuit for the first sequence relay 210 as before, and at its circuit preparing contacts 1646 prepares an operating circuit over associate conductor 1481 for the indicator relay AR1 which controls the indicator lamp AL1 associated with indicator one of group one. In that the corresponding indicator at the substation is in the restored condition, the prepared circuit is not completed and the indicator lamp remains extinguished.

Receiving relay 384 operates and at its contacts 387 completes an operating circuit for the timing relay 1680 which is functionally operative to time the pauses in the transmission of the indicator impulses and to cause reset of the equipment in the event of the detection of a stalled condition. Timing relay 1680 operates over a circuit extending from negative battery over the winding of relay 1680, conductor 1698, contacts 1728, conductor 1695, contacts 387, contacts 324, conductor 24 and contacts 614 to ground; and at its contacts 1682 completes an obvious operating circuit for the associated slow-to-release relay 1675, and at its contacts 1628 completes an obvious operating circuit for the third timer relay 1670.

As the control station line relay 680 is now released as a result of the termination of the first incoming indication pulse from the substation, the first sequence relay 210 is operated in series with the first counting chain relay 215 in the manner heretofore described relative to other counting chain operations.

As the line relay 100 now operates at the substation to effect the transmission of the indication pulse for the second indicator of group one at point six of the equipment, it is effective at its contacts 1004 to interrupt the energizing circuit for the sending relay 1010 to effect the restoration thereof; and is effective at its contacts 1001 to complete the operating circuit for the second counting chain relay 920 in previously described chain operations. Counting chain relay 920 at its contacts 922 prepares a circuit to its associate sequence relay 905 which is held inoperative pending removal of the operating circuit shunt. Counting chain relay 920 at its contacts 1808 examines the second indicator of group one and finding the contacts thereof in the restored condition, effects no functional operation.

As the substation sending relay 1010 releases after the expiration of predetermined period of time, it is effective at its contacts 1013 and 1015 to interrupt the energizing circuit for the line relays 680 and 1000 to effect the release thereof. At the substation the line relay 1000 is effective at its contacts 1004 to complete the operating circuit for the sending relay 1010 and at its contacts 1001 to interrupt the existing chain shunt which has been imposed upon the series circuit for the second counting chain relay 920 and its associated sequence relay 905. Relays 905 and 920 operate in series. Relay 905 at contacts 909 opens the holding circuit for relays 910 and 915 which restore.

At the control station the line relay 680 operates with receipt of the second incoming impulse and is effective at its contacts 681 to energize the second counting chain relay 220 which operates and prepares the series circuit for its associated sequence relay 205, such relay being presently shunted by the original operating circuit for the second counting chain relay 220. Relay 220 at its contacts 1647 prepares an energizing circuit for the second indicator lamp AL2 of the first group. In that the corresponding substation indicator is restored (normal), the prepared circuit is not completed and the lamp remains extinguished. With the subsequent release of the line relay 680 responsive to termination of the second incoming impulse of the series, it is effective at its contacts 681 removes the shunt from the sequence relay 205 to permit the operation thereof in series with the associated counting chain relay 220. As the sequence relay 205 operates, it is effective at its contacts 206 to interrupt the energizing circuit for the first counting chain relay 215 and the first sequence relay 210 to effect the restoration thereof.

Summarily then, second indicator of the first group at point six being in its normal condition, the equipment is operative to examine the second indicator to report the normal condition as determined to the control station and to prepare for passage of the counting chain at each of the stations to the succeeding chain relay.

As the sending relay 1010 operates for the third time, it is effective at its contacts 1013 and 1015 to complete an energizing circuit for the line relays 680 and 1000 at each of the stations. As the line relay 1000 at the substation operates for the third time, it is effective at its contacts 1004 to interrupt the energizing circuit for the sending relay 1010; and is effective at its contacts 1001 to complete an operating circuit for the third counting chain relay 925 which operates and at its contacts 928 prepares a series operating circuit for its associated sequence relay 900. The sequence relay 900 is temporarily maintained inoperative by the original operating circuit for the third counting chain relay 925. The third counting chain relay at its contacts 1809 examines the third indicator of group one and finding the contacts thereof in the open (normal) condition effects no further functional operation.

As the sending relay subsequently restores following expiration of the predetermined time period, it effects release of the line relay 680 and 1000, the line relay 1000 at the substation being effective at its contacts 1004 to recomplete the operating circuit for the sending relay 1010, and at its contacts 1001 to interrupt the existing shunt for the series operating circuit for counting chain relay 925 and sequence relay 900, to effect the series operation thereof. Sequence relay 900 operates and is effective at its contacts 904 to interrupt the holding circuit for the second counting chain relay 920 and the second sequence relay 905 which responsively restore. At the control station the line relay 680 operates with receipt of the third incoming impulse and is effective at its contacts 681 to energize the third counting chain relay 225 which operates and prepares a series circuit for its associated sequence relay 200, such relay being presently shunted by the original operating circuit for the third counting chain relay 220.

Counting chain relay 225 at its contacts 1648 prepares an operating circuit for the third indicator relay AR3 and lamp AL3 associated with the third indicator of group one at the seized substation point. In that the associate substation indicator is restored no further operation of the control station indicator equipment is effected.

With the subsequent release of the line relay 680 responsive to termination of receipt of the third incoming impulse of the series line relay 680 restores and at its contacts 681 interrupts the shunt for the counting chain relay 225 and its associate sequence relay 200 to effect operation thereof in series. As the shunt sequence relay 200 operates it is effective at its contacts 202 to interrupt the holding circuit for the second counting chain relay 220 and its associate sequence relay 205 to effect the restoration thereof.

It was assumed that an alarm condition is existent at the portion of the equipment monitored by indicator four of group one and the contacts 1566 of the indicator will accordingly be in the closed (alarm) position and as the substation counting chain is advanced to its fourth relay to detect such condition, a code signal is transmitted to effect illumination of the corresponding indicator lamp AL4 at the control station.

Specifically as sending relay 1010 is operated for the fourth time to effect the operation of the line relay 1000, the line relay 1000 at the substation is effective at its contacts 1001 to complete an operating circuit for the fourth counting chain relay 930 and to interrupt the operating circuit for the sending relay 1010.

As the fourth counting chain relay 930 operates, it is effective at its contacts 932 to prepare a series operating circuit for its associated relay 910, and is effective at its feeler contacts 1810 to complete an operating circuit for the annunciator pause relay 1760 as a result of the alarm condition discovered by the feeler contacts, the circuit extending from negative battery over the winding of relay 1760, contacts 1758, conductor 1762, contacts 1801, contacts 1810, conductor 1574 in cable 1590, contacts 1514 and 1566 to positive battery.

Annunciator pause relay 1760 operates and at its contacts 1761 locks to ground over the contacts 1768 of the timer relay 1765 and at its contacts 1761' interrupts a point in the original energizing circuit for the sender control relay 820. As the sending relay 1010 releases subsequent to the elapse of its assigned predetermined time period, it is effective at its contacts 1013 and 1015 to interrupt the energizing circuit for the line relay 680 and 1000 at the respective stations. Line relay 1000 at the substation restores and at its contacts 1004 recompletes the energizing circuit to sending relay 1010, and at its contacts 1001 removes the shunt from the operating circuit for the fourth counting chain relay 930 and its associate sequence relay 910 which responsively operate in series.

As the sequence relay 910 operates, it is effective at its contacts 914 to interrupt the holding circuit for the third sequence relay 900 and the third counting chain relay 925 to effect the restoration thereof.

As the line relay 1000 now releases for the fourth time, it is effective at its contacts 1003 to interrupt the second holding circuit for the sender control relay 820 to effect the restoration thereof. Sender control relay 820 restores and is effective at its contacts 821 to interrupt the holding circuit for sender control relay 815 and sender drive relay 810. Sender control relay 815 releases and after the elapse of a predetermined period of time as determined by its slow-to-release characteristics, sender drive relay 810 restores, and at its contacts 1770 interrupts the energizing circuit for the first timer relay 1765 to effect the release thereof. Timer relay 1765 is slow-to-release and remains in the operated condition for a predetermined period of time following interruption of its energizing circuit. As timer relay 1765 releases following the expiration of the delay period, it is effective at its contacts 1768 to interrupt the holding circuit for the annunciator pause relay 1769, the original operating circuit therefor having been interrupted with the release of the third sequence relay 900 and the opening of contacts 1801.

As the annunciator pause relay 1760 restores it is effective at its contacts 1761' to recomplete the operating circuit for the sender control relay 820 to effect the reoperation thereof, such circuit extending from negative battery over the winding of relay 820, contacts 826, conductor 1358, contacts 1051, contacts 1032, 1042, conductors 1789, contacts 1756, 1761' and 1754 to ground.

Sender control relay 820 operates and at its contacts 822 recompletes the operating circuits for the sender drive relay 810 and sender control relay 815 to recondition the substation set for further transmission of information impulses to the control station.

With the receipt of the fourth impulse at the control station, line relay 680 operates and at its contacts 681 completes an energizing circuit for the fourth counting chain relay 230 to effect the operation thereof. As the fourth counting chain relay 230 operates, it is effective at its contacts 233 to complete a series operating circuit for its associated sequence relay 210 which is presently maintained inoperative by reason of the shunt effected by the original operating circuit for the fourth counting chain relay 230 and at its contacts 1649 prepares an operating circuit for the panel indicator relay AR4 (1425) which controls the fourth indicator lamp AL4 of group one at the control station.

With the termination of receipt of the fourth incoming impulse line relay 680 restores and at its contacts 681 interrupts the original energizing circuit for the fourth counting chain relay 230 whereupon the sequence relay 210 operates in series therewith over the circuit previously prepared. Sequence relay 210 at its contacts 211 interrupts the holding circuit for the third sequence relay 200 and the third counting chain relay 225 to effect the restoration thereof.

The line relay 680 is now maintained in the restored condition for a period of time which is somewhat greater than the normal restoration period effected in normal pulse transmission as a result of the operation of the timer and pause relays at the substation as introduced by the alarm condition of indicator four group one.

As a result of the prolonged condition of restoration of line relay 680, and the prolonged interruption of the energizing circuit for the receiving relay 384 by contacts 681 of the restored line relay 680, the receiving relay 384 restores and at its contacts 1688 complete an operating circuit for the indicator relay AR4 (1425) which controls the indicating lamp AL4 associated with the fourth indicator of the first group at the seized substation point. The operating circuit for the annunciator indicator relay AR4 extends from negative battery over the winding of relay AR4, contacts 1434, conductor 1484 (conductor cable 1495), contacts 1649 of the fourth counting chain relay 230, contacts 1645, 1643, 1641, conductor 1634, contacts 1685, conductor 1693, contacts 1705, contacts 1664, conductor 1689, contacts 1688, 324, conductor 24 and contacts 614 to ground.

The annunciator indication relay AR4 operates and at its contacts 1426 locks to ground over the contacts 1731 of the annunciator start relay 1730, the circuit extending over resistance 1425, contacts 1426, conductor 1476, contacts 1602, conductor 1603 and contacts 1731 to ground. Annunciator indication relay AR4 (1425) at its contacts 1427 completes an operating circuit for the annunciator indicator lamp AL4 which illuminates to indicate to the attendant that the fourth substation indicator of group one at the seized point six is operated and that an alarm condition exists at the point monitored thereby. The operating circuit for the annunciator lamp AL4 extends from negative battery over one side of the master switch 490, conductor 99, a 2000 ohm resistor 1499′, the filament of the indicator lamp AL4, contacts 1427 and conductor 82 to the other side of master switch 490 and positive battery.

As the receiving relay 384 restores, it is also effective at its contacts 387 to interrupt the holding circuit for the first timer relay 1680 to effect the restoration thereof. Relay 1680 in restoring at its contacts 1682 to interrupt the original energizing circuit for the second timer relay 1675; and at its contacts 1681 completes an operating circuit for the relay 1675 which extends over negative battery, over the winding of relay 1675, contacts 1682, 1681, 1677, conductor 1474 and contacts 1411 to positive battery. The equipment remains in this condition until the receipt of the information bearing pulse which is representative of the fifth indicator of the first group at the seized point six.

As the sender control relay 820 at the substation operates following the introduction and elapse of the alarm pause in the impulse transmission it controls operation of the sender control relay 815 and the sender drive relay 810 as before and the pumping arrangement including the sending relay 1010 and line relay 1000 reenergized to effect the transmission of the make period of the fifth pulse to the respective line relay 680 and 1000.

Substation line relay 1000 operates and at its contacts 1004 interrupts the energizing circuit for the sending relay 1010 and at its contacts 1001 completes an operating circuit for the fifth counting chain relay 935. Counting chain relay 935 operates and at its contacts 937 prepares a series operating circuit to its associated sequence relay 905, the series operating circuit being presently shunted by the original operating circuit for the counting chain relay 935. Chain relay 935 at its feeler contacts 1811 checks the fifth indicator of group one for a normal or alarm condition. In that the fifth indicator is assumed to be in the normal condition at this time no further operation is effected relative thereto.

As the sending relay 1010 releases after the elapse of a predetermined period of time, line relay 1000 restores and at its contacts 1001 interrupts the shunt circuit for the sequence relay 905 and the fifth counting chain relay 935 to effect the series operation thereof. Sequence relay 905 operates and at its contacts 909 interrupts the holding circuit for sequence relay 910 and the fourth counting chain relay 935 to effect the restoration thereof.

With receipt of the make period of the fifth pulse at the control station, line relay 680 operates and at its contacts 681 completes an operating circuit for the fifth counting chain relay 235, and at its contacts 681 completes the operating circuit for the receiving control relay 384. Receiving control relay 384 operates and at its contacts 387 recompletes the energizing circuit for the first timer relay 1680 which responsively reoperates and at its contacts 1682 reassumes control of the energizing circuit for the second timer relay 1675. The fifth counting chain relay 235 operates and at its indicator preparatory contacts 1650 prepares a circuit for the fifth indicator relay AR5 and associated indicator lamp AL5.

As the release period of the fifth impulse is effective, line relay 680 responsively restores, and at its contacts 681 removes the shunt from the series operating circuit for the fifth counting chain relay 235 and its associated sequence relay 205 to effect the series operation thereof. Sequence relay 205 operates and at its contacts 206 interrupts the holding circuit for the first sequence relay 210 and the fourth counting chain relay 230 to effect the restoration thereof.

Assuming that there are no further alarm conditions indicated at the points monitored by the remaining indicators of the first group at the seized point six, the pumping arrangement effects the advancement of the chain in the manner described over each of the remaining chain relays at each of the stations. In the event that other alarm conditions are encountered, the indicator relay for that point will be in the operated condition and the indicator pause relay 1760 will be operated in the manner set forth heretofore relative to the description of an alarm condition at point four and the corresponding annunciator indicator lamp will be illuminated at the control station to indicate to the attendant that the alarm condition exists thereat.

MATCHING IMPULSE TRANSMISSION

As the counting chains are each advanced to the tenth relay (260 and 960 respectively) at the two stations to complete the examination of the ten annunciators associated with the first group at the seized point, a matching impulse is transmitted by the substation to the control station to check for synchronism in operation of the chains.

Specifically, as the substation chain is advanced to the tenth relay 960, the sending relay 1010 is operated thereafter to transmit a so-called matching pulse to effect the energization of the line relays 680 and 1000 for the eleventh time. Substation line relay 1000 operates responsive thereto and at its contacts 1001 completes an operating circuit for the annunciator stop relay 1750 which is operative at the end of the examination of each group of indicators to terminate the transmission of impulses to the control station. Line relay 1000 at its contacts 1004 interrupts the operating circuit for the sending relay 1010 to effect the restoration thereof.

The operating circuit for the annunciator stop relay 1750 extends from negative battery over the winding of relay 1750, conductor 1775, contacts 1793, conductor 1783, contacts 961, 913, 907 and 902, conductor 1303, contacts 808, 843, conductor 1366 and contacts 1001 to ground. Annunciator stop relay 1750 operates and at its contacts 1753 interrupts the operating circuit for the timer relay 1765, and relay 1755 at its contacts 1752 locks up to the operating ground on conductor 1800, and at its contacts 1754 interrupts one of the energizing circuits for the sender control relay 820 which is held for the following period by the operative line relay 1000.

The release of annunciator start relay 1755 temporarily prevents recycling of the chain until such time as the matching impulse has been transmitted to the control station to effect a synchronism check.

As the sending relay 1010 restores following the transmission of the make period of the matching or eleventh impulse to the control station, it is effective at its contacts 1013 and 1015 to control the restoration of the line relay 680 and 1000. Line relay 1000 at the substation restores and at its contacts 1003 interrupts the second energizing circuit for the sender control relay 820, the first operating circuit therefore having been interrupted with the operation of the annunciator stop relay 1750 and the openings of its contacts 1754.

The sender control relay 820 restores and at its contacts 822 effects the restoration of sender control relay 815 and sending drive relay 810 to temporarily terminate the transmitting condition of the substation. As the sender control relay 815 restores, it is effective at its contacts 816 to interrupt the holding ground for the counting chain relay 960 and its associated sequence relay 910, the previous holding ground having been removed with the restoration of start relay 1755 and the opening of contacts 1759 thereby the transmitting condition of the substation equipment is thus terminated for the present.

With the receipt of the make period of the eleventh or matching pulse by the control station, line relay 680 thereat operates and at its contacts 681 completes an operating circuit for the eleventh counting chain relay 1660, the circuit therefor extending from negative battery over the winding of relay 1660, conductor 1657, contacts 1607, contacts 264, 212, 208, 204, conductor 368′, contacts 338, conductor 38, contacts 282, conductor 39, contacts 391, conductor 40 and contacts 681 to ground.

The eleventh or matching counting chain relay 1660 operates and at its contacts 1662 prepares a series operating circuit for its associated sequence relay 205, such circuit being presently rendered ineffective by the shunt placed thereon by the original operating circuit for the eleventh counting chain relay 1660; at its contacts 1663 prepares an operating circuit for the timer relay 1665, and at its contacts 1661 prepares an operating circuit for annunciator group release relay 1710.

As the line relay 680 releases with termination of the make period of the eleventh or matching impulse received from the substation, contacts 681 are opened and the original operating circuit for the eleventh counting chain relay 1660 is interrupted, whereupon the series circuit for the relay 1660 and the associated sequence relay 205 is rendered effective, these relays now being operated over a circuit extending from negative battery over the winding of relay 1660, contacts 1662, winding of sequence relay 205, contacts 202, conductor 369, contacts 343, conductor 36, conductor 1674, contacts 1707, conductor 1673, contacts 1632, conductor 26, contacts 635, 616, 629′, conductor 51 and contacts 519 to ground.

As the sequence relay 205 operates it is effective at its contacts 206 to interrupt the holding circuit for the first sequence relay 210 and the tenth counting chain relay 260 to effect the restoration thereof.

After the elapse of the predetermined time period corresponding to its slow-to-release characteristics, receiving control relay 384 restores and at its contacts 1688 completes an operating circuit for the annunciator group release relay 1710, the circuit extending from negative battery over the winding of relay 1710, conductor 1691, contacts 1661, contacts 1644, contacts 1641, conductor 1634, contacts 1685, conductor 1693, contacts 1705, conductor 1669, contacts 1664, conductor 1689, contacts 1688, contacts 324 and conductor 24 and contacts 614 to ground.

Receiving relay 384 at its contacts 387 interrupts a point in the holding circuit for the timer relay 1680 which responsively restores, the timer relay 1675 being maintained operated by the holding circuit completed over contacts 1682, 1677, conductor 1474, contacts 1411 to positive battery and in turn maintaining the associated timer relay 1670 in the operated condition.

Annunciator group release relay 1710 operates and at its contacts 1712 completes an operating circuit for its associate timer relay 1715, and at its contacts 1711 interrupts the holding circuit for the auxiliary group selection relay 1700. Annunciator group release relay 1715 operates and at its contacts 1717 interrupts the holding circuit for the anti-pump relay 520 to effect the restoration thereof. Group selection relay 1700 restores and at its contacts 1703 interrupts the holding circuit for the group selection relays 1A1 and 1A2 associated with the first group of indicators to restore same and at its contacts 1707 interrupts the energizing circuit for the eleventh counting chain relay 1660 and its associated sequence relay 205 to effect the restoration thereof.

As the eleventh counting chain relay 1660 restores, it is effective at its contacts 1661 to interrupt the holding circuit for the annunciator group release relay 1710 which being of the slow-to-release type remains operated for a brief period of time thereafter. With the expiration of the predetermined period of time, the annunciator group release relay 1710 restores and at its contacts 1712 interrupts the operating circuit for the associated annunciator group release relay 1715 which is also of the slow-to release type.

After the elapse of the predetermined period of time, relay 1715 restores and at its contacts 1718 completes an operating circuit for the operation code control relay 620, the operating circuit extending from negative battery over the winding of relay 620, conductor 1613, contacts 1713, 1718, 1727, conductor 45, contacts 516, 523, conductor 58 and contacts 673, 631 and 643 to ground. The operation code control relay 620 is operative at this time to control the equipment to transmit two impulses for selection of the second group of indicators at the seized point.

Summarily with the receipt of the matching impulse from the substation equipment following the examination of the ten indicators of the first group at the seized point, the equipment at the control station checks the local counting chain for the synchronous operation thereof with the counting chain at the substation, upon determination of an existing synchronous condition sets up the local equipment for the transmission of the code impulses for seizure of the second group of indicators at the substation for examination purposes.

In the event that the counting chains are out of synchronism in their operation the eleventh counting chain relay 1660 at the control station will not be operated as the matching impulse is received which will cause the control station equipment to stall and effect the operation of the reset relay 600 to effect the restoration of the control and substation equipment.

Specificallly, with the eleventh or matching counting chain relay 1660 in the inoperative condition following receipt of the matching pulse, its associated contacts 1661 will be in the open position and the operating circuit for the timer relay 1710 cannot be completed. With the timer relay 1710 inoperative the equipment will reach a stall and the reset thereof will occur.

Three alternative conditions may occur to effect non-synchronous operation of the counting chain relays at the respective stations, these conditions being (a) The failure of receipt of the matching pulse.

(b) The failure of receipt of one or more of the pulses of the series whereby the chain at the control station understeps the counting chain at the substation.

(c) The receipt of one or more extra impulses whereby the counting chain at the control station oversteps the counting chain at the substation.

In the occurrence of an understep at the control station or with the failure thereof to receive the control pulse from the substation, with the restoration of the receiving relay 384 following the receipt of the last impulse an operating circuit will be falsely completed for the indicator relay and indicator lamp associated with the last operated relay in the counting chain, that is if one impulse was lost in transmission, the tenth counting chain relay 260 will be operated and the tenth indicator relay AR4 will operate to effect illumination of the tenth indicator lamp AL4.

Briefly, as the line relay 680 restores following receipt of the eleventh or matching pulse, it is effective at its contacts 681 to interrupt the holding circuit for the receiving relay 384 for a time period which is in excess of the release characteristics thereof. Receiving relay 387 restores to initiate the check for synchronism of the chains. In that counting chain relay 1660 is now operated, contacts 1661 are open and accordingly no further operation of the control station equipment is effected.

The receiving relay 384 in restoring is also effective at its contacts 387 to interrupt the holding circuit for the timer relay 1680 which restores and at its contacts 1682 interrupts the holding circuit for the second timer relay 1675. The second timer relay 1675, being of the slow-to-release type, remains operated for a predetermined period of time thereafter.

As the second timer relay 1675 subsequently releases, it is effective at its contacts 1678 to interrupt the holding circuit for the third timer relay 1670, which is also of the slow-to-release type, and remains held for a brief period after the interruption of its energizing circuit. During the temporary period that the second timer relay 1675 is in the restored condition and the third timer relay 1670 is operated, an operating circuit is completed for the fourth timing relay 1665, the circuit extending from negative battery over the winding of relay 1665, contacts 1671, 1676, conductor 1611, conductor 1474, contacts 1411 to positive battery.

The fourth timer relay 1665 operates and at its contacts 1667 completes an operating circuit for the reset relay 600, the circuit extending from negative battery over the winding of relay 600, contacts 608, conductor 29', conductor 29, contacts 1667 to ground. The fourth timer relay 1665 at its contacts 1668 also effects the extension of the operating ground on conductor 1474 and 1611 to conductor 1612 and the winding of the indicator start relay 1730 to effect the energization thereof; at its contacts 1666 completes an operating circuit for the alarm relay 525, the circuit extending from negative battery over the winding of relay 525, conductor 76, conductor 1699 and contacts 1666 to ground.

The alarm relay 525 operates and at its contacts 528 connects operating ground to the alarm bell 414, and at its contacts 527 connects operating ground to the alarm lamp 415 to provide a visual and an audible indication to the attendant at the control station that a stalled condition has been encountered, and that the reset of the equipment is to be automatically effected.

Reset control relay 600 operates, and at its contacts 602 completes an obvious self-holding circuit over the contacts of the reset control relay 605, at its contacts 603 completes an operating circuit for the impulse sending relay 665 to effect the transmission of the reset pulse to the local and substation line relay 680 and 1000 respectively, such reset signal consisting of a make impulse of extra long duration.

Indicator start relay 1730 operates and at its contacts 1731 interrupts the operating ground for all of the annunciator relays and annunciator lamps which may have been in the illuminated condition to thereby erase any possible false indications which may have resulted on the control panel as a result of the understepping of the chain or failure of receipt of the matching pulse.

As the line relay 680 and 1000 are maintained in the operated position by the extra long reset pulse, the operating circuits for the reset relay 390 and 840 at the respective stations are interrupted for a period of time which is adequate to effect the release and restoration thereof.

The reset relays restore to effect removal of the operating potential from each of the points indicated by the black dot in the drawings, which effects the restoration of the equipment to its normal condition.

The restoration of timer relay 1670 is effected as the delay periods expire and at its contacts 1671 effects the interruption of the energizing circuit for the fourth timer relay 1665, which responsively restores. Relay 1665 in restoring is effective at its contacts 1667 to interrupt the holding circuit for the reset control relay 600.

Reset control relay 600 restores with the restoration of the reset relay 390. In the event that the counting chain at the control station has overstepped, the eleventh or matching counting chain relay 1660 will be in the operated condition as the eleventh or matching impulse is received and an operating circuit for the fourth timer relay 1665 is completed, the circuit extending from negative battery over the winding of relay 1665, contacts 1663, contacts 207, 204, conductor 368', contacts 338, conductor 38, contacts 282, conductor 39, contacts 391, conductor 40 and contacts 681 to ground. The fourth timer relay 1665 operates and effects the reset of the equipment in the manner just described.

SELECTION OF SECOND ANNUNCIATOR GROUP

As the operation code control relay 620 operates responsive to the determination of the existence of a synchronous relation between the equipment of the respective stations, it is effective at its contacts 623 to complete an operating circuit to the sending control relay 360 to thereby place the control station in the transmitting condition preparatory to the transmission of impulses for selecting the second group of annunciators at the seized point six at the substation.

The operating circuit for the sending control relay 360 extends from negative battery over the winding of relay 360, contacts 311, 374, conductor 33, contacts 623, conductor 26, contacts 635, 616, 629', conductor 51 and contacts 519 to ground.

Sending control relay 360 operates and at its contacts 363 connects the initial operating ground to control station impulse sending relay 665 to energize the impulse pumping arrangement thereat as previously described. Additionally, the sending control relay 360 at its contacts 361 completes obvious operating circuits for the auxiliary sending drive relays 340 and 350 which are maintained operated until the selection impulses have been completely transmitted. As the impulse sending relay 665 operates for the first time it is effective at its contacts 667 and 668 to complete an operating loop for the local line relay 680 and line relay 1000 at the substation.

Line relay 680 at the control station operates and at its contacts 684 interrupts the operating circuit for the impulse sending relay 665 which being of the slow-to-release type will responsively restore only after the elapse of the given interval of time. Line relay 680 at its contacts 681 completes an operating circuit for the first counting chain relay 215 at the control office.

First counting chain relay 215 operates and at its contacts 217 prepares a series operating circuit for the first sequence relay 210 of the counting chain, the sequence relay being maintained inoperative by reason of the shunt imposed by the original operating circuit for the counting chain relay 215.

As impulse sending relay 665 restores following transmission of the make period of the first impulse, it is effective at its contacts 667 and 668 to interrupt the energizing circuit for the line relay 680 and 1000 at the respective stations. Line relay 680 at the control station restores and at its contacts 681 interrupts the initial energizing circuit for counting chain relay 215 to remove the heretofore described shunt circuit for sequence relay 210. Sequence relay 210 operates in series with the first counting chain relay 215 over the prepared series circuit.

It will be remembered that the substation impulse transmitting control relays 810, 815, 820, 1010 etc., were restored following transmission of the matching impulse and accordingly, with receipt of the selection pulse from the control station and the operation of substation line relay 1000 responsive thereto, contacts 1001 complete an operating circuit for the receiving relay 835 to place the substation in the receiving condition. An operating circuit is also completed by contacts 1001 of the line relay 1000 for the first relay 915 of the counting chain, which operates and at its contacts 918 prepares a series operating circuit for its associated sequence relay 910, which circuit is presently maintained ineffective by the shunt imposed thereupon by the original operating circuit for the counting chain relay 915. Relay 835 at contacts 877 opens the holding circuit for relays 1030 and 1510. Relay 1030 in releasing opens the holding circuit for relay 1020 at contacts 1033. Relay 1020 at contact 1767 opens the holding circuit for relay 1750.

Line relay 1000 at the substation releases with receipt of the break period following the make period of the first selection pulse and at its contacts 1001 interrupts the initial energizing circuit for counting chain relay 915 to remove the shunt from sequence relay 910 and effect the series operation of sequence relay 910 and the first counting chain relay 915. Sequence relay 910 operates and at its contacts 911 completes an operating circuit for the receiving control relay 830 for the substation which operates and in turn controls operation of its auxiliary control relay 825. The substation is now in the receiving condition.

As control station line relay 680 is reoperated a second time by the pumping arrangement thereat, it is effective at its contacts 681 to complete an operating circuit for the second counting chain relay 220.

The second counting chain relay 220 operates and at its contacts 222 completes the pulse determining circuit for the operating code control relay 610, the circuit extending from negative battery over the winding of relay 610, contacts 622, conductor 28, contacts 353, conductor 21, contacts 1723, conductor 1640, contacts 1618, 1609, contacts 222, 226, 231, 236, 241, 246, 251, 256, 261, conductor 364, contacts 302, 372 and 331 to ground.

The operating code control relay 610 operates and at its contacts 616 interrupts the energizing circuit for the sending control relay 360 which is held operated over a second energizing circuit controlled by the line relay 680.

After the expiration of the predetermined time period, the impulse sending relay 665 releases and effects the release of the line relay 680 and 1000 at the respective stations. As the line relay 680 releases at the control station, it is effective at its contacts 683 to interrupt the second holding circuit for the sending control relay 360 to effect the restoration thereof, the first holding circuit therefor having been interrupted with the operation of the code control relay 610 and the opening of its contacts 616.

Line relay 680 at its contacts 681 interrupts the shunt circuit for the second counting chain relay 220 and its associated sequence relay 205 to effect the series operation thereof. Sequence relay 205 operates and at its contacts 206 interrupts the holding circuit for the sequence relay 210 and first counting chain relay 215 to effect the restoration thereof.

As the sending control relay 360 restores, it is effective at its contacts 361 to interrupt the holding circuits for the auxiliary sending drive relays 350 and 340, the sending drive relay 340 being of the slow-to-release type and therefore remaining in the operated condition for a predetermined period of time thereafter prior to its restoration. As the sending control relay 350 restores, it is effective at its contacts 351 to interrupt the energizing circuit for the second counting chain relay 220 and its associated sequence relay 205 to effect the restoration thereof. The transmitting condition of the control station has now been terminated.

At the substation as the line relay 1000 is operated in response to receipt of the second impulse of the group selection code transmitted by the control station, it is effective at its contacts 1001 to complete an operating circuit for the second counting chain relay 920 which operates and prepares a series circuit for the associate sequence relay 905.

As the line relay 1000 restores following termination of the make period of the second impulse, it is effective at its contacts 1001 to interrupt the shunt circuit for the second counting chain relay 920 and its associate sequence relay 905 which operate in series. Sequence relay 905 at its contacts 909 interrupts the holding circuit for the first sequence relay 910 and first counting chain relay 915 to effect the restoration thereof.

Line relay 1000 at its contacts 1001 also interrupts the energizing circuit for the receiving relay 835 and inasmuch as no further impulses are received at this point from the control station, line relay 1000 remains in a restored position for a time interval sufficient to effect the release of the receiving relay 835.

Receiving relay 835 restores and at its contacts 839' completes an operating circuit for the operation control relay 885, the circuit extending from negative battery over the winding of relay 885, conductor 1354, contacts 1045, contacts 1072, 1061, conductor 1364, contacts 857, 839', 833, conductor 1355, contacts 1035, conductor 1360 and contacts 837 to ground.

The operation control relay 885 operates and is effective at its contacts 1781 to effect the operation of the group selection relay 1530 (Fig. 15) which operates to select the second group of indicators 11 to 20 at the seized sixth point of the substation.

The operating circuit for the group selection relay 1530 which is associated with the second group of indicators 11 to 20, extends from negative battery over the winding of relay 1530, contacts 1502, conductor 1584, contacts 1781, conductor 1785, conductor 1328, contacts 923, 929', 934, 939, 944, 949, 954, 959, 964, conductor 1311, contacts 852 and 827 to ground. The annunciator group selection relay 1530 operates and extends the second group of indicators at point six to the feeler fingers of the substation counting chain for examination thereby and the ultimate transmittal of relevant information covering the indicators 11 to 20 at point six to the control station in the manner heretofore described.

Group selection relay 1530 for the second group of annunciators at point six operates and at its contacts 1542 extends its operating ground over conductor 1581 to the supervisory code relay 1030 to effect the operation thereof for the purpose of effecting the transmission of a check code of two impulses to indicate the indicator group which has been seized at the substation.

Supervisory code relay 1030 operates and at its contacts 1031 interrupts the holding ground for the second counting chain relay 920 and its associated sequence relay 905 to effect the restoration thereof. With the restoration of the sequence relay 905 and the opening of its associated contacts 906, the holding circuit for the receiver control relay 830 is interrupted and the restoration thereof is effected to terminate the receiving condition of the substation equipment.

Receiver control relay 830 in restoring is effective at its contacts 832 to interrupt the holding circuit for receiver control relay 825 which restores and at its contacts 826 completes an operating circuit for sending control relay 820 which operates to place the substation equipment in the transmitting condition.

Sender control relay 820 specifically operates over a circuit extending from negative battery over the winding of relay 820, contacts 826, conductor 1358, contacts 1051, 1032, 1042 and 1023 to ground. Sender control relay 820 operates and at its contacts 821 completes operating circuits for the associate sender drive relays 810 and 815 and at its contacts 822 effects energization of the impulse pumping arrangement for the substation equipment.

Sending relay 1010 responsively operates to initiate the pumping arrangement and effects energization of the line relays 680 and 1000 to initiate operation of the first counting chains 915 and 215 at the respective stations. Receiver relay 384 at the control station is also operated to condition the control station for the receipt of the check pulse to be transmitted by the substation, the relay 384 being effective at its contacts 387 to recomplete the operating circuit for the first time relay 1680 which in time energizes the second timer relay 1675 followed by the third timer relay 1670.

With the first release of the sending relay 1010 at the substation in the transmission of the check code to the control station, line relay 1000 restores to recomplete the operating circuit for the sending relay 1010 and to remove the shunt to permit the series operation of the first counting chain relay 915 and its associated sequence relay 910.

Line relay 680 at the control station restores with receipt of the first break and at its contacts 681 removes the shunt circuit to permit the series operation of the first counting chain relay 215 and its associated sequence relay 210. Sequence relay 210 at its contacts 214 completes an operating circuit for receiver control relays 370 and 380 as before.

The substation sending relay 1010 reoperates to initiate transmission of the make period of the second impulse and the line relay 680 and 1000 are responsively operated. Line relay 1000 at its contacts 1004 interrupts the energizing circuit for the sending relay 1010 and at its contacts 1001 completes an operating circuit for the second counting chain relay 920.

Counting chain relay 920 operates and at its contacts 923 completes an operating circuit for the supervisory code relay 1020, which relay is effective in its operation to terminate the transmission of the code check impulses inasmuch as a confirming check code of two impulses has been returned to the control station to indicate to the equipment thereat that the second group of indicators in the seized point six have been selected for examination purposes.

The operating circuit for the supervisory code relay 1020 extends from negative battery over the winding of relay 1020, contacts 1033, 1021, conductor 1362, contacts 817, conductor 1315, contacts 1797, contacts 1795, conductor 1817, contacts 1053, conductor 1356, contacts 881, contacts 828, contacts 852, conductor 1311, contacts 964, 959, 954, 949, 944, 939, 934, 929', 923, conductor 1328, conductor 1785, contacts 1781, conductor 1584, contacts 1502, contacts 1542, conductor 1581, contacts 1034, conductor 1360, contacts 837 to ground.

Supervisory code relay 1020 operates and at its contacts 1762 interrupts the holding circuit for the operation of control relay 885 to effect the restoration thereof; at its contacts 1023 interrupts one of the energizing circuits for sender control relay 820 which holds over the other energizing circuit and at its contacts 1763 completes an operating circuit for the indicator timer relay 1765, the circuit extending from negative battery over the winding of the relay 1765, contacts 1770, contacts 1753, conductor 1800, contacts 1763, contacts 1791, contacts 874 to ground. Timer relay 1765 is operated at this time to provide a given time period for operation of the control station equipment to compare the transmitted group signal with the check-back group signal and the reset of the equipment in the event a variance is found to exist.

As the sending relay 1010 at the substation releases for the second time in this series of impulses, the release of the line relays 680 and 1000 at the respective stations is effected. Line relay 1000 releases and at its contacts 1003 interrupts one of the operating circuits for relay 820, the second operating circuit for sender control relay 820 having been interrupted with the operation of the supervisory code relay 1020 and the opening of its contacts 1023. As line relay 1000 restores, it is also effective at its contacts 1001 to interrupt the shunt which has been imposed upon the series circuit for the second counting chain relay 920 and its associated sequence relay 905 to effect the operation thereof in series. Sequence relay 905 operates and at its contacts 909 interrupts the holding circuit for the first counting chain relay 915 and sequence relay 910 to effect the restoration thereof.

Sender control relay 820 in restoring is effective at its contacts 821 to interrupt the energizing circuit for the sender control relay 815 and sender drive relay 810 which responsively restore; relay 815 at contacts 816 interrupts a point in the holding circuit for the second counting chain relay 920 and second sequence relay 905 to effect the restoration thereof.

After a predetermined period of time has elapsed the sending drive relay 810 restores and at its contacts 1770 interrupts a point in the energizing circuit for the indicator timer relay 1765 which has slow-to-release characteristics and remains in the operated position for a predetermined period of time following interruption of its energizing circuit. After the elapse of such time period, the timer relay 1765 restores and at its contacts 1767 completes an operating circuit for the indicator start relay to initiate transmission of information bearing impulses to the control station relative to the condition of the indicators in the second group at the selected point six at the substation.

At the control station line relay 680 is energized with receipt of the second impulse of the check group being sent by the substation and at its contacts 681 effects the operation of the second counting chain relay 220. Chain relay 220 operates and at its contacts 223 prepares the series operating circuit for associate sequence relay 205 which is presently shunted by the operating circuits for the counting chain relay 220.

As the second make period of the incoming impulse group is completed, line relay 680 is restored and at its contacts 681 interrupts the shunt for the prepared series circuits for the sequence relay 205 and the second counting chain relay 220 to effect the series energization thereof. Sequence relay 205 operates and at its contacts 206 interrupts the holding circuit for the first counting chain relay 215 and its associated sequence relay 210 to effect the restoration thereof.

As a result of the termination of the incoming group of impulses line relay 680 is maintained in the restored condition for a time period sufficient to effect the restoration of the receiving relay 384. After the elapse of the predetermined time period determined by the slow-to-release characteristics thereof, receiving relay 384 restores and at its contacts 387 interrupts the holding circuit for the timer relay 1680 to effect restoration thereof with timer relay 1675 and 1670 and at its contacts 386 completes an operating circuit for the supervisory control relay 280, the operating circuit extending from negative battery over the winding of relay 280, conductor 43, contacts 611, 645, conductor 27, contacts 304′, contacts 383, 386 and 1687 to ground. Supervisory code relay 280 operates and at its contacts 1636 completes an obvious operating circuit for the auxiliary indication control relay 1625 which in its operation prepares circuits to the indicator group relays at the control station. Supervisory code relay 280 at its contacts 283 completes an operating circuit for the anti-pump relay 520 which extends from negative battery over the winding of relay 520, conductor 1679, contacts 1717, contacts 1724, conductor 1683, conductor 60, contacts 283, conductor 58, contacts 673, contacts 632 and 643 to ground.

Auxiliary indication control relay 1625 operates and at its contacts 1627 completes an operating circuit for the second group of selection relays 2A1 and 2A2 which control the annunciator indicator lamps associated with indicators 11 to 20 (the second group of indicators at point six), the operating circuit for the group selection relays 2A1 and 2A2 extending from battery over the windings of relays 2A1 and 2A2, conductors 1475, contacts 1627, 1632, contacts 222, 226, 231, 236, 241, 246, 251, 256, 261, conductor 364, contacts 302 and 371 to ground.

As the group selection relays 2A1 and 2A2 operate, energizing circuits are prepared to the annunciator indication relays AR11 to AR20 associated with the indicator lamps AL11 to AL20.

Group selection relay 2A1 is also effective at its contacts 1436′ to extend the operating ground for the relays to auxiliary group selection relay 1700, the energizing circuit extending over contacts 1436′, conductor 1492 to the winding of relay 1700 and negative battery.

Auxiliary group selection relay 1700 is operative to prepare the control office equipment for registration of the indications which are to be subsequently transmitted by the substation, and is effective at its contacts 1702 to complete an operating circuit for the indication agreement relay 515, the circuit extending from negative battery over the winding of relay 515, conductor 1624, contacts 1702, conductor 1638, contacts 1637, conductor 1639, contacts 1690, conductor 21, contacts 1723, conductor 1640, contacts 1618, 1609, contacts 222, 226, 231, 236, 241, 246, 251, 256, 261, conductor 364, contacts 302 and 371 to ground. Indication agreement relay 515 operates, 516 interrupts the holding circuit for the operating code control relay 620 to effect the restoration thereof and at its contacts 519 interrupts the holding circuit for the second sequence relay 205 and second counting chain 220 to effect the restoration thereof.

As the code control relay 620 restores, it is effective at its contacts 622 to interrupt the holding circuit for the code control relay 610 which responsively restores.

Sequence relay 205 restores and at its contacts 209 interrupts the energizing circuit for the receiver control relay 380 which restores and at its contacts 381 effects restoration of the associate receiving relay 370. Code control relay 610 at its contacts 611 interrupts the energizing circuit for the supervisory control relay 280 to effect the restoration thereof.

As the group selection relays 2A1 and 2A2 operate, they are effective at their contacts 1435′ to prepare an operating circuit for the second indicator group selection marking relay 1610, the circuit extending from negative battery over the winding relay 1610, conductor 1470, contacts 1435′, conductor 1494 and contacts 1686 to ground, such circuit being completed as the receiving control relay 380 subsequently restores. Supervisory code control relay 280 at its restoration effects the opening of contacts 1637 and the interruption of the operating circuit for the indication agreement relay 515 which responsively restores; and at its contacts 1636 interrupts the energizing circuit for the auxiliary indication control relay 1625 to effect the restoration thereof.

The control station is now conditioned to receive an informative group of impulses concerning the second group of indicators at the seized point as transmitted by the substation equipment.

It is apparent that in the event that the check-back pulse does not comprise the two impulses originally transmitted by the control station, an operating circuit will not be completed for indication agreement relay 515, and the sequence of the relay operations will be stopped at that point. Additionally, should the check-back signal comprise a signal of other than two impulses, a group selection indicator relay at the control station other than the group relays 2A1 and 2A2 will be incorrectly operated. Accordingly, it is imperative that the equipment be reset whenever a variance of signals exists.

As an example, it is assumed that a check-back comprising one impulse is now received at the control station instead of the required two impulses. After the elapse of the predetermined period of time during which the line relay 680 is in the restored condition, the receiving relay 384 will restore to complete an operating circuit to the supervisory control relay 280 as previously described. The supervisory control relay 280 in turn completes an operating circuit for the auxiliary indication control relay 1605 and at its contacts 283 completes an operating circuit for the anti-pump relay 520.

Auxiliary indication control relay 1625 operates and at its contacts 1627 completes an operating circuit for the first group of selection relays 1A1 and 1A2, it having been assumed that the counting chain at the control station has received only the one impulse as a check-back signal.

The group selection relays 1A1 and 1A2 operate in the manner heretofore described and complete an operating circuit for the auxiliary group selection relay 1700. Auxiliary group selection relay 1700 operates and at its circuit 1702 attempts to complete the operating circuit for the indication agreement relay 515, which is interrupted however by reason of the open contacts 222. The indication agreement relay 515 will therefor be maintained in the restored condition.

The operating sequence of the relays thereafter is interrupted by the indication agreement relay 515 in its restored condition, and there is no further operation pending the restoration of the first timer relay 1680 (the operating circuit therefor having been interrupted with the restoration of the receiving relay 384). After the elapse of approximately a five second interval the first timer relay 1680 restores, and at its contacts 1682 interrupts the holding circuit for the second timer relay 1675. Relay 1675 restores after the elapse of a predetermined delay period and at its contacts 1678 interrupts the holding circuit for the third timer relay 1670, which is also of the slow-to-release type, and remains operated for a brief period thereafter. During the momentary period during which the second timer relay 1675 is restored and the third timer relay 1670 is operated, an operating circuit is completed for the fourth timing relay 1665 which operates in the manner heretofore described to effect reset of the equipment, such description having been set forth heretofore relative to the reset of the equipment in the event that a non-synchronous relation between the relative counting chains of the respective stations is discovered in the matching impulse transmission following the examination of each group of indicators.

In the event of a reset under the present conditions, the substation equipment is operative to send the indicator impulses for the seized group of indicators even though a stall has been discovered in the control station and the reset of the equipment thereat is being effected. The substation equipment transmits each of the ten indicator pulses over the inter-connecting communication channel, these impulses being ineffective however to operate the counting chain at the control station by reason of the open circuit condition thereat effected by the supervisory control relay 280 and the receiving relay 384.

As the extra long reset impulse is received by the substation from the control station, the substation line relay 1000 is maintained in an operated position regardless of the impulse transmission being effected thereat, and the reset relay 840 at the substation is restored and to effect the reset of the substation equipment in the manner heretofore described.

TRANSMISSION OF INFORMATIVE PULSES FOR INDICATOR GROUP TWO—POINT SIX

As the timer relay 1765 restores following the elapse of the predetermined time period after transmission of the check-back signal, it is effective at its contacts 1767 to complete the operating circuit to the indicator start relay 1755 which circuit extends from negative battery over the winding of relay 1755, contacts 1767, 1771, 1753, conductor 1800, contacts 1763, 1791, conductor 1353 and contacts 874 to ground.

The indicator start relay 1755 operates and initiates the transmission of the informative impulses concerning the indicators of group two, point six at the substation by completing an operating circuit for the sending control relay 820, the circuit extending from negative battery over the winding of relay 820, contacts 826, conductor 1358, contacts 1051, 1032, 1046, conductor 1789, contacts 1756, 1761', 1754 to ground. With the operation of the sender control relay 820, the impulse pumping relay comprising sending relay 1010 and line relay 1000 at the substation are repeatedly operated to advance the chain at the substation over each of the ten relays 915 to 960, inclusive, in the manner described relative to the transmission of informative pulses for the first indicator group. The second indicator group is the effective group in this operation by reason of the operated condition of the group selection relay 1530 and the connection thereby at its contacts 1531 to 1540, of the second group of indicators 11 to 20, to the feeler contacts at 1571 to 1580 associated with the counting chain at the substation. The substation impulse pumping arrangement causes each of the counting chain relays to operate their associated feeler contacts in a given sequence and to simultaneously transmit an informative impulse to the control station equipment representing the condition detected by the feeler contacts.

The counting chain at the control station advances therewith receipt of the ten informative impulses and at its feeler contacts 1646 and 1655 prepares each of the indicator relays AR11 to AR20 associated with the second group for operation in a given sequence, the indicator relay prepared being operated only in the event of the receipt of a signal indicating the existence of an alarm condition at its corresponding indicator at the substation. The indicator relays AR11 to AR20 are the effective relays at this time, by reason of the operated condition of the group selection relays 2A1 and 2A2.

As in the previous description pertaining to the reporting of the condition of the first group of indicators, in the event of the existence of a fault condition at one of the indicators 11 to 20, the indicator associated with the fault will be in the operated condition and its associated contacts, such as 1568, will be closed to supply battery to the feeler contact of the corresponding relay in the substation counting chain as the chain is advanced thereto. With the detection of positive battery on its associated feeler contact, the counting chain relay effects completion of an operating circuit for the indicator pause relay 1760, which in turn effects the introduction of a pause of a predetermined length in the transmission of the impulse group. The fault detection relays at the control station respond to the pause to effect the operation of the corresponding group indicator relay and lamp at the control station.

TRANSMISSION OF MATCHING IMPULSE TO CONTROL STATION

As the stations are advanced over each of the ten counting chain relays and each of the substation indicators 11 to 20 have been examined, a matching impulse is generated by the substation pumping arrangement to check for the synchronism of operation of the counting chain at the several stations. As the matching pulse is transmitted by the sending relay 1010, line relays 680 and 1000 are operated for the eleventh time. Substation line relay 1000 at its contacts 1001 completes an operating circuit for the indicator stop relay 1750 in the manner heretofore described to terminate the operation of the impulse transmitting arrangement and the transmission of the present series of informative impulses to the control station. Stop relay 1750 is operative in the manner set forth previously relative to the transmission of a matching impulse following examination of indicators 1 to 10, to effect the restoration of the timer relay 1765, the tenth counting chain relay 960, the sequence relay 910, the sender control relay 815 and the sender drive relay 810.

At the control station, the matching impulse effects operation of the eleventh counting chain relay 1660 which is effective at its contacts 1661 to prepare the agreement circuit for the equipment if the synchronous relation is found to exist.

With the restoration of line relay 680, as the incoming impulses are terminated, the sequence relay 205 operates to effect release of the tenth counting chain relay 260 and the sequence relay 210. Receiving relay 384 is also released responsive to the prolonged restoration of the line relay 680. With the restoration of the receiving relay 384, and the operation of the matching relay 1660, the control equipment is prepared to transmit a group of three selective impulses to the substation equipment to effect selection of the third group of indicator relays (indicators 21 to 30, inclusive) associated with the selected point six at the substation. In that the group selection code of three impulses is generated in a manner similar to that effected in the generation of the first and second group codes, the detailed circuit description at this point will only be given in the instances of variation from the previous description.

As the receiving relay 384 restores, it effects the interruption of the energizing circuit for the timer relay 1680 and completes an operating circuit for the indicator group release relay 1710 as previously described. Group release relay 1710 operates and at its contacts 1712 completes an obvious operating circuit for its associated annunciator group release relay 1715 to effect the energization thereof; and at its contacts 1711 interrupts the holding circuit for the auxiliary selection group relay 1700 and the group selection relays 2A1 and 2A2 which responsively restore.

As the annunciator group release relay 1715 operates, it is effective at its contacts 1717 to interrupt the holding circuit for the anti-pump relay 520 to effect the restoration thereof. Auxiliary selection group relay 1700 restores and at its contacts 1707 interrupts the holding circuit for the eleventh counting chain relay 1660 and its associate sequence relay 205 to effect the restoration thereof.

As the eleventh counting chain relay 1660 restores, it is effective at its contacts 1661 to interrupt the energizing circuit for the annunciator group release relay 1710 to effect the restoration thereof, which being slow-to-release remains in the operated condition for a predetermined period of time thereafter. With the elapse of such period, it restores and at its contacts 1712 effects the restoration of its associated relay 1715 which likewise holds for a predetermined period of time subsequent to opening of its operating circuit. With the subsequent restoration of the associate relay 1715, it is effective at its contacts 1718 to complete the operating circuit for the operating control relay 620.

Operating code control relay 620 operates responsive to the determination of the existing synchronous condition and at its contacts 623 completes the operating circuit for the sending control relay 360, which operates and at its contacts 363 energizes the impulse pumping arrangement comprising impulse sending relay 665 and line relay 680. The pumping arrangement is now operative to generate the three group selector impulses for effecting selection of the third group of annunciators at the seized substation point six.

The local counting chain advances to the third counting chain relay 225 as the three impulses are generated and in that the group selection marking chain relays 1605 and 1610 were operated in sequence and at their contacts 1608 and 1616 respectively were locked to ground, the pulse determining circuit for the present series of impulses is prepared for completion as the counting chain advances to the third relay. As the counting chain is so advanced responsive to the generation of the three impulses, an operating circuit is completed to the operation code control relay 610, such circuit extending from negative battery over the winding of relay 610, contacts 622, conductor 28, contacts 353, conductor 21, contacts 1723, conductor 1640, contacts 1617, contacts 227, 231, 236, 241, 246, 251, 256, 261, conductor 364, contacts 302, contacts 372 and 331 to ground.

As the operation code control relay 610 is operated, it is effective at its contacts 616 to interrupt the first energizing circuit for the sending control relay 360, whereby as the line relay 680 subsequently releases to open the second energizing circuit for sending relay 360 following transmission of the last impulse, the sending control relay 360 will restore.

As line relay 680 releases following the transmission of the last pulse, it also effects the operation of the sequence relay 200 in series with the third counting chain relay 225, which in its operation effects the release of counting chain relay 220 and sequence relay 205.

Sending control relay 360 restores and effects release of its associate sending drive relays 350 and 340 which in turn effect release of the third counting chain relay 220 and the sequence relay 200. The transmission by the substation of the group of three selective impulses to effect seizure of the third annunciator group at point six has now been effected. At the substation, the equipment is in the partially restored condition as the result of the restoration effected following transmission of the matching impulse to the control station. As the three incoming group selection impulses are received, the substation is operated to the receiving condition and the advancement of the counting chain thereat to the third counting chain relay 925 is effected in the manner of the previous operations. Following receipt of the three impulses, the line relay 1000 is restored for a sufficient length of time to effect restoration of the receiving relay 835 which in turn effects energization of the operation control relay 885.

Operation control relay 885 operates and at its contacts 1780 controls the operation of the indicator group selection relay 1550 associated with the third group of indicators 21 to 30, inclusive, the selection of the group selection relay 1550 for the third group being made as a result of the operated condition of the third counting chain 925 as the operation control relay 885 is operated. Specifically, the operating circuit for the annunciator group selection relay 1550 associated with the third group extends from negative battery over the winding of the relay 1550, contacts 1505, conductor 1585, contacts 1780, conductor 1786, conductor 1300, contacts 853, conductor 1301, contacts 929, 934, 939, 944, 949, 954, 959, 964, conductor 1311, contacts 852 and contacts 827 to ground.

The group selection relay 1550 associated with the third group of indicators at point six indicators 21 to 30) operates and at its contacts connects the indicators 21 and 30 to the feeler contacts associated with the counting chain at the substation, and at its contacts 1562 extends its operating ground over conductor 1581 to the supervisory code relay 1030.

Supervisory code relay 1030 operates and at its contacts 1031 interrupts the holding circuit for the third counting chain relay 925 and its associated sequence relay 900 to effect the restoration thereof. As the sequence relay 900 restores, it is effective at its contacts 901 to interrupt the holding circuit for the receiver control relay 830, which responsively restores and at its contacts 832 effects the restoration of associated receiver control relay 825.

As receiver control relay 825 restores, it is effective at its contacts 826 to recomplete the operating circuit for the sender control relay 820 to initiate transmission of a check group of three impulses to indicate to the control station equipment that the third group of indicators at point six has been seized as a result of the last impulse transmission.

Sender control relay 820 operates and at its contacts 822 completes operating circuits for associated sender control relay 815 and sender drive relay 810, and at its contacts 822 completes an operating circuit for the impulse pumping arrangement comprising sending relay 1010 and associate line relay 1000.

The pumping arrangement operates in the manner heretofore described to advance the local counting chain to the third relay 920 and to simultaneously effect the transmission of three operating impulses over the interconnecting line loop to the line relay 680 at the control station.

As the third counting chain relay 925 operates responsive to the advancement of the chain thereto by the impulse pumping arrangement in the transmission of the check code, an operating circuit is completed for the supervisory code control relay 1020 which is effective in its operation to terminate the energization of the impulse pumping arrangement at the substation.

The operating circuit for the supervisory code relay 1020 specifically extends from battery over the winding of relay 1020, contacts 1033, contacts 1021, conductor 1362, contacts 817, conductor 1315, contacts 1797, 1795, conductor 1817, contacts 1053, conductor 1356, contacts 881, contacts 828, contacts 852, conductor 1311, contacts 964, 959, 954, 949, 944, 939, 934, 929, conductor 1301, contacts 853, conductor 1300, conductor 1786, contacts 1780, conductor 1585, contacts 1505, contacts 1562, conductor 1581, contacts 1034, conductor 1360 and contacts 837 to ground.

Supervisory code control relay 1020 operates and at its contacts 1022 completes a self-holding circuit, at its contacts 1763 completes an operating circuit for the annunciator timer relay 1765, and at its contacts 1023 interrupts one of the energizing circuits for sender control relay 820.

As the line relay 1000 restores following transmission of the third impulse, it is effective at its contacts 1003 to interrupt the second energizing circuit for the sender control relay 820 to effect the restoration thereof and thereby terminate the sending condition of the substation equipment.

With the restoration of line relay 1000, the sequence relay 900 operates and at its contacts 904 interrupts the holding circuit for the second sequence relay 905 and the second counting chain relay 920 to effect the restoration thereof. With the subsequent restoration of the sender control relay 815 and the opening of contacts 816, the holding circuit for the third counting chain relay 925 and the third sequence relay 900 is interrupted and the restoration of these relays is effected.

At the control station, the coded group check signal of three impulses is received by the line relay 680 which responsively places the control station equipment in the receiving condition and advances the counting chain thereat to the third relay 225 to effect the operation thereof in series with the associated sequence relay 200.

After the expiration of a predetermined period of time following receipt of the code group of the impulses, the receiving relay 384 restores and completes an operating circuit for the supervisory code control relay 280 as in the previous operations and in turn completes an operating circuit for the auxiliary indication control relay 1625 and the anti-pump relay 520. The auxiliary indication control relay 1625 operates and at its contacts 1628 completes the energizing circuit for the group selection relays 3A1 and 3A2 associated with the indicator lamps AL21 to AL30 for indicators 21 to 30, inclusive. The operating circuit for the group selection relays extends from negative battery over the winding of relays 3A1 and 3A2, conductor 1477, contacts 1628, 1633, contacts 227, 231, 236, 241, 246, 251, 256, 261, conductor 364, contacts 302 and contacts 371 to ground.

Group selection relays 3A1 and 3A2 operate and relay 3A1 at its contacts 1436" extends the operating circuit for these relays over conductor 1492 to the winding of the auxiliary group selection relay 1700.

Auxiliary group selection relay 1700 is operative to check for agreement of the received check code with the group selection code as transmitted and upon determination of agreement thereof to condition the control office for recording of the annunciator indications which are to be subsequently transmitted by the substation. Group selection relay 1700 operates and effects the completion of an operating circuit to the indication agreement relay 515 as a result of the agreement of the signals. Indication agreement relay 515 operates and at its contacts 516 interrupts a point in the holding circuit for the operation code control relay 620 to effect the release thereof, and at its contacts 519 interrupts the holding circuit for the counting chain relay 225 and its associated sequence relay 200 to effect the restoration thereof, which in turn effects the release of the receiver control relay 380 and 370. Code control relay 620 at its contacts 622 interrupts the holding circuit for its associated code control relay 610 which likewise restores.

Receiving control relay 380 at its contacts 383 interrupts the energizing circuit for the supervisory code control relay 280 which restores; and at its contacts 1636 completes an operating circuit for the third annunciator group selection marking relay 1620 which is operative to cause group three of the indicators to be selected at the control office, the circuit extending from negative battery over the winding of relay 1620, conductor 1470', contacts 1435", conductor 1494, contacts 1686 to ground. As the supervisory code relay 280 restores, it is effective at its contacts 1637 to interrupt the holding circuit for the indication relay 515 and at its contacts 1636 interrupts the energizing circuit for the auxiliary indication control relay 1625 to effect the restoration thereof.

TRANSMISSION OF INFORMATION BEARING IMPULSES FOR INDICATORS 21 TO 30, INCLUSIVE

With the restoration of the indicator timer relay 1765 at the substation after the elapse of the predetermined period of time, it is effective at its contacts 1767 to complete the operating circuit for the indicator start relay 1755 which is effective at its contacts 1756 to complete an operating circuit for the sender control relay 820. With operation of the sender control relay 820 the impulse pumping arrangement at the substation is reoperated to cause the counting chain to advance and effect the operation of the feeler contacts 1807 to 1815 in the examination of the indicators 21 to 30, and to transmit informative impulses concerning same to the control station, the examination and signal transmission of the conditions encountered being effected as in the previous indicator selections at point six.

Following examination of each of the ten indicator points 21 to 30, a matching impulse is again transmitted by the substation equipment to the control station to insure the synchronous operation of the equipment. With transmission of the matching pulse, line relay 1000 at its contacts 1001 completes an energizing circuit for the annunciator stop relay 1750 which operates to effect restoration of the timer relay 1765 and the indicator start relay 1755.

As the sending relay 1010 and line relay 1000 restore following transmission of the matching impulse, the second energizing circuit for the sender control relay 820 is interrupted (the first energizing circuit having been interrupted with the operation of relay 1750) and the transmitting condition of the substation is thereby terminated. The sender control relay 820 at its contacts 821 interrupts the holding circuit for the sender control relay 815 and sender drive relay 810, which restores to effect the restoration of the tenth counting chain relay 950 and sequence relay 910.

At the control station, the counting chain advances across the ten relays thereof and controls the operation of the indicator lamps AL20 to AL30 in accordance with the teachings of the incoming informative impulses.

With the receipt of the eleventh or matching impulse, the eleventh counting chain relay 1660 is operated and with the subsequent restoration of the line relay 680 following receipt of such impulse, the sequence relay 205 operates in series with the eleventh counting chain relay 1660. Sequence relay 205 at its contacts 206 effects the restoration of the tenth counting chain relay 260 and the first sequence relay 210.

After a predetermined period of time has elapsed following restoration of the line relay 680, the receiving relay 384 restores and at its contacts 1688 completes an operating circuit for the indicator group release relay 1710 which operates, and at its contacts 1712 completes an operating circuit for the associate group release relay 1715. Receiver relay 384 at its contacts 387 also interrupts a point in the holding circuit for the timer relay 1680 which responsively restores.

As group release relay 1710 operates, it is effective at its contacts 1711 to interrupt the holding circuit for the auxiliary group selection relay 1700. Group selection relay 1700 restores and at its contacts 1703 interrupts the holding circuit for the group selection relays 3A1 and 3A2 which are associated with the third group of indicator lamps at the seized point. Relays 3A1 and 3A2 restore in response thereto.

Annunciator group release relay 1715 operates and at its contacts 1717 interrupts the holding circuit for the anti-pump relay 520 to effect restoration thereof. As the auxiliary group selection relay 1700 restores, it is effective at its contacts 1707 to interrupt the holding circuit for the eleventh counting chain relay 1660 and its associate sequence relay 205.

The eleventh counting chain relay 1660 restores and is effective at its contacts 1661 to interrupt the holding circuit for the annunciator group release relay 1710, which being of the slow to release type remains operated for a brief period of time thereafter. After the expiration of a predetermined period of time, the indicator group release relay 1710 restores and at its contacts 1712 interrupts the operating circuit for the associated annunciator group release relay 1715 which is also of the slow-to-release type.

When relay 1715 operates at its contacts 1716 it completes an operating circuit for the reset control relay 600, the circuit extending from negative battery over the winding of relay 600, contacts 608, conductor 29', conductor 1659, contacts 1621, conductor 1658 and contacts 1716 to ground. Reset control relay 600 operates to initiate the reset of the equipment at the despatch and substation offices.

RESET OF EQUIPMENT

Specifically, as reset relay 600 operates, it is effective at its contacts 603 to complete an operating circuit for the impulse sending relay 665 to effect the transmission of a reset signal consisting of a single long pulse. The impulse sending relay 665 operates and at its contacts 667 and 668 completes the operating circuits for the line relay 680 and 1000 at the respective stations.

Reset relay 600 operates to hold the impulse sending relay 665 operated for a comparatively long period, which in turn holds the line relay 680 and 1000 energized until the reset operation has been practically completed.

Line relay 680 at the control station operates and at its contacts 631 effects the incidental operation of the first counting chain relay 215, the associated sequence relay 210 being maintained inoperative by reason of the shunt imposed by contact 681 of line relay 680. Line relay 680 at its contacts 681 effects the incidental operation of receiving relay 384; and at its contacts 682 interrupts the operating circuit of reset relay 390 which being of the extra slow-to-release type will be maintained energized for a predetermined period thereafter.

With the elapse of the predetermined time period, reset relay 390 restores and at its contacts 392 interrupts the source of potential for the following equipment: reset relay 600, group stop relay 670, group code relay 660, point stop relay 640, point code relay 630, start relay 326 and 322, preliminary impulse relays 300 and 303, point guard relay 791, group guard relay 794, point start relay 750, group start relay 715, group selection relay 440 and 450, point selection relay 1410, and indicator group selection marking relays 1605, 1610 and 1620. Any of the indicator lamps, such as AL4, and their associated indicator relays such as AR4 which have been illuminated as the result of the existence of a fault condition at the corresponding substation point are held operated by the ground extending over contacts 1731, C1603, contacts 1602, and C1476. It is apparent that by operation of the annunciator key 1600 to open contacts 1602 the indications on the board will be wiped out. If the attendant operates a selection key to effect selection of a further indicator point, the previous indications are wiped out with the operation of the indicator start relay 1730 and the opening of contacts 1731.

As the reset control relay 600 releases responsive to the opening of its energizing source by the reset relay contacts 392, it is effective at its contacts 603 to interrupt the operating circuit for the impulse sending relay 665. Impulse sending relay 665 and start relay 322 in releasing recomplete an operating circuit for line supervision relay 685 which extends from positive battery through resistor 1018 over contacts 1011, line relay 1000, contacts 1014, line conductor 85, contacts 666, line relay 680, winding of line supervisory relay 685, C31, contacts 325b, C30, resistor 659, contacts 669, line conductor 86, contacts 1012, C1361, contacts 868 and 873 through resistor 872' to battery (the substation equipment being restored at this time).

Line supervision relay 685 operates to restore supervision for the line, it being effective at its contacts 687 to effect restoration of the associated line supervision relay 690, and at its contacts 686 to hold the associated relay 695. Relay 690 releases and at its contacts 691 interrupts the energizing circuit for the alarm lamp 515 to extinguish same. The equipment at the dispatch office is now completely restored for subsequent operation as desired.

Referring now to the reset operation which occurs at the substation as line relay 1000 thereat is operated responsive to the long reset pulse received from the control station, the line relay 1000 operates to close its contacts 1001 and complete an incidental operating circuit for the first counting chain relay 915. Line relay 1000 at its contacts 1001 also effects the completion of the circuit for the receiving relay 835 which operates and at its contacts 837 interrupts the holding circuit for the time delay relay 1098, supervisory code relay 1030 and group selection relay 1550 to effect the restoration thereof. Supervisory code relay 1030 in its release is effective at its contacts 1033 to open the operating circuit for associated supervisory code relay 1020 to effect the restoration thereof.

With the expiration of the given time period after the energization of line relay 1000, the open contacts 1002 effect the restoration of the reset relay 840 which at its contacts 841 completes an operating circuit for an associated time delay relay 800. Time delay relay 800 operates and at its contacts 801 completes an operating circuit for associated time delay relay 860.

Reset relay 840 releases and at its contacts 842 interrupts the potential supply for the following equipment at the substation to effect the restoration thereof; group code relay 1080, group check relay 1070, point code relay 1050, point check relay 1040, incoming start relay 870, counting chain relay 915, preliminary protective pulse terminating relay 850 and 855, indicator preparatory relays 1790, group selection relays 1150 and 1160, and point selection relay 1500.

Reset relay 840 at its contacts 843 effects the release of receiving relay 835. The equipment is now practically restored with the exception of the reset relay and the time delay relays associated therewith.

As the reset operation at the control office is completed, operating circuits for the line relay 680 and 1000 are interrupted and the line relays are restored. Line relay 1000 at its contacts 1002 recompletes an energizing circuit for the reset relay 840 which operates and at its contacts 841 interrupts the energizing circuit for the time delay relay 800. Relay 800 being of the extra-slow-to-release type restores after the elapse of such interval and interrupts the operating circuit for the time delay relay 860 which being of the extra-slow-to-release type releases after a predetermined interval has expired. The equipment at the substation is now reset and in its restored condition is prepared for further supervisory operations of the type described.

CONCLUSION

It is apparent that the indicating system set forth herein is operable to supply a centralized station with a comprehensive and accurate picture of the condition of equipment located at remotely located substations. Moreover, the comparatively economical structure of the indicating system and its flexible nature encourages the use thereof with both existing and new types of supervisory control systems. Of special note is the unlimited amount of information which may be expeditiously transmitted to the central office over a single two wire interconnecting communication channel, such channel being also used to effect supervisory control of the equipment for which the indications are being effected.

The manner of arrangement of the indicating and signalling equipment at each of the stations insures safe and dependable control and reporting operations, a strict divisional line being maintained between the signalling and indicating functions. The arrangement whereby the equipment is operative to retain and subsequently establish a signalling operation which may be initiated at such time as an indicator function is under way insures the provision at all times of an accurate picture of the condition of the switching units at each of the substation points.

Other additional operating features provided by the novel indicator system include the manner in which an unlimited number of indicators may be located at an indication point, whereby even the smallest details of operation of the controlled equipment may be readily monitored. The more detailed nature of the supervision attainable with such arrangement minimizes the possibility of improper operation of the equipment at times when severe and irreparable damage may result.

Of noteworthy importance is the manner in which the existing equipment of the basic control equipment at the substation and control station are utilized in the indicator system whereby an extremely economical type arrangement is effected. The inclusion of such safeguards as the matching pulse test following each group indication transmission to determine the synchronism in operation of the equipment at the respective stations, and the provision of reset equipment which is operative in the event that a non-synchronous relation is discovered, insures a high degree of accuracy and reliability in the reporting of the indications at the central office. The provision of the group check-back signals subsequent to the selection of each group of indicators at a point is a further safeguard against possible inaccuracies in point indication.

These and other features and advantages set forth herein clearly teach a supervisory arrangement which is new and novel in its structure and which is a desirable advancement in the art. Other obvious features of the invention which are believed to be new are set forth in the following claims.

I claim:

1. In a supervisory system adapted for remote control purposes having a controlling station and at least one controlled substation, each station including equipment for transmitting and receiving coded signals over an interconnecting signal channel, a plurality of corresponding points at each station, synchronously operated selection means at the respective stations operative with receipt of a code signal to select one of the corresponding point sets, the point set selected being determined by the nature of the code signal received; at least one of said pair of said corresponding points having a plurality of groups of corresponding functional members at the respective stations connected for selection thereat, each corresponding functional member of each corresponding group being arranged to accomplish an individual assigned functional operation, a functional group selection means for each group of functional members; said selection means at the respective stations operative responsive to receipt of a signal following operation of the one of the functional group selection means at said point indicated by a further signal received, and means including said selection means operative responsive to seizure of a group of said functional members by an operated one of said group selection means to effect sequential and independent selection of each of said corresponding functional members of the group for accomplishing the operations assigned thereto.

2. In a supervisory system adapted for remote control purposes having a controlling station and at least one controlled substation, each station including equipment for transmitting and receiving coded signals over an interconnecting signal channel, a plurality of points at said controlled station, each of which points has a coded signal preassigned to effect the seizure thereof, selection means for accomplishing direct selection of a point in accordance with the particular coded signal received thereby from said control station, at least one of said points having a plurality of groups of functional members connected for seizure thereover, means for connecting each functional member to individually perform an assigned functional operation, functional group selection means for each of said groups, and means including said selection means for a point operative responsive to receipt of a further signal after seizure of the point to effect operation of the ones of the functional group selection means at said point represented by said signal, and means including said point selection means operative responsive to operation of one of said functional group selection means to sequentially select each of said functional members in the selected group to accomplish the functional operation assigned to each of said members.

3. In a supervisory system adapted for remote control purposes having a controlling station and at least one controlled substation, each station including equipment for transmitting and receiving coded signals over an interconnecting signal channel, a plurality of corresponding points at said stations, synchronous selection means at the respective stations operative with receipt of a coded signal to select one of said corresponding point sets, the point set selected being determined by the nature of the signal received by the selective means, at least one of said points having a plurality of groups of indicator members associated therewith, each indicator at the controlled station being arranged to indicate alternatively an alarm and a normal condition of preassigned equipment at the substation, each indicator at the control station being arranged to provide the substation indications to the attendant at the control station, and means including said synchronous selection means operative responsive to receipt of a coded signal after seizure of said one point to select one of said groups of indicators as determined by a further incoming coded signal, and means including said synchronous selection means operative responsive to seizure of a group at a point to cyclically effect individual and sequential connection of each of the successive indicators of each group as seized to the local transmitting means to effect in each cycle the transmission of the information taught by each one of the indicators to the corresponding control station indicator.

4. In a supervisory system adapted for remote control purposes having a controlling station and at least one controlled substation, each station including equipment for transmitting and receiving coded signals over an interconnecting signal channel, a plurality of points at said substation, selection means thereat having individual access to each of said points operative to select a desired one of said points in accordance with the value of a predetermined one of said code signals received over said interconnecting channel, at least one of said points having a plurality of indicator units associated therewith, each unit being operative to indicate the condition of individual preassigned equipment at the substation, control means for selecting said point including said selection means at said substation operative responsive to seizure of one of said indicator points to examine in sequence each of the indicator units associated therewith and to transmit coded signals to said control station expressing in said sequence the condition indicated by each of said indicator units at the point seized, and corresponding indicator means at said control station operative responsive to receipt of said coded signals for indicating the nature of the existing condition of said members as expressed by the associated indicators at the seized substation point.

5. In an arrangement as set forth in claim 4 in which said indicator units at said substation and at said control station includes means for informing the attendant of the existing normal and fault conditions of the members at said substation.

6. In a supervisory system adapted for remote control purposes having a controlling station and at least one controlled substation, each station including equipment for transmitting and receiving coded signals over a single interconnecting signal channel, a plurality of points at said substation, at least one of said points having a plurality of groups of indicator units, each indicator unit being adapted to indicate the condition of a preassigned member disposed at said substation, selection means at said substation operative in accordance with a first group of coded signals received from said control station to select the point of said plurality corresponding to the code signal received, and operative responsive to receipt of a further signal to select each group of indicators at said seized point in a given sequence as taught by said further signal and thereafter each indicator of said group in the given sequence, control means at said substation including said selection means automatically operative responsive to seizure of each of the indicator units of said group to transmit coded signals to said control station expressing in sequence the condition indicated by each of the indicator units in said group, and a common indicator panel comprising a plurality of representative lamps equivalent in number to the largest number of indicator units at any given substation point, said lamps being operated by said incoming signals to indicate the condition of each of the members associated with the groups of each point as seized at the substation.

7. An arrangement as set forth in claim 6 which includes means for connecting said indicator panel to the receiving equipment at said control station only when an indicator point is seized at the substation.

8. An arrangement as set forth in claim 6 which includes means for illuminating said lamp members to indicate the existence of a fault condition at its associated substation unit and for maintaining same extinguished to indicate existence of a normal condition at said substation unit.

9. An arrangement as set forth in claim 6 which includes means for connecting said indicator lamps in groups of a number equivalent to the largest group of indicator units at any one of said substation points.

10. An arrangement as set forth in claim 6 which includes means for connecting said indicator panel to said receiving equipment at the control station to effect response thereof to the incoming informative signals from the substation, and in which said control station equipment includes means for indicating the particular point in the equipment which is being registered upon the indication panel at the time.

11. A supervisory arrangement as set forth in claim 6 which includes reset means for automatically restoring the substation and control station equipment after the sequential examination of each of the indicator units of each of the groups at the seized one of said indicator points, and which includes means for maintaining illuminated those lamps on the indicator board which have been operated to indicate the existence of an alarm condition for its associated number.

12. A supervisory system as set forth in claim 6 which includes means for effecting illumination of said lamp members to indicate the existence of a fault condition at its associated substation unit, and which includes means for effecting automatic extinguishment of the indicator lamps at the panel of the control station with the operation of the control substation equipment to select a further point in the system.

13. A supervisory system as set forth in claim 6 which includes means for illuminating said lamp members to indicate the existence of a fault condition at its associated substation unit, and which includes manual control key means for restoring the illuminated ones of the indicator lamps on said panel independent of the further operation of the supervisory equipment.

14. An arrangement as set forth in claim 6 which includes manual control means for effecting reset of the equipment to normal in the event of the occurrence of a stall prior to the transmission of said group selection signal by the control station.

15. In an arrangement as set forth in claim 6 which includes automatic timer means for effecting reset of the equipment within a given time responsive to the occurrence of a stall subsequent to said group selection code transmitting operation.

16. In a supervisory system adapted for remote control purposes having a controlling station and at least one controlled substation, each station including equipment for transmitting and receiving coded signals over a single interconnecting signal channel, a plurality of points at said substation, selection means thereat for selectively seizing individual ones of said points in accordance with the nature of the coded signal received from said control station, at least one of said points including a plurality of groups of indicator units for indicating the condition of preassigned members at said substation, group signalling means at said control station operated responsive to seizure of an indicator point to transmit code signals for effecting sequential selection of each of the groups at said seize point, and control means at said substation including said selection means operative responsive to receipt of said group selection signals to individually examine the indicator units of each group associated therewith in sequence and for transmitting signals to said control station which are indicative in sequence of the condition of each of said indicator units.

17. A supervisory arrangement as set forth in claim 16 in which said group signalling means at the control station includes means for initially transmitting a signal to control same to seize the first group of indicators at the point seized, and means operative subsequent to receipt of the indications relative to the points of the first group for automatically transmitting a group signal to effect seizure of the second group of indicators at said seized point and the examination thereof, said signalling means being operative to send a selection signal to seize each succeeding group following examination of each prior group of the seized point.

18. In a supervisory system adapted for remote control purposes having a controlling station and at least one controlled substation, each station including equipment for transmitting and receiving coded signals over an interconnecting signal channel, a plurality of points at said substation, selection means thereat having individual access to each of said points and selectively operated to select the desired one of said points in accordance with the nature of the coded signal received from the controlling station, at least one of said points having a plurality of indicator units associated therewith, each unit being operative to indicate the condition of individual preassigned equipment at the substation, control means including said selection means at said substation operative responsive to seizure of one of said indicator points to examine each of the indicator units associated therewith and to transmit coded signals to said control station indicating the condition of the members as taught by the indicator units at the seized point, corresponding indicator means at said control station operative responsive to receipt of said coded signals for indicating the nature of the existing condition of said members as expressed by the associated indicators at the seized substation point, and means associated with said substation control means operative after the examination of each of a given number of said indicators at the seized point to transmit a matching code pulse to said control station to check for synchronism in operation of the indicator means at the control station with the indicator units at the substation.

19. An arrangement as set forth in claim 18 which includes reset equipment at the control station operative to effect the automatic reset of the equipment at both of the stations in the event that the matching pulse determines the existence of a non-synchronous relation between the indicating units at the substation and the indicating units at the control station.

20. An arrangement as set forth in claim 18 which includes alarm sounding means and reset equipment at the control station which is operative to effect the automatic reset of the equipment and the sounding of said alarm means at the control station in the event that the matching pulse determines the existence of a non-synchronous relation between the indicating units at the substation and the indicating units at the control station.

21. An arrangement as set forth in claim 18 in which said selection means at each of said stations comprises a relay counting chain which are advanced in synchronous relation in the indicating operations, means controlled by the counting chain at the substation in its advancement to effect the examination of each of the indicators of the selected group at the seized point, and means controlled by the counting chain at the control station to effect the selection of a corresponding indicator lamp of the corresponding group at the control station to indicate the condition expressed in the coded signals transmitted, said matching pulses being transmitted at least once during each cycle of said counting chain and being effective to ascertain any existing variance in the synchronous advancement of the relay counting chains.

22. In a supervisory system adapted for remote control purposes having a controlling station and at least one controlled substation, each station including equipment for transmitting and receiving coded signals over a single interconnecting signal channel, a plurality of points at said substation, selection means having access to said points and operative to effect selection of a desired point of said plurality in accordance with the nature of the coded signal received from the control station, at least one of said points having a plurality of groups of indicating units associated therewith, group signalling means at said control station operative with seizure of an indicating point to automatically transmit a code signal for selecting the first group of said indicator units at said seized point, control means including said selection means at said substation operative responsive thereto to register said group selection signals and to transmit a check signal to said control station to indicate the nature of the group selection signal received thereby, and means at said control station operative responsive to receipt of said check signal to compare the value of the transmitted and received group signal and to effect reset of the equipment at the control and substation in the event of a variance in the values thereof.

23. In an arrangement as set forth in claim 22 in which said group signalling means includes means for transmitting a group selection signal for effecting the seizure of each subsequent group following complete selection of each of the indicator units of the previous group at each point, and said substation control means includes means operative to return a check signal to said control station prior to the transmission by the substation of the information bearing pulses for the indicator units of the subsequently selected group, said reset means at said control station being operated whenever a variance between the transmitted group signal and the check group signal is observed.

24. In a supervisory system adapted for remote control purposes having a controlling station and at least one controlled substation, each station including equipment for transmitting and receiving coded signals over an interconnecting signal channel, a plurality of points at said substation, at least one of said points having a plurality of groups of indicator members associated therewith, and control means including selection means at said substation operative responsive to receipt of coded impulses over said signal channel to select a corresponding one of said substation points, said selection means at said substation including a counting chain of a predetermined number of sequentially arranged relay members, the total number of indicator units in each of said groups at an indicator point corresponding to the total number of sequentially arranged relays in the counting chain arrangement, and synchronous means operative responsive to seizure of an indicator point to control said counting chain to effect the examination of each unit of each group of indicator units associated therewith and to control said associated transmitter equipment in the transmission of coded signals over said channel to said control station indicating the condition determined to be existent at each of the indicator units and means for transmitting a synchronizing signal for synchronizing the selection means at the stations following examination of each of said groups.

25. In a supervisory system adapted for remote control purposes having a controlling station and at least one controlled substation, each station including equipment for transmitting and receiving coded signals over an interconnecting signal channel, a plurality of points at said substation, selection means operative in accordance with the coded signals received over said channel to select the one of said points indicated by said code signal, certain of said points having a single functional switching member associated therewith each of groups of which is operative between two positions; others of said points having a plurality of groups of functional switching units thereat each of which units is operable between two positions, and control means at said substation equipment including the point selection means thereat operative responsive to seizure of any one of said other points to select each group in a given order, to examine the members of each group in a given sequence and to transmit a set of information bearing impulses to said control station which are informative of the position of each functional switch of each group at the seized one of said points.

26. In a supervisory system adapted for remote control purposes having a controlling station and at least one controlled substation, each station including equipment for transmitting and receiving coded signals over an interconnecting signal channel, a plurality of points at said substation, selection means operative in accordance with the coded signals received over said channel to select the point indicated by the coded signal received; at least one of said points having a plurality of groups of indicator units associated therewith, each unit being operative to indicate the normal and fault conditions of pre-assigned members located thereat, and control means including said selection means at said substation operative responsive to seizure of one of said indicator points to select each group of indicator units in a given order, to examine each of said indicator units of each group in a given sequence and to transmit coded signals to said control station expressing the condition indicated by each of said indicator units, and means associated with said substation transmission equipment operative to effect transmission of said signals at a predetermined rate of speed for each point at which a normal condition exists and being operative to introduce a pause of a predetermined length in the coded impulse transmission responsive to the detection of a fault condition as expressed at one of said indicator points.

27. In a system as set forth in claim 26 in which said control station includes a control station indicator panel corresponding to the indicator units at the point seized upon which indications are registered with each incoming signal and pause responsive means which is responsive to said pauses in signal transmission which are introduced with each determination of a fault condition at the seized point to effect the illumination of a corresponding indicator lamp on said control station panel.

28. In a supervisory system adapted for remote purposes having a control station and at least one substation, each of said stations including equipment for transmitting and receiving coded impulses signals over an interconnecting signalling channel to selectively supervise a number of points disposed at each of the stations, said substation having one group of points each of which has a single functional control unit associated therewith, and a second group of points at said substation each of which has a number of groups of indicator units associated therewith, means at said control station for initiating impulse transmission to the substation to identify the one of said points which is desired, control means at said substation for transmitting a check-back signal which is indicative of the value of the identifying signal received and the particular point which is to be selected, identification preparatory means at said control station operative to transmit a group selection code signal to said substation with seizure of one of said other points to effect selection of the first group of indicators at said seized point, means associated with said substation control means operative to transmit a check-back signal indicating the group selection signal received and to thereafter examine each of said indicator units associated with said selected group of said seized points and to transmit the results of the examination to said control station, and means associated with said control station means operative to register the received indications on an associated indicator board.

29. In a supervisory system adapted for remote control purposes having a controlling station and at least one controlled substation, each station including equipment for transmitting and receiving coded signals over an interconnecting signal channel, a plurality of points at said controlled station each having a coded signal preassigned thereto, key means at said control station effective with a single operation to transmit a preassigned impulse code to select a predetermined one of said points, selection means for accomplishing selective seizure of a point in accordance with the particular coded signal received thereby from said control station, at least one of said points having a plurality of groups of functional members each arranged to individually perform an assigned functional operation, means including said selection means which effected point seizure operative responsive to receipt of a coded signal thereafter to effect selection of the particular group of functional members at said point which is represented by said signal, and means including said selection means operative subsequent to selection of the proper one of said groups to select each of said functional members in the selected group in sequence to accomplish the functional operation assigned thereto, and guard means for preventing seizure of a subsequent point during the period that another point is being selected.

30. In a supervisory system adapted for remote control purposes having a controlling station and at least one controlled substation, each station including equipment for transmitting and receiving coded signals over an interconnecting signal channel, a plurality of points at said substation, selection means operative in accordance with the coded signals received over said channel to select the one of said points indicated by said code signal, certain of said points each having only one switch associated therewith which is operative between two positions responsive to the occurrence of local conditions, and which is arranged to be controlled to operate between said two positions responsive to seizure of its associated point and transmission thereto of certain preassigned code signals, each of said switches being assigned to control the energization and deenergization of assigned equipment; others of said points each having a plurality of groups of functional indicator units associated therewith, each of said functional indicators being operable between two positions responsive to the change of condition in associated preassigned equipment disposed at said substation to independently provide an indication of such change, and control means including said selection means at said substation operative responsive to seizure of any one of said indicator points to sequentially examine the indicators of each group thereat and to transmit a signal to said control station for each functional indicator at the seized one of said points to indicate the position thereof.

31. An arrangement as set forth in claim 30 in which predetermined ones of said certain points have indicator means associated therewith which are automatically operative responsive to the operation of the controlled switch at its associated point.

32. In a supervisory system adapted for remote control purposes having a controlling station and at least one controlled substation, each station including equipment for transmitting and receiving coded signals over an interconnecting signal channel, a plurality of points at each substation, selection means operative with receipt of a coded signal over said channel to select the one of said points indicated by said code signal, certain of said points having a single functional switching member associated therewith, each of which is operative between two positions; others of said points having a plurality of groups of functional switching units thereat, each of which units is operable between two positions, manually operated control means at said control station for effecting movement of the switching members at said certain points responsive to seizure of the point and the subsequent operation of said manual control means, and control means including said selection means at said substation automatically operative responsive to seizure of any one of said other points to effect selection of each group of switching units at said point independently of each other in a given order, the selection of the members of each selected group in a given sequence, and to transmit a set of information bearing impulses over said channel to said control station which are informative of the position of each functional switch of each group at the point.

33. A supervisory system adapted for remote control purposes having a controlling station and at least one controlled substation, each station including equipment for transmitting and receiving coded signals over an interconnecting signal channel, a plurality of points at said substation, selection means thereat for selectively seizing individual ones of said points in accordance with the nature of the coded signal received from said control station, at least one of said points including a plurality of groups of indicator units for indicating the conditions of preassigned members at said substation, means for transmitting a check signal over said channel to said control station equipment to indicate the point which has been selected, group signalling means at said control station operated responsive to seizure of an indicator point to transmit code signals over said channel for effecting sequential selection of each of the groups at said seized point, and control means at said substation including said selection means operative to register said group selection signals and to return a signal indicating the group selection signal which has been registered, and means controlled thereby to select the group indicated by the received signal, to examine individually each of the indicators of that group in a given sequence, and to transmit signals to said control station which are indicative of the condition of said indicator units.

34. In a supervisory system adapted for remote control purposes having a controlling station and at least one controlled substation, each station including equipment for transmitting and receiving coded signals over a single interconnecting signal channel, a plurality of points at said substation, at least one of said points having a plurality of groups of indicator units, each indicator unit being adapted to indicate the condition of a preassigned member disposed at said substation, selection means at said substation operative in accordance with a first group of coded signals received from said control station to select the point of said plurality which corresponds to the code signal received, means including said selection means operative responsive to receipt of further signals to select each group of indicators at said seized point in a sequence as taught by said further signals, control means at said substation including said selection means automatically operative responsive to seizure of an indicator group at a point to examine each of the indicator units of said group and to send signals to said control station expressing in sequence the condition indicated by each of the indicator units in said group, manual and visual alarm means at said control station, and reset means for automatically resetting the substation and control station equipment responsive to the occurrence of a stall subsequent to the seizure of an indicator point, said reset means being so arranged as to control operation of said alarm units in said automatic reset operation.

35. In a supervisory system having at least two spaced stations interconnected by a signal channel, each of said stations including equipment for transmitting and receiving coded signals over said channel, a group of points at each of said stations, a plurality of groups of indicator units at certain of said points which are connected to be sequentially seized for supervision purposes, indicator group selection means at each point for each group thereat, selection means for seizing the different points selectively responsive to the receipt of different ones of said signals, control means including said selection means operative responsive to the selection of one of said certain points to operate said indicator group selection means thereat in sequence, means controlled by each indicator group selection means as operated to extend the indications of the indicator units of its associated group to the transmitting equipment at its associated station, protective means for normally locking each of said stations to prevent the seizure of said points, and unlocking means including said selection means operated responsive to the receipt of a given predetermined group of impulses to unlock said stations and to maintain said stations continually unlocked during the selection and supervision of the desired one of the points.

36. In a supervisory system adapted for remote control purposes having a controlling station and at least one controlled substation, each station including equipment for transmitting and receiving coded signals over an interconnecting signal channel, a plurality of points at said substation, at least one of said points having a plurality of groups of indicator members associated therewith, means for normally locking said stations to prevent access to the points, and control means at said substation including a counting chain, means for controlling said counting chain to unlock said station with receipt of a given code over said channel, means for thereafter controlling said counting chain to select one of said points in accordance with the nature of the code received and means operative responsive to seizure of said one point to control said counting chain to effect the independent selection of each group of indicator units associated with said one point in a given sequence.

37. In a supervisory system adapted for remote control purposes having a controlling station and at least one controlled substation, each station including equipment for transmitting and receiving coded signals over an interconnecting signal channel, a plurality of points at said substation, at least one of said points having a plurality of indicator members associated therewith, and control means at said substation including a counting chain, means for controlling said counting chain to select a desired one of said points in accordance with the coded signals received thereat, and means operative responsive to selection of said one point to control said counting chain to effect the selection of each indicator member associated with said one point in a given sequence.

38. In a supervisory system adapted for remote control purposes having a controlling station and at least one controlled substation, each station including equipment for transmitting and receiving coded signals over an interconnecting signal channel, a plurality of points at said substation, at least one of said points having a plurality of groups of indicator members connected for seizure thereover and a group selection means for each group of indicator members; and control means at one station at least including a counting chain, supervisory means for controlling said counting chain to select a desired one of said points in accordance with a first set of coded signals received thereat, supervisory means operative responsive to selection of an indicator point to control said counting chain to seize each one of said group selection means in sequence, and means operative in response to each seizure of a group to control counting chain to select each indicator unit of the group in sequence.

References Cited in the file of this patent

UNITED STATES PATENTS

| | | |
|---|---|---|
| 1,689,294 | Potts | Oct. 30, 1928 |
| 1,790,189 | White | Jan. 27, 1931 |
| 2,059,204 | Boswau | Nov. 3, 1936 |
| 2,082,152 | Dicke et al. | June 1, 1937 |
| 2,082,465 | Preston | June 1, 1937 |
| 2,111,352 | Blake et al. | Mar. 15, 1938 |
| 2,229,249 | Lewis | Jan. 21, 1941 |
| 2,259,561 | Hailes et al. | Oct. 21, 1941 |
| 2,444,078 | Weaver | June 29, 1948 |
| 2,444,243 | Breese | June 29, 1948 |
| 2,583,088 | Clutts et al. | Jan. 22, 1952 |
| 2,584,739 | Rees et al. | Feb. 5, 1952 |
| 2,607,843 | Hearn et al. | Aug. 19, 1952 |
| 2,616,959 | Breese et al. | Nov. 4, 1952 |

UNITED STATES PATENT OFFICE

CERTIFICATE OF CORRECTION

Patent No. 2,901,728                                                     August 25, 1959

Lemuel R. Breese

It is hereby certified that error appears in the printed specification of the above numbered patent requiring correction and that the said Letters Patent should read as corrected below.

Column 61, line 44, before "said selection" insert -- and means including --; line 46, before "operation" insert -- seizure of said one point set to effect --; column 62, line 45, strike out "for selecting said point" and insert the same after "means" in line 46, same column; column 66, lines 13 and 14, strike out "groups of"; column 68, line 39, for "conditions" read -- condition --.

Signed and sealed this 12th day of April 1960.

(SEAL)
Attest:

KARL H. AXLINE                                                            ROBERT C. WATSON
Attesting Officer                                             Commissioner of Patents